(12) United States Patent
Baumann et al.

(10) Patent No.: US 7,992,761 B2
(45) Date of Patent: Aug. 9, 2011

(54) PROCESS CONTROL SYSTEM FOR FRICTION STIR WELDING

(75) Inventors: John A. Baumann, St. Charles, MO (US); Herb Bommer, Sr. Peters, MO (US); Kurt A. Burton, Wildwood, MO (US); Mike P. Matlack, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 31 days.

(21) Appl. No.: 11/848,695

(22) Filed: Aug. 31, 2007

(65) Prior Publication Data

US 2008/0083817 A1 Apr. 10, 2008

Related U.S. Application Data

(60) Provisional application No. 60/849,690, filed on Oct. 5, 2006.

(51) Int. Cl.
*B23K 20/12* (2006.01)
(52) U.S. Cl. ..................... 228/102; 228/112.1
(58) Field of Classification Search ............... None
See application file for complete search history.

(56) References Cited

U.S. PATENT DOCUMENTS

| | | | |
|---|---|---|---|
| 4,932,280 A | 6/1990 | Becker et al. | |
| 5,713,507 A * | 2/1998 | Holt et al. | 228/112.1 |
| 5,893,507 A | 4/1999 | Ding et al. | |
| 6,199,745 B1 | 3/2001 | Campbell et al. | |
| 6,273,323 B1 * | 8/2001 | Ezumi et al. | 228/112.1 |
| 6,302,315 B1 * | 10/2001 | Thompson | 228/112.1 |
| 6,419,142 B1 * | 7/2002 | Larsson | 228/2.1 |
| 6,497,355 B1 * | 12/2002 | Ding et al. | 228/2.1 |
| 6,499,649 B2 * | 12/2002 | Sayama et al. | 228/112.1 |
| 6,540,128 B2 * | 4/2003 | Hirano et al. | 228/112.1 |
| 6,595,403 B2 * | 7/2003 | Okamura et al. | 228/112.1 |
| 6,645,132 B2 * | 11/2003 | Yoshinaga | 483/55 |
| 6,854,632 B1 * | 2/2005 | Larsson | 228/2.1 |
| 7,568,608 B1 * | 8/2009 | Ding | 228/110.1 |
| 7,703,654 B2 * | 4/2010 | Burton et al. | 228/2.1 |

(Continued)

FOREIGN PATENT DOCUMENTS

WO WO 2007/006669 A1 * 1/2007

OTHER PUBLICATIONS esp@cenet—Bibliographic data.htm. This link is to a patent describing a "Dual Arm Apparatus With Co-Axial Drive Shafts." Two drive motors are each coupled to one of the shafts through a drive belt arrangement. This is the basic approach used by ESAB (http://www.esabcutting.com/) in their embodiment of a "bobbin tool" FSW system, where two separate motors are coupled with the drive shafts using gear-toothed belts.

*Primary Examiner* — Kiley Stoner
(74) *Attorney, Agent, or Firm* — Tung & Associates

(57) ABSTRACT

A process control system for a friction stir welding machine employs a master set of parameters and subroutines to control multiple machine processes, including welding, drilling, milling and probing. Sub-sets of the master set comprising command parameters, limits parameters and measurement parameters are used to control the operation of a weld tip, a clamping system and a motion head that cooperate under computer control to carry out the multiple processes.

12 Claims, 55 Drawing Sheets

U.S. PATENT DOCUMENTS

| | | |
|---|---|---|
| 2002/0027155 A1* | 3/2002 | Okamura et al. .......... 228/112.1 |
| 2002/0030082 A1* | 3/2002 | Ezumi et al. ............... 228/112.1 |
| 2002/0145031 A1* | 10/2002 | Hirano et al. .............. 228/112.1 |
| 2002/0193217 A1* | 12/2002 | Yoshinaga ...................... 483/36 |
| 2003/0098337 A1* | 5/2003 | Hirano et al. .............. 228/112.1 |
| 2003/0209586 A1* | 11/2003 | Thompson ................... 228/103 |
| 2004/0074944 A1* | 4/2004 | Okamoto et al. ............. 228/2.1 |
| 2004/0129763 A1* | 7/2004 | Burford et al. ............. 228/112.1 |
| 2005/0035179 A1* | 2/2005 | Forrest et al. ............. 228/112.1 |
| 2005/0051602 A1* | 3/2005 | Babb et al. ................. 228/112.1 |
| 2005/0103824 A1* | 5/2005 | Waldron et al. ............ 228/112.1 |
| 2006/0032887 A1* | 2/2006 | Haynie et al. .................. 228/2.1 |
| 2006/0102689 A1* | 5/2006 | Trapp et al. .................... 228/2.1 |
| 2006/0124691 A1* | 6/2006 | Wood et al. .................... 228/2.1 |
| 2006/0163316 A1* | 7/2006 | Burton et al. .................. 228/2.1 |
| 2006/0163328 A1* | 7/2006 | Subramanian et al. .... 228/112.1 |
| 2006/0288550 A1* | 12/2006 | Johansson ........................ 29/53 |
| 2006/0289604 A1* | 12/2006 | Zettler et al. ................... 228/2.1 |
| 2007/0164086 A1* | 7/2007 | Hochhalter et al. ........ 228/112.1 |
| 2007/0187466 A1* | 8/2007 | Sayama et al. ................. 228/101 |
| 2007/0228102 A1* | 10/2007 | Trapp et al. .................... 228/2.1 |
| 2007/0228104 A1* | 10/2007 | Mankus et al. ................ 228/101 |
| 2007/0267462 A1* | 11/2007 | Burton et al. ............. 228/114.5 |
| 2007/0295781 A1* | 12/2007 | Hunt et al. ..................... 228/2.1 |
| 2008/0073409 A1* | 3/2008 | Ostersehlte ..................... 228/102 |
| 2008/0084018 A1* | 4/2008 | Baumann et al. ............. 269/271 |
| 2008/0087128 A1* | 4/2008 | Garner ....................... 74/490.09 |
| 2008/0127751 A1* | 6/2008 | Burton et al. ............ 73/862.381 |
| 2008/0243290 A1* | 10/2008 | Badarinarayan et al. ..... 700/110 |
| 2008/0257936 A1* | 10/2008 | Trapp et al. .................... 228/2.3 |
| 2008/0302154 A1* | 12/2008 | Forrest et al. ...................... 72/69 |
| 2009/0123778 A1* | 5/2009 | Russell et al. .................. 428/661 |
| 2009/0193910 A1* | 8/2009 | Burton et al. ............ 73/862.041 |

* cited by examiner

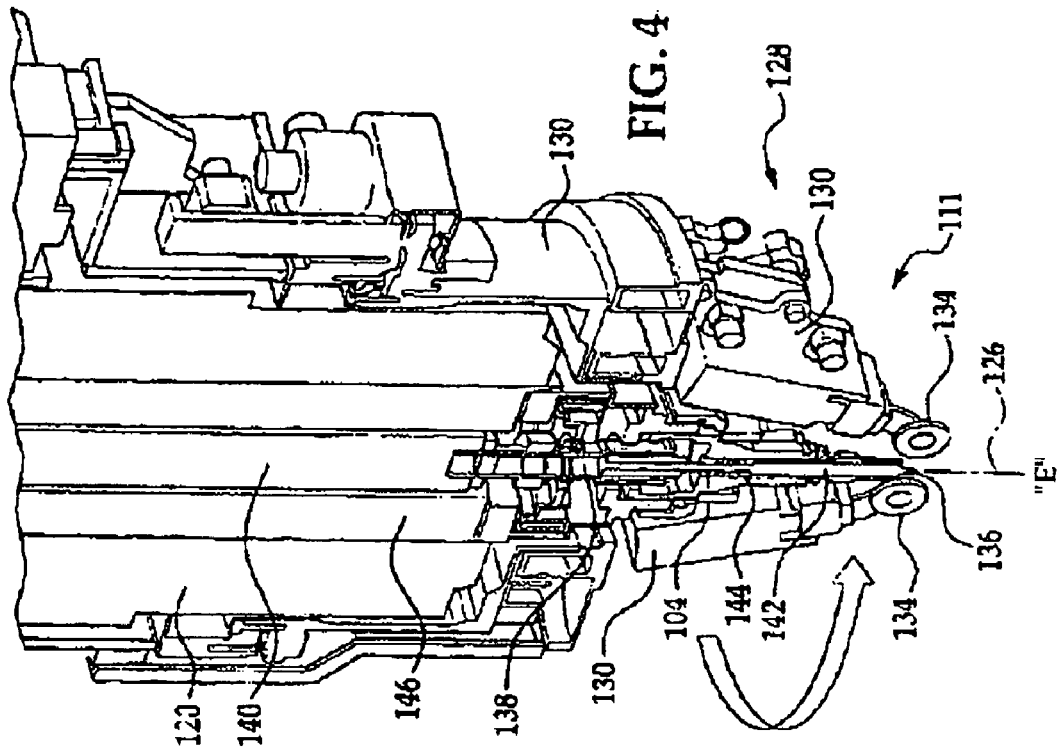
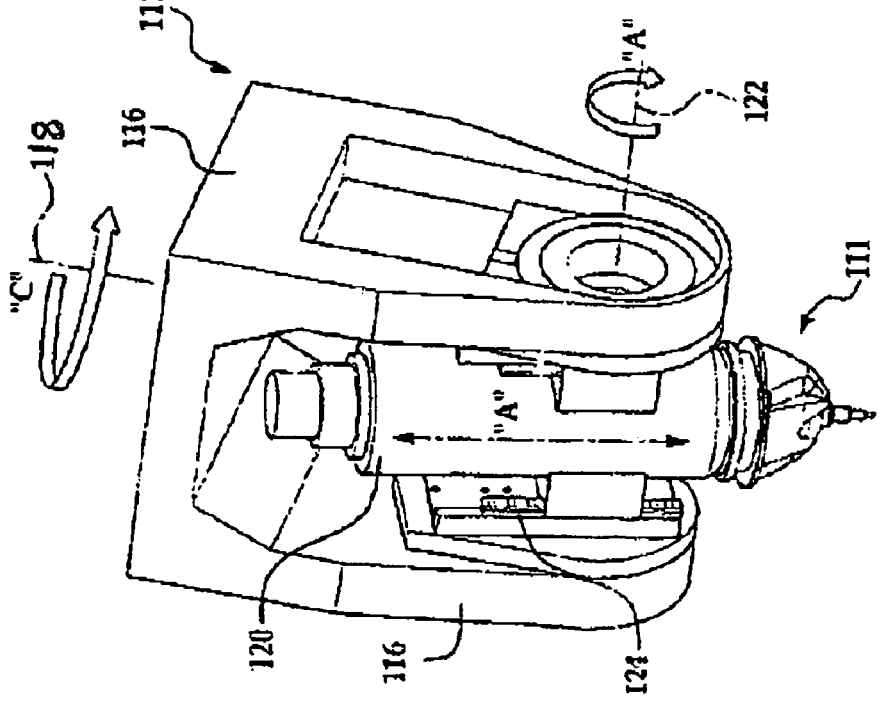

| COMMAND ELEMENT (AXIS) 240 | NO. | COMMAND PARAMETER 242 | DESCRIPTION & UNITS 244 | EXPLANATION 246 | FORCE TOUCH | WELD PLUNGE | WELD PLUNGE ADAPT | WELD PATH POSITION | WELD PATH POSITION ADAPTIVE | WELD PATH FORCE | WELD PATH FORCE ADAPTIVE | WELD END | DRILL CLAMP | DRILL CLAMP ADAPTIVE | MILLING | ADAPTIVE MILLING |
|---|---|---|---|---|---|---|---|---|---|---|---|---|---|---|---|---|
| SHOULDER QUILL AXIS (Ws) — 142 | | | | | | | | | | | | | | | | |
| | 1 | Wsp | POSITION IN INCHES | DELTA CHANGE TO THE PIVOT POINT TO SHOULDER GAGE LIN LENGTH (500mm ±35mm) | X | | | | | | | | | | | |
| | 2 | Wspr | RATE IN IPM | LINEAR RATE OF SHOULDER QUIL | | X | X | | | | | | | | | |
| | 3 | Wspa | ACCEL IN IPM² | DELTA CHANGE TO THE PIVOT POINT TO SHOULDER GAGE LIN LENGTH (500mm ±35mm) | | X | X | | | | | | | | | |
| | 4 | Wsf | AXIAL FORCE IN LBF | ABSOLUTE FORCE COMMAND, FEEDBACK BY SHOULDER AXIAL FORCE TRANSDUCER | | | | | | X | X | X | X | X | | |
| | 5 | Wsfr | RATE IN LBF PER SEC | RATE OF FORCE CHANGE PER UNIT TIME | | | | | | | X | X | | | | |
| | 6 | Wsfa | ACCEL IN LBF PER SEC² | ACCELERATION/DECELERATION OF FORCE CHANGE (MAX. ACC/DEC LIMITED BY BUILDER) | | | | | | | | | | | | |
| SPINDLE (Ss) — 250 | | | | | | | | | | | | | | | | |
| | 7 | Ssp | POSITION IN DEGREES | SHOULDER SPINDLE ORIENTATION FROM REFERENCE, 0-360° | | | | | | | | | | | | |
| | 8 | Sss | SPEED IN RPM | SHOULDER SPINDLE ROTATION SPEED IN REVOLUTIONS PER MINUTE | | | | | | | | X | | | | |
| | 9 | Ssa | ACCEL IN RPM² | ACCELERATION/DECELERATION OF FORCE CHANGE (MAX. ACC/DEC LIMITED BY BUILDER) | | | | | | | | | | | | |
| | 10 | Ssd | DIRECTION OF ROTATION | ROTATION OF SPINDLE, CLOCKWISE OR COUNTERCLOCKWISE - MODAL CMD | | | | | | | | X | | | | |
| PIN — 136, QUILL AXIS (Wp) — 252 | | | | *MECHANICALLY CONNECTED TO SHOULDER (COAXIAL SPINDLES)* | | | | | | | | | | | | |
| | 11 | Wpp | POSITION IN INCHES | RELATIVE DISTANCE BETWEEN PIN AND SHOULDER GAGE LINES | X | | | | | | | | X | X | | |
| | 12 | Wppr | RATE IN IPM | LINEAR RATE OF PIN QUILL | | | | | | | | | X | X | | |
| | 13 | Wppa | ACCEL IN IPM² | ACCELERATION/DECELERATION OF FORCE CHANGE (MAX. ACC/DEC LIMITED BY BUILDER) | | | | | | | | | | X | | |

TOOL TYPE: WELD TOOL, RPT OR FIX / WELD TOOL, RPT OR FIX / SHOULDER PLUNGE DEPTH, INCHES
PLUNGE RATE IN IPM / DWELL TIME IN MILLISECONDS / COMMAND THROUGH

| COMMAND ELEMENT (AXIS) 240 | NO. | COMMAND PARAMETER 242 | DESCRIPTION & UNITS 244 | EXPLANATION 246 | FORCE TOUCH | WELD PLUNGE | WELD PLUNGE ADAPT | WELD PATH POSITION | WELD PATH POSITION ADAPTIVE | WELD PATH FORCE | WELD PATH FORCE ADAPTIVE | WELD END | DRILL CLAMP | DRILL CLAMP ADAPTIVE | MILLING | ADAPTIVE MILLING |
|---|---|---|---|---|---|---|---|---|---|---|---|---|---|---|---|---|
| SHOULDER (142) | | | | | | | | | | | | | | | | |
| QUILL AXIS (Ws) (252) | 14 | Wpf | AXIAL FORCE IN lBF | ABSOLUTE FORCE COMMAND, FEEDBACK BY PIN AXIAL FORCE TRANSDUCER | | | | | | | | X | | | | |
| | 15 | Wpfr | RATE IN lBF PER SEC | RATE OF FORCE CHANGE PER UNIT TIME | | | | | | | | | | | | |
| | 16 | Wpfa | ACCEL IN lBF PER SEC$^2$ | ACCELERATION/DECELERATION OF FORCE CHANGE (MAX. ACC/DEC LIMITED BY BUILDER) | | | | | | | | | | | | |
| SPINDLE (Ss) | 17 | Spp | POSITION IN DEGREES | PIN SPINDLE ORIENTATION FROM REFERENCE, 0-360° | | | | | | | | | | | | |
| | 18 | Sps | SPEED IN RPM | PIN SPINDLE ROTATION SPEED IN REVOLUTIONS PER MINUTE | | | | | | | | | | | | |
| | 19 | Spa | ACCEL IN RPM$^2$ | ACCELERATION/DECELERATION OF FORCE CHANGE (MAX. ACC/DEC LIMITED BY BUILDER) | | | | | | | | | | | | |
| | 20 | Spd | DIRECTION OF ROTATION | ROTATION OF SPINDLE, CLOCKWISE OR COUNTERCLOCKWISE - MODAL CMD | | | | | | | | | | | | |
| ROLLER (130) | | | | | | | | | | | | | | | | |
| ROTARY AXIS (E) (254) | 21 | E | TRACKING ANGLE IN DEGREES | ROTARY MOTION TO ALIGN ROLLERS WITH 5 AXIS PATH VECTOR- BASICALLY A 6TH COORDINATED AXIS | | | | | | | | X | | X | | |
| | 22 | Er | RATE IN DPM | RATE OF ANGLE CHANGE PER UNIT TIME - ASSUME ACC/DEC LIMITED BY BUILDER | | | | | | | | | | | | |
| ROLLER PRESSURE (Rp) | 23 | Rp1 | FORCE IN lBF | ROLLER #1 FORCE, OPEN LOOP, PROGRAMMABLE, FORCE INCREMENTS (+/-) 50 lBF, 0 TO 300 lBF | | | | X | | | | X | X | X | | |
| | 24 | Rp2 | FORCE IN lBF | ROLLER #2 FORCE, OPEN LOOP, PROGRAMMABLE, FORCE INCREMENTS (+/-) 50 lBF, 0 TO 300 lBF | | | | X | | | | X | | X | | |

FIG. 14C

| | | | | | | THESE COMMANDS ARE PROVIDED BY THE MACHINE POSITION CONTROL | | | |
|---|---|---|---|---|---|---|---|---|---|
| 110 | HEAD/TOOL | | | | | | | | |
| | WELD TOOL (Wt) | | | | WELD TOOL TIP POSITION IN INCHES | POSITION OF TOOL TIP - MACHINE (x,y,z,c&a) OR PART (x,y,z,i,j,k) | | | |
| | | 25 | Wtp | | WELD PATH RATE IN IPM | VELOCITY OF TOOL TIP ALONG WELD PATH (FEEDRATE) IN INCHES PER MINUTE | X | | |
| | | 26 | Wtr | | WELD PATH ACCEL IN IPM 2 | ACCELERATION/DECELERATION OF FORCE CHANGE (MAX. ACC/DEC LIMITED BY BUILDER) | | | |
| | | 27 | Wta | | | | | | |
| 254 | TOOL ANGLE (H) | | | | | | | | |
| | | 28 | Hp | | TOOL PATH ANGLE IN DEGREES | LEAD/LAG ANGLE OF TOOL (HEAD) TO WELD PATH - DEVELOPED VIA C & A AXES IN THE MACHINE POSITIONING CONTROL SCHEMA | | | |
| 258 | | 29 | Hn | | TOOL NORMAL ANGLE IN DEGREES | HEAD ANGLE NORMAL WELD PATH (SIDE TO SIDE) - DEVELOPED VIA C & A AXES IN THE MACHINE POSITIONING CONTROL SCHEMA | | | |
| | EXTERNAL TEMPERATURE (Tex) | | | | | WELD NUGGET TEMPERATURE SETPOINT | | | |
| | | 30 | Tex | | TEMPERATURE IN °F | TEMPERATURE OF WELD - TO BE USED FOR FUTURE ADAPTIVE CONTROL | | | |
| | | | | | | TOOL INSPECTION PARAMETERS - BLUM SYSTEM | | | |
| | | 31 | Bsl | | SHOULDER SURFACE LENGTH IN INCHES | DISTANCE FROM SHOULDER SURFACE TO SHOULDER SPINDLE GAGE LINE (WELD TOOL LENGTH) | | | |
| | | 32 | Bsd | | MIDSHOULDER DIA. IN INCHES | DIAMETER AT SHOULDER AT MEDIAN DISTANCE FROM SURFACE | | | |
| 260 | | 33 | Bsm | | SHOULDER MEDIAN DISTANCE IN INCHES | DISTANCE FROM SHOULDER SURFACE TO SHOULDER DIAMETER MEASUREMENT POINT | | | |
| | | 34 | Bsb | | BASESHOULDER DIA. IN INCHES | BASE DIAMETER OF SHOULDER AT TIP POINT (AT SURFACE) | | | |
| | | 35 | Bpl | | PIN LENGTH IN INCHES | DISTANCE FROM PIN TIP TO SHOULDER SURFACE (PIN LENGTH) | X | | |
| | | 36 | Bpr | | PIN ROOT DIAMETER IN INCHES | DIAMETER OF PIN AT THE SHOULDER SURFACE | | | |
| | | 37 | Bpt | | PIN TIP DIAMETER IN INCHES | DIAMETER OF PIN AT THE PIN TIP | | | |
| | | 38 | Bplsafe | | OFFSET LENGTH IN INCHES | ADDITIONAL DISTANCE TO RETRACT PIN FOR FORCE TOUCH ON SHOULDER | | X | X |

| COMMAND ELEMENT (AXIS) 262 | NO. | COMMAND PARAMETER 264 | DESCRIPTION & UNITS 266 | EXPLANATION 268 | FORCE TOUCH | WELD PLUNGE | WELD PLUNGE ADAPT | WELD PATH POSITION | WELD PATH POSITION ADAPTIVE | WELD PATH FORCE | WELD PATH FORCE ADAPTIVE | WELD END | DRILL CLAMP | DRILL CLAMP ADAPTIVE | MILLING | ADAPTIVE MILLING |
|---|---|---|---|---|---|---|---|---|---|---|---|---|---|---|---|---|
| SHOULDER QUILL AXIS (Ws) {142} | 1 | Wsap | ACTUAL POSITION, INCHES | DELTA CHANGE IN THE PIVOT POINT TO SHOULDER GAGE LINE LENGTH | X | X | X | X | X | X | X | X | X | X | X | X |
|  | 2 | Wsapr | RATE IN IPM | ACTUAL LINEAR RATE OF SHOULDER QUILL |  |  |  |  |  |  |  |  |  |  |  |  |
| SPINDLE (Ss) | 3 | Ssapr | ACTUAL POSITION DEGREE | ACTUAL SHOULDER SPINDLE ORIENTATION FROM REFERENCE, 0-360° |  |  |  |  |  |  |  |  |  |  |  |  |
|  | 4 | Sssa | ACTUAL SPEED IN RPM | ACTUAL SHOULDER SPINDLE ROTATIONAL SPEED IN REVOLUTIONS PER MINUTE |  |  |  |  |  |  |  |  |  |  | X | X |
| SHOULDER FORCE (Fs) {270} |  |  |  | AXIAL FORCES AND TORQUES INDIVIDUALLY MEASURED AND RESOLVED FOR SHOULDER AND PIN. RADIAL FORCE MEASURED AND RESOLVED ON SHOULDER ONLY. HEAD POSITION AND MASS WILL EFFECT THE FORCE MEASUREMENTS BASED ON TARE POINT POSITION (<100 lbs) |  |  |  |  |  |  |  |  |  |  |  |  |
|  | 5 | Fsa | AXIAL FORCE IN lbf | ACTUAL RATE OF SHOULDER, AXIAL FORCE CHANGE PER UNIT TIME | X | X | X |  | X | X | X | X | X | X |  | X |
|  | 6 | Fss | ACTUAL FORCE RATE, lb/sec | RADIAL TOOL FORCE (SHOULDER & PIN) |  |  |  |  |  |  |  |  |  |  |  |  |
|  | 7 | Fsr | RADIAL FORCE IN lbf | FORCE ALONG THE TOOL (SHOULDER QUILL) AXIS |  |  |  |  |  | X | X |  |  |  |  |  |
|  | 8 | Fsp | PATH FORCE IN lbf | RADIAL FORCE RESOLVED TO THE FORCE ALONG THE WELD PATH |  |  |  |  | X | X | X |  |  |  |  |  |
|  | 9 | Fsn | NORMAL FORCE IN lbf | RADIAL FORCE RESOLVED TO THE FORCE NORMAL TO WELD PATH |  |  |  |  | X | X | X |  |  |  |  |  |
| SHOULDER FORCE (Fs) |  |  |  | DIRECT SHOULDER TORQUE MEASUREMENT, STRAIN GAGE BRIDGE ON SPINDLE SHAFT |  |  |  |  |  |  |  |  |  |  |  |  |
|  | 10 | Ts | TORQUE IN INCH lbf | SHOULDER SPINDLE TORQUE |  |  |  |  |  |  |  |  |  |  |  |  |
| PIN QUILL AXIS (Wp) {136} |  |  |  | MECHANICALLY CONNECTED TO SHOULDER QUILL AXIS |  |  |  |  |  |  |  |  |  |  |  |  |
|  | 11 | Wpap | POSITION IN INCHES | ACTUAL DISTANCE FROM SHOULDER GAGE LINE TO PIN GAGE LINE |  |  |  |  |  |  |  |  | X | X |  |  |
|  | 12 | Wpapr | ACTUAL RATE IN IPM | ACTUAL LINEAR RATE OF PIN QUILL |  |  |  |  |  |  |  |  | X | X |  |  |
| SPINDLE (Sp) {272} | 13 | Sppa | ACTUAL POSITION, DEGREE | ACTUAL PIN SPINDLE ORIENTATION FROM REFERENCE, 0-360° |  |  |  |  |  |  |  |  |  |  |  |  |
|  | 14 | Spsa | ACTUAL SPEED IN RPM | ACTUAL PIN SPINDLE ROTATION SPEED IN REVOLUTIONS PER MINUTE |  |  |  |  |  |  |  |  |  | X |  |  |

FIG. 15A

| Group | # | | Description | Details | | | | | | | | | | | |
|---|---|---|---|---|---|---|---|---|---|---|---|---|---|---|---|
| PIN FORCE (Fp) | 15 | Fpa | AXIAL FORCE IN lbf | FORCE ALONG THE TOOL (PIN QUILL) AXIS | X | X | X | X | X | X | | | | | |
| | 16 | Fps | ACTUAL FORCE RATE lb/sec | ACTUAL RATE OF SPIN, AXIAL FORCE CHANGE PER UNIT TIME | | | | | | | | | | | |
| PIN TORQUE (Tp) | 17 | Tp | TORQUE IN INCH lbf | DIRECT PIN TORQUE MEASUREMENT, STRAIN GAGE BRIDGE ON SPINDLE SHAFT<br>PIN SPINDLE TORQUE | X | X | X | X | | | | | | | |
| ROLLER<br>ROTARY AXIS (E) | | | | THE E AXIS NEEDS TO BE COMMANDED GIVEN THE PIN PATH POSITION VECTOR INFORMATION AND ITS MOTION COORDINATED WITH OTHER CONTROL AXES. MAYBE AS SIMPLE AS SHAVING TO THE C AXIS | | | | | | | | | | | |
| | 21 | E | TRACKING ANGLE IN DEGREES | ROTARY MOTION TO ALIGN ROLLERS WITH 5 AXIS WELD PATH VECTOR - BASICALLY A 6TH COORDINATED AXIS | | | | | | | | | | | |
| | 22 | Er | RATE IN DPM | RATE IF ANGLE CHANGE PER UNIT TIME - ASSUME ACC/DEC LIMITED BY BUILDER | | | | | | | | | | | |
| ROLLER PRESSURE (Rp) | 23 | Rp1 | FORCE IN lbf | ROLLER #1 FORCE OPEN LOOP, PROGRAMMABLE, FORCE INCREMENTS (+/-) 50 lBF) 0 TO 300 lBF | | | | | X | | | | | | |
| | 24 | Rp2 | FORCE IN lbf | ROLLER #2 FORCE OPEN LOOP, PROGRAMMABLE, FORCE INCREMENTS (+/-) 50 lBF) 0 TO 300 lBF | | | | | X | | | | | | |
| HEAD/TOOL<br>WELD TOOL (Wt) | | | | THESE COMMANDS ARE PROVIDED BY THE MACHINE POSITION CONTROL | | | | | | | | | | | |
| | 25 | Wtp | WELD TOOL TIP POSITION IN INCHES | POSITION OF TOOL TIP - MACHINE (X, Y, Z C&A) OR PART (x, y, z, i, j, k) | | | | X | | | | | | | |
| | 26 | Wtr | WELD PATH RATE IN IPM | VELOCITY OF TOOL TIP ALONG WELD PATH (FEEDRATE) IN INCHES PER MINUTE | X | | | | | | | | | | |
| | 27 | Wta | WELD PATH ACCEL IN IPM 2 | ACCELERATION/DECELERATION OF FORCE CHANGE (MAX. ACC/DEC LIMITED | | | | | | | | | | | |
| | 28 | Hp | TOOL PATH ANGLE IN DEGREES | LEAD/LAG ANGLE OF TOOL (HEAD) TO WELD PATH - DEVELOPED VIA C & A AXES IN THE MACHINE POSITIONING CONTROL SCHEMA | | | | | | | | X | | | |
| | 29 | Hn | TOOL NORMAL ANGLE IN DEGREES | HEAD ANGLE NORMAL WELD PATH (SIDE TO SIDE) - DEVELOPED VIA C & A AXES IN THE MACHINE POSITIONING CONTROL SCHEMA | | | | | | | | | | X | X |

| COMMAND ELEMENT (AXIS) 262 | NO. | COMMAND PARAMETER 264 | DESCRIPTION & UNITS 266 | EXPLANATION 268 | FORCE TOUCH | WELD PLUNGE | WELD PLUNGE ADAPT | WELD PATH POSITION | WELD PATH POSITION ADAPTIVE | WELD PATH FORCE | WELD PATH FORCE ADAPTIVE | WELD END | DRILL CLAMP | DRILL CLAMP ADAPTIVE | MILLING | ADAPTIVE MILLING |
|---|---|---|---|---|---|---|---|---|---|---|---|---|---|---|---|---|
| EXTERNAL TEMPERATURE (Tex) | 22 | Tmex | TEMPERATURE IN °F | EXTERNAL MEASUREMENT OF WELD NUGGET TEMPERATURE / TEMPERATURE OF WELD - TO BE USED FOR FUTURE ADAPTIVE CONTROL | | | | | | | | | | | | |
| TOOL GEOMETRY (BLUM) (B) | | | | *TOOL INSPECTION PARAMETERS - BLUM SYSTEM* | | | | | | | | | | | | |
| | 23 | Bmsl | SHOULDER SURFACE LENGTH IN INCHES | MEASURED DISTANCE FROM SHOULDER SURFACE TO SHOULDER SPINDLE GAGE LINE (WELD TOOL LENGTH) | | | | | | | | | | | | |
| | 24 | Bmsd | MIDSHOULDER DIA. IN INCHES | MEASURED DIAMETER OF SHOULDER AT MEDIAN DISTANCE FROM SURFACE | | | | | | | | | | | | |
| | 25 | Bmsb | SHOULDER MEDIAN DISTANCE IN INCHES | MEASURED BASE DIAMETER OF SHOULDER AT TIP POINT (AT SURFACE) | | | | | | | | | | | | |
| | 26 | Bmpl | BASESHOULDER DIA. IN INCHES | MEASURED DISTANCE FROM PIN TIP TO SHOULDER SURFACE (PIN LENGTH) | X | | | | | | | | | | | |
| | 27 | Bmpr | PIN LENGTH IN INCHES | MEASURED DIAMETER OF PIN AT THE SHOULDER SURFACE | | | | | | | | | | | | |
| | 28 | Bmpt | PIN ROOT DIAMETER IN INCHES | MEASURED DIAMETER OF PIN AT THE PIN TIP | | | | | | | | | | | | |

FIG. 16A

| COMMAND ELEMENT (AXIS) 280 | NO. | COMMAND PARAMETER 282 | DESCRIPTION & UNITS 284 | EXPLANATION 286 | FUNCTION DESCRIPTION USAGE 288 ||||||||||||
|---|---|---|---|---|---|---|---|---|---|---|---|---|---|---|---|
| | | | | | FORCE TOUCH | WELD PLUNGE | WELD PLUNGE ADAPT | WELD PATH POSITION | WELD PATH POSITION ADAPTIVE | WELD PATH FORCE | WELD PATH FORCE ADAPTIVE | WELD END | DRILL CAMP | DRILL CLAMP ADAPTIVE | MILLING | ADAPTIVE MILLING |
| SHOULDER QUILL AXIS (Ws) | 1 | Wsapmax | POS. POSITION CHANGE, INCHES | MAXIMUM (POSITIVE - OUT OF WORKPIECE) SHOULDER POSITION CHANGE (FORCE CONTROL) | | | | | | O | | | | | | |
| | 2 | Wsapmin | NEG. POSITION CHANGE, INCHES | MINIMUM (NEGATIVE - INTO WORKPIECE) SHOULDER POSITION CHANGE (FORCE CONTROL) | | | | | | O | | | | | | |
| | 3 | Wspend | END POSITION, INCHES | SHOULDER POSITION (W) TO RETRACT TO FOR WELD TERMINATE | | | | | | | | X | | | | |
| | 4 | Wsaprmax | MAXIMUM RATE IN IPM | MAXIMUM LIMIT ON SHOULDER QUILL RATE | | | | | | | | | | | | |
| | 5 | Wsaprmin | MINIMUM RATE IN IPM | MINIMUM LIMIT ON SHOULDER QUILL RATE | | | | | | | | X | | | | |
| | 6 | Wsprend | END RETRACT RATE, IPM | SHOULDER RETRACT RATE FOR WELD TERMINATE | | | | | | | | X | | | | |
| SPINDLE (Ss) | 7 | Sssmax | MAX SPEED IN RPM | MAXIMUM SHOULDER SPINDLE SPEED | | | | | | | | | | | | |
| | 8 | Sssmin | MIN. SPEED IN RPM | MINIMUM SHOULDER SPINDLE SPEED | | | | | | | | | | | | |
| | 9 | Sssend | END SPEED IN RPM | SHOULDER SPINDLE SPEED TO RETRACT FOR WELD TERMINATE | | | | | | | | | | | | |
| | 10 | Ssdend | END ROTATION DIRECTION (CW/CCW) | SHOULDER SPINDLE DIRECTION TO RETRACT TO RETRACT FOR WELD TERMINATE | | | | | | | | | | | | |
| SHOULDER FORCE (Fs) | 11 | Fsamax | MAX. AXIAL FORCE IN lbf | MAXIMUM AXIAL SHOULDER FORCE | | O | | | | | | | O | O | | |
| | 12 | Fsamin | MIN. AXIAL FORCE IN lbf | MINIMUM AXIAL SHOULDER FORCE | | | | | | | | | O | O | | |
| | 13 | Fsfmax | MAX. FORCE RATE, lbf/SEC | MAXIMUM SHOULDER FORCE CHANGE RATE | | | | | | | | | | | | |
| | 14 | Fsfmin | MIN. FORCE RATE, lbf/SEC | MINIMUM SHOULDER FORCE CHANGE RATE | | | | | | | | | | | | |
| | 15 | Fsrmax | MAX. RADIAL FORCE IN lbf | MAXIMUM RADIAL FORCE | | | | | | | | | | | | |
| | 16 | Fsrmin | MIN. RADIAL FORCE IN lbf | MINIMUM RADIAL FORCE | | | | | | | | | | | | |
| | 17 | Fspmax | MAX PATH FORCE IN lbf | MAXIMUM FORCE ALONG THE WELD PATH | | | | O | O | O | O | | | | O | |
| | 18 | Fspmin | MIN. PATH FORCE IN lbf | MINIMUM FORCE ALONG THE WELD PATH | | | | O | O | O | O | | | | | |
| | 19 | Fsnmax | MAX. NORMAL FORCE IN lbf | MAXIMUM FORCE NORMAL TO WELD PATH | | | | O | O | O | P | | | | | O |

FIG. 16A CONT.

| COMMAND ELEMENT (AXIS) 280 | NO. | COMMAND PARAMETER 282 | DESCRIPTION & UNITS 284 | EXPLANATION 286 |
|---|---|---|---|---|
| | 20 | Fsnmin | MIN. NORMAL FORCE IN lbf | MINIMUM FORCE NORMAL TO WELD PATH |
| | 21 | Fstmax | MAX. TOUCH FORCE IN lbf | MAXIMUM ALLOWABLE SHOULDER TOUCH FORCE |
| | 22 | Fstmin | MIN. TOUCH FORCE IN lbf | MINIMUM ALLOWABLE SHOULDER TOUCH FORCE |
| | 23 | Tsmax | MAX. TORQUE IN INCH lbf | MAXIMUM SHOULDER SPINDLE TORQUE |
| | 24 | Tsmin | MIN. TORQUE IN INCH lbf | MINIMUM SHOULDER SPINDLE TORQUE |

FIG. 16B

| COMMAND ELEMENT (AXIS) 280 | NO. | COMMAND PARAMETER 282 | DESCRIPTION & UNITS 284 | EXPLANATION 286 |
|---|---|---|---|---|
| PIN QUILL AXIS (Wp) | | | | MECHANICALLY CONNECTED TO SHOULDER (COAXIAL SPINDLES) |
| | 1 | Wsapmax | MAX. LENGTH IN INCHES | MAXIMUM (POSITIVE - OUT OF WORKPIECE) PIN POSITION CHANGE (FORCE CONTROL) |
| | 2 | Wsapmin | MIN. LENGTH IN INCHES | MINIMUM (NEGATIVE - INTO WORKPIECE) PIN POSITION CHANGE (FORCE CONTROL) |
| | 3 | Wspend | END POSITION, INCHES | PIN POSITION (W2) TO RETRACT TO FOR WELD TERMINATE |
| | 4 | Wsaprmax | MAXIMUM RATE IN IPM | MAXIMUM LIMIT ON PIN QUILL RATE |
| | 5 | Wsaprmin | MINIMUM RATE IN IPM | MINIMUM LIMIT ON PIN QUILL RATE |
| | 6 | Wsprend | END RETRACT RATE, IPM | PIN RETRACT RATE FOR WELD TERMINATE |
| SPINDLE (Sp) | 7 | Sssmax | MAX. SPEED IN RPM | MAXIMUM PIN SPINDLE SPEED |
| | 8 | Sssmin | MIN. SPEED IN RPM | MINIMUM PIN SPINDLE SPEED |
| | 9 | Sssend | END SPEED IN RPM | PIN SPINDLE SPEED TO RETRACT FOR WELD TERMINATE |
| | 10 | Ssdend | END ROTATION DIRECTION (CW/CCW) | PIN SPINDLE DIRECTION TO RETRACT FOR WELD TERMINATE |
| PIN FORCE (Fp) | 11 | Fsamax | MAX. AXIAL FORCE IN lbf | MAXIMUM AXIAL PIN FORCE |

FUNCTION DESCRIPTION USAGE 288: ADAPTIVE MILLING, MILLING, DRILL CLAMP ADAPTIVE, DRILL CLAMP, WELD END, WELD PATH FORCE ADAPTIVE, WELD PATH FORCE, WELD PATH POSITION ADAPTIVE, WELD PATH POSITION, WELD PLUNGE ADAPT, WELD PLUNGE, FORCE TOUCH

FIG. 16B CONT.

| | | | | | | | | |
|---|---|---|---|---|---|---|---|---|
| 292 { | 12 | Fpamin | MIN. AXIAL FORCE IN lbf | MINIMUM AXIAL SHOULDER FORCE | | | | |
| | 13 | Fpsmax | MAX. FORCE RATE, lbf/SEC | MAXIMUM PIN FORCE CHANGE RATE | | | | |
| | 14 | Fpsmin | MIN. FORCE RATE, lbf/SEC | MINIMUM PIN FORCE CHANGE RATE | | | | |
| | 15 | Fptmax | MAX. TOUCH FORCE IN lbf | MAXIMUM ALLOWABLE PIN TOUCH FORCE | X | | | |
| | 16 | Fptmin | MIN. TOUCH FORCE IN lbf | MINIMUM ALLOWABLE PIN TOUCH FORCE | X | | | |
| PIN TORQUE (Tp) | | | | | | | | |
| | 17 | Fpmax | MAX. TORQUE IN INCH lbf | MAXIMUM PIN SPINDLE TORQUE | | 0 | 0 | 0 | 0 |
| | 18 | Fpmin | MIN. TORQUE IN INCH lbf | MINIMUM PIN SPINDLE TORQUE | | 0 | 0 | 0 | 0 |

FIG. 16C

| | COMMAND ELEMENT (AXIS) | NO. | COMMAND PARAMETER | DESCRIPTION & UNITS | EXPLANATION | FUNCTION DESCRIPTION USAGE | | | | | | | | | | |
|---|---|---|---|---|---|---|---|---|---|---|---|---|---|---|---|---|
| | | | | | | ADAPTIVE MILLING | MILLING | DRILL CLAMP ADAPTIVE | DRILL CLAMP | WELD END | WELD PATH FORCE ADAPTIVE | WELD PATH FORCE | WELD PATH POSITION ADAPTIVE | WELD PATH POSITION | WELD PLUNGE ADAPT | WELD PLUNGE | FORCE TOUCH |
| 110 | HEAD/TOOL | | | | | | | | | | | | | | | | |
| 294 { 258 { | WELD TOOL RATE (Wtr) | 1 | Wtrmax | MAX. PATH RATE IN IPM | WELD PATH RATE LIMITS FOR ADAPTIVE FEED CONTROL SCHEMES MAXIMUM VELOCITY OF TOOL TIP ALONG WELD PATH (FEEDRATE) IN INCHES PER MINUTE | 0 | | | | | 0 | | | | | | |
| | | 2 | Wtrmin | Min. PATH RATE IN IPM | MINIMUM VELOCITY OF TOOL TIP ALONG WELD PATH (FEEDRATE) IN INCHES PER MINUTE | 0 | | | | | 0 | | | | | | |
| | EXTERNAL TIMERS | 1 | Eendtime | WELD END/ERROR DELAY IN MILLISECONDS | TIME TO WAIT BETWEEN CHANGING MODE TO POSITION CONTROL AND RETRACTING WELD TOOL | | | | | X | | | | | | | |
| | TEMPERATURE (Tex) | | | | WELD NUGGET TEMPERATURE SETPOINT LIMITS - FOR FUTURE USE | | | | | | | | | | | | |
| | | 1 | Texmax | MAX. TEMPERATURE IN °F | MAXIMUM TEMPERATURE OF WELD | | | | | | | | | | | | |
| | | 2 | Texmin | MIN. TEMPERATURE IN °F | MINIMUM TEMPERATURE OF WELD | | | | | | | | | | | | |
| 296 { | TOOL (BLUM) (B) | | | | TOOL INSPECTION LIMITS - BLUM SYSTEM | | | | | | | | | | | | |

| | | | | | | | | | | | | | | | | | |
|---|---|---|---|---|---|---|---|---|---|---|---|---|---|---|---|---|---|
| 3 | Bmslmax | MAX. SHOULDER SURFACE LENGTH IN INCHES | MAXIMUM LIMIT DISTANCE FROM SHOULDER SURFACE TO SHOULDER SPINDLE GAGE LINE (WELD TOOL LENGTH | | | | | | | | | | | | | | |
| 4 | Bmslmin | MIN. SHOULDER SURFACE LENGTH IN INCHES | MINIMUM LIMIT DISTANCE FROM SHOULDER SURFACE TO SHOULDER SPINDLE GAGE LINE (WELD TOOL LENGTH | | | | | | | | | | | | | | |
| 5 | Bmsdmax | MAX. MIDSHOULDER DIA. IN INCHES | MAXIMUM LIMIT DIAMETER OF SHOULDER AT MEDIAN DISTANCE FROM SURFACE | | | | | | | | | | | | | | |
| 6 | Bmsdmin | MIN. MIDSHOULDER DIA. IN INCHES | MINIMUM LIMIT DIAMETER OF SHOULDER AT MEDIAN DISTANCE FROM SURFACE | | | | | | | | | | | | | | |
| 7 | Bmsbmax | MAX. BASESHOULDER DIA. IN INCHES | MAXIMUM LIMIT BASE DIAMETER OF SHOULDER AT TIP POINT (AT SURFACE) | | | | | | | | | | | | | | |
| 8 | Bmsbmin | MIN. BASESHOULDER DIA. IN INCHES | MINIMUM LIMIT BASE DIAMETER OF SHOULDER AT TIP POINT (AT SURFACE) | | | | | | | | | | | | | | |
| 9 | Bplmax | MAX. PIN LENGTH IN INCHES | MAXIMUM LIMIT DISTANCE FROM PIN TIP TO SHOULDER SURFACE (PIN LENGTH) | | | | | | | | | | X | | | | |
| 10 | Bplmin | MIN. PIN LENGTH IN INCHES | MINIMUM LIMIT DISTANCE FROM PIN TIP TO SHOULDER SURFACE (PIN LENGTH) | | | | | | | | | | X | | | | |
| 11 | Bmprmax | MAX. PIN ROOT DIAMETER IN INCHES | MAXIMUM LIMIT DIAMETER OF PIN AT THE SHOULDER SURFACE | | | | | | | | | | | | | | |
| 12 | Bmprmin | MIN. PIN ROOT DIAMETER IN INCHES | MINIMUM LIMIT DIAMETER OF PIN AT THE SHOULDER SURFACE | | | | | | | | | | | | | | |
| 13 | Bmptmax | MAX. PIN TIP DIAMETER IN INCHES | MAXIMUM LIMIT DIAMETER OF PIN AT THE PIN TIP | | | | | | | | | | | | | | |
| 14 | Bmptmin | MIN. PIN TIP DIAMETER IN INCHES | MINIMUM LIMIT DIAMETER OF PIN AT THE PIN TIP | | | | | | | | | | | | | | |

FIG. 16C CONT.

| MODE | PROCESS | NO. | PROGRAMMABLE PARAMETER | DESCRIPTION & UNITS |
|---|---|---|---|---|
| WELD PREP. | | | | |
| | FORCE TOUCH | | | |
| | | 1 | TOOL TYPE | WELD TOOL, RPT OR FIX |
| | | 2 | Ft | FORCE TOUCH LEVEL IN lbf |
| | | 3 | Dt | TOUCH TRAVEL DISTANCE, INCHES |
| WELD PLUNGE | | | | |
| | POSITION PLUNGE | | | |
| | | 1 | TOOL TYPE | WELD TOOL, RPT OR FIX |
| | | 2 | Pd | SHOULDER PLUNGE DEPTH, INCHES |
| | | 3 | Pr | PLUNGE RATE IN IPM |
| | | 4 | Pt | DWELL TIME IN MILLISECONDS |
| | | 5 | Pfto | USE FORCE TOUCH OFFSET |
| | | 6 | Psf | MAX SHOULDER FORCE IN lbf |
| | | 7 | Pst | MAX SHOULDER TORQUE, IN-lb |
| | | 8 | Ppf | MAX PIN FORCE IN lbf (RPT) |
| | | 9 | Ppt | MAX PIN TORQUE, IN-lb (RPT) |
| | POSITION PLUNGE ADAPTIVE | | | |
| | | 1 | TOOL TYPE | WELD TOOL, RPT OR FIX |
| | | 2 | Pd | SHOULDER PLUNGE DEPTH, INCHES |
| | | 3 | Pr | PLUNGE RATE IN IPM |
| | | 4 | Pt | DWELL TIME IN MILLISECONDS |
| | | 5 | Pfto | USE FORCE TOUCH OFFSET |
| | | 6 | Psf | TARGET SHOULDER AXIAL FORCE IN lbf |
| | | 7 | Pst | MAX SHOULDER TORQUE, IN-lb |
| | | 8 | Ppf | MAX PIN TORQUE, IN-lb (RPT) |
| | | 9 | Ppt | MAX PIN TORQUE, IN-lb (RPT) |
| | | 10 | Prmin | MINIMUM PLUNGE RATE IN IPM |
| | | 11 | OVRIDX | OVERRIDE INDEX FACTOR |

| MODE | PROCESS | NO. | PROGRAMMABLE PARAMETER | DESCRIPTION & UNITS |
|---|---|---|---|---|
| WELD PATH | | | | |
| | POSITION CONTROL | | | |
| | | 1 | TOOL TYPE | WELD TOOL, RPT OR FIX |
| | | 2 | Ft | MAX SHOULDER AXIAL FORCE IN lbf |
| | | 3 | Dt | MAX SHOULDER TORQUE, IN-lb |
| | | 4 | Pt | MAX PIN AXIAL FORCE IN lbf (RPT) |
| | | 5 | Pfto | MAX PIN TORQUE, IN lb (RPT) |
| | | 6 | Psf | MAX WELD PATH FORCE IN lbf |
| | | 7 | Pst | MAX WELD NORMAL FORCE IN lbf |
| | POSITION PLUNGE ADAPTIVE | | | |
| | | 1 | TOOL TYPE | WELD TOOL, RPT OR FIX |
| | | 2 | WPsf | MAX SHOULDER AXIAL FORCE IN lbf |
| | | 3 | WPst | MAX SHOULDER TORQUE, IN-lb |
| | | 4 | WPpf | MAX PIN AXIAL FORCE IN lbf (RPT) |
| | | 5 | WPpt | MAX PIN TORQUE, IN lb (RPT) |
| | | 6 | WPspf | MAX WELD PATH FORCE IN lbf |
| | | 7 | WPsnf | MAX WELD NORMAL FORCE IN lbf |
| | | 8 | WPApf | TARGET PATH FORCE IN lbf |
| | | 9 | WPAmax | MAX WELD RATE LIMIT IN IPM |
| | | 10 | WPAmin | MIN WELD RATE LIMIT IN IPM |
| | | 11 | KPA | ADAPTIVE ALGORITHM FACTOR |
| | FORCE CONTROL | | | |
| | | 1 | TOOL TYPE | WELD TOOL, RPT OR FIX |
| | | 2 | WFsf | TARGET SHOULDER AXIAL FORCE, lbf |
| | | 3 | WFst | MAX SHOULDER TORQUE, IN-lb |
| | | 4 | WFpf | MAX PIN AXIAL FORCE IN lbf (RPT) |
| | | 5 | WFpt | MAX PIN TORQUE, IN-lb (RPT) |
| | | 6 | WFspf | MAX WELD PATH FORCE IN lbf |
| | | 7 | WFsnf | MAX WELD NORMAL FORCE IN lbf |
| | | 8 | WFspmax | MAX SHOULDER POS. VARIATION, IN. |
| | | 9 | WFspmin | MAX SHOULDER NEG. VARIATION, IN. |

FIG. 17A

| MODE | PROCESS | NO. | PROGRAMMABLE PARAMETER | DESCRIPTION & UNITS |
|---|---|---|---|---|
| DRILL | CLAMP | | TOOL TYPE | WELD TOOL, RPT OR FIX |
| | | 1 | Dd | DRILL DEPTH IN INCHES |
| | | 2 | Df | DRILL RATE IN IPM |
| | | 3 | Bs | DRILL SPEED IN RPM |
| | | 4 | Dr | DRILL DIRECTION, CW/CCW |
| | | 5 | Fm | MAX DRILL FORCE |
| | | 6 | Fr | CLAMP UP FORCE |
| | | 7 | | |
| | CLAMP ADAPTIVE | | TOOL TYPE | WELD TOOL, RPT OR FIX |
| | | 1 | Dd | DRILL DEPTH IN INCHES |
| | | 2 | Df | DRILL RATE IN IPM |
| | | 3 | Ds | DRILL SPEED IN RPM |
| | | 4 | Dr | DRILL DIRECTION, CW/CCW |
| | | 5 | Fd | TARGET DRILL FORCE IN lbf |
| | | 6 | Fc | CLAMP UP FORCE IN lbf |
| | | 7 | DFAmin | MIN DRILL RATE IN IPM |
| | | 8 | DSAmin | MIN DRILL SPEED IN RPM |
| | | 9 | OVRIDX | OVERRIDE INDEX FACTOR |
| | | 10 | | |
| DRILL | MILLING (HSK100) | 1 | Msrf | MAX SHOULDER RADIAL FORCE IN lbf |
| | | 2 | Mst | MAX SHOULDER TORQUE, IN-lb |
| | ADAPTIVE MILLING (HSK100) | 1 | MAsrf | MAX SHOULDER RADIAL FORCE IN lbf |
| | | 2 | MAsi | MAX SHOULDER TORQUE, IN-lb |
| | | 3 | MAtrf | TARGET RADIAL FORCE IN lbf |
| | | 4 | MArmax | MAX MILLING RATE LIMIT IN IPM |
| | | 5 | MArmin | MIN MILLING RATE LIMIT IN IPM |
| | | 6 | KMA | ADAPTIVE ALGORITHM FACTOR |

| MODE | PROCESS | NO. | PROGRAMMABLE PARAMETER | DESCRIPTION & UNITS |
|---|---|---|---|---|
| | FORCE ADAPTIVE | | TOOL TYPE | WELD TOOL, RPT OR FIX |
| | | 1 | WFtsf | TARGET SHOULDER AXIAL FORCE, lbf |
| | | 2 | WFst | MAX SHOULDER TORQUE, IN-lb |
| | | 3 | WFpf | MAX PIN AXIAL FORCE IN lbf (RPT) |
| | | 4 | WFpt | MAX PIN TORQUE, IN lb (RPT) |
| | | 5 | WFspf | MAX WELD PATH FORCE IN lbf |
| | | 6 | WFsnf | MAX WELD NORMAL FORCE IN lbf |
| | | 7 | WFspmax | MAX SHOULDER POS. VARIATION, IN. |
| | | 8 | WFspmin | MAX SHOULDER NEG. VARIATION, IN. |
| | | 9 | WFAtpf | TARGET WELD PATH FORCE IN lbf |
| | | 10 | WFArmax | MAX WELD RATE LIMIT IN IPM |
| | | 11 | WFArmin | MIN WELD RATE LIMIT IN IPM |
| | | 12 | KFA | ADAPTIVE ALGORITHM FACTOR |
| | | 13 | | |
| WELD TERMINATE | WELD END | | TOOL TYPE | WELD TOOL, RPT OR FIX |
| | | 1 | Et | DWELL TIME IN MILLISECONDS |
| | | 2 | | |

FIG. 17B

FIG. 19A
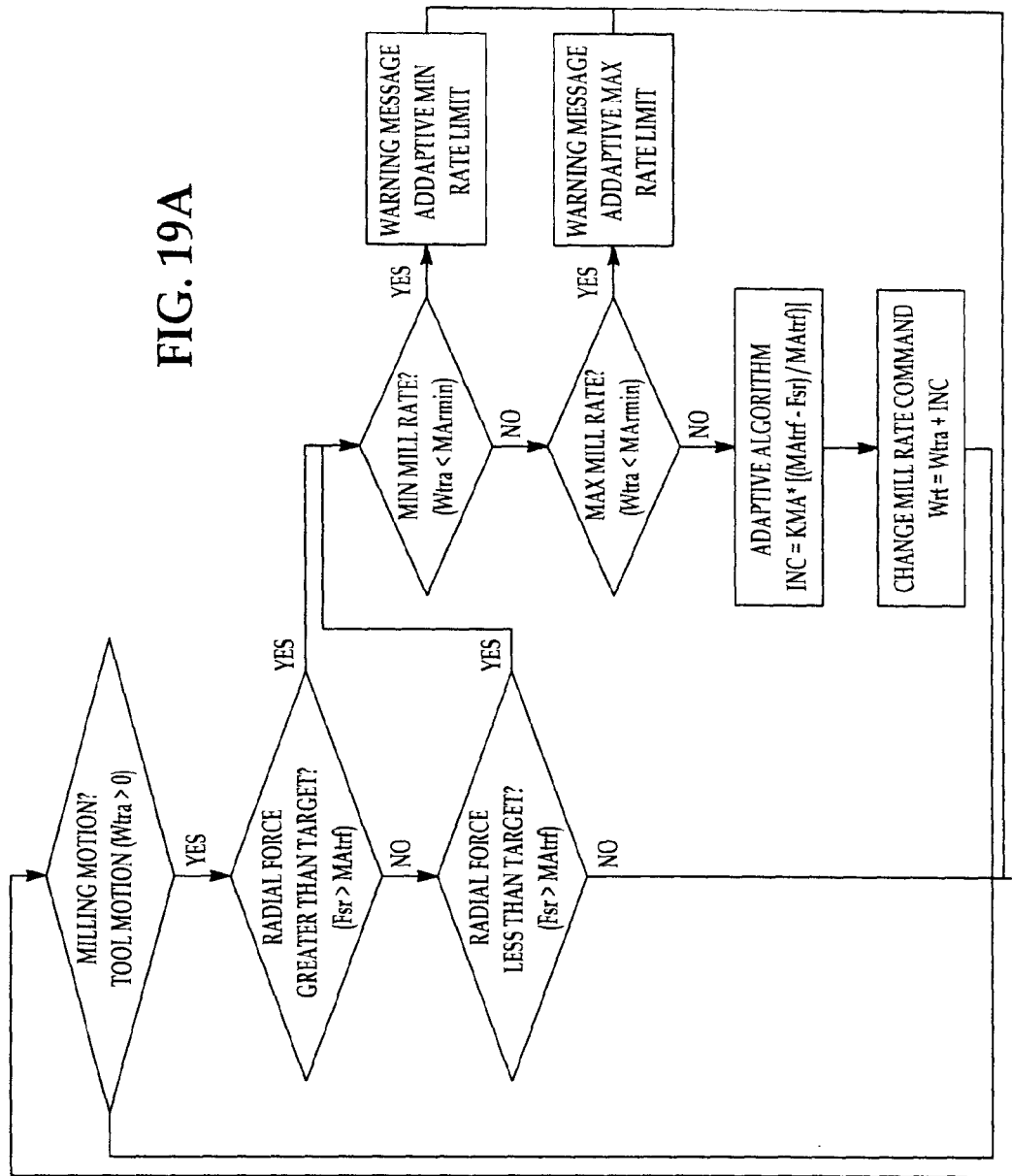
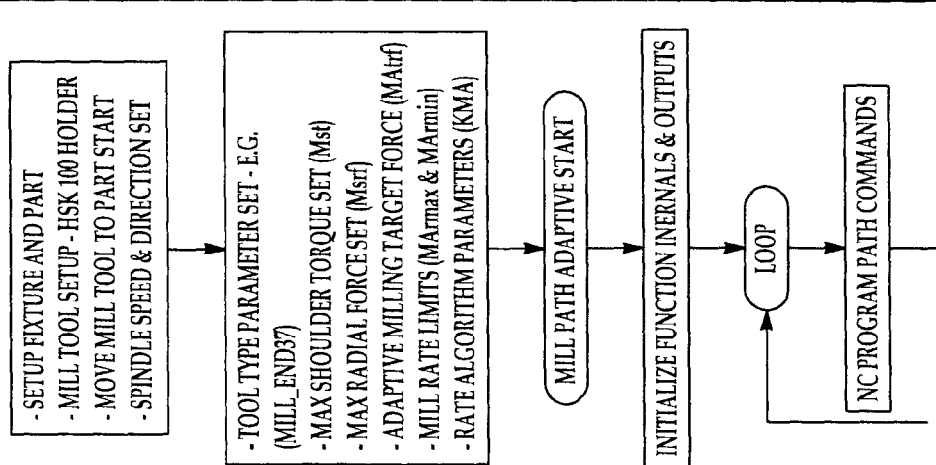

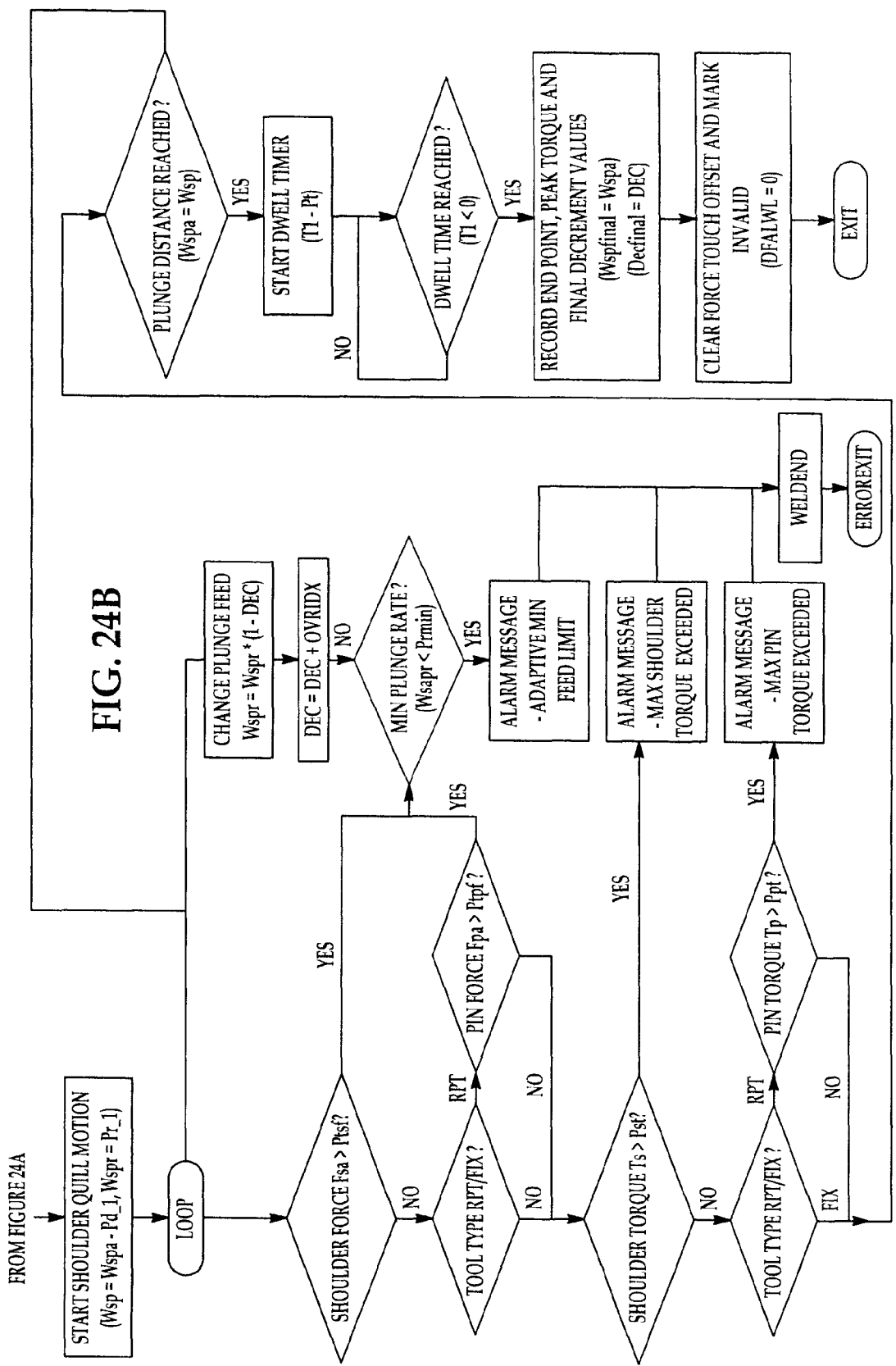

FIG. 26A
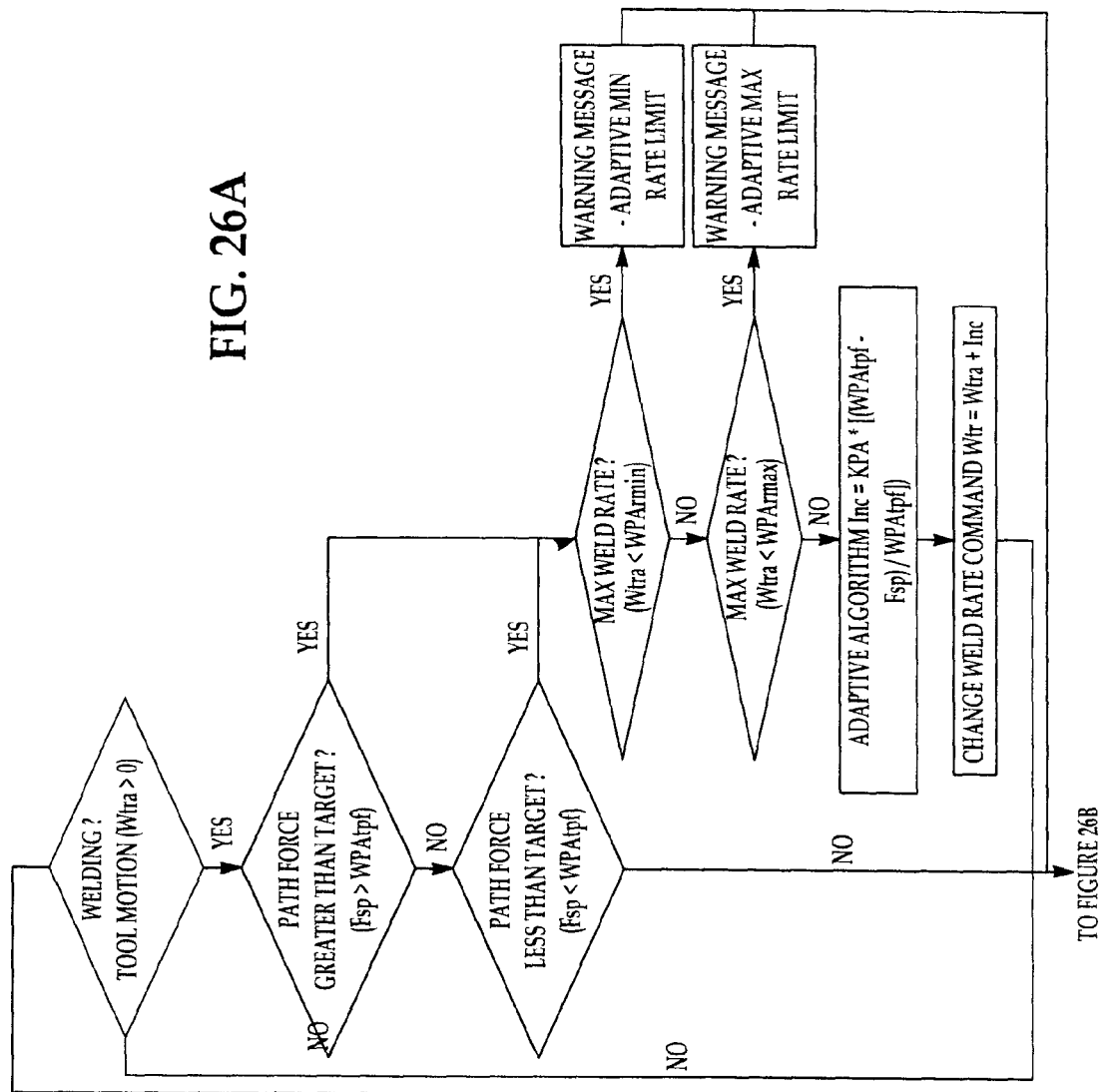
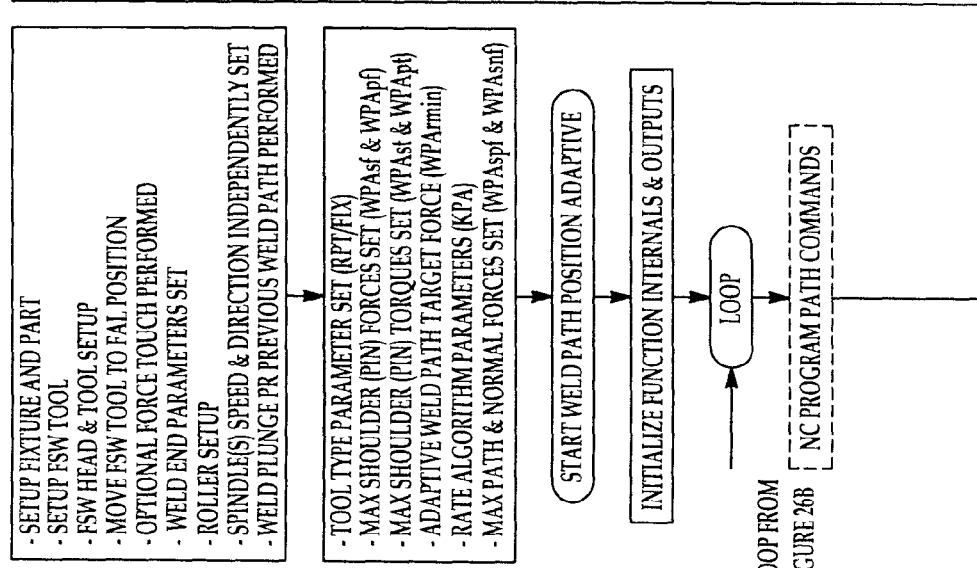

PROCESS CONTROL SYSTEM FOR FRICTION STIR WELDING

CROSS REFERENCE TO RELATED APPLICATIONS

This application claims the benefit of Provisional U.S. Patent Application No. 60/849,690 filed Oct. 5, 2006, which is incorporated by reference herein. This application is also related to U.S. patent application Ser. Nos. 11/829,897 filed Jul. 28, 2007; 11/771,188 filed Jun. 29, 2007, 11/764,304 filed Jun. 18, 2007; 11/161,731 filed Aug. 15, 2005; 11/053,630 filed Feb. 7, 2005; and 11/041,836 filed Jan. 24, 2005, the entire disclosures of which are incorporated by reference herein.

TECHNICAL FIELD

This disclosure generally relates to automated machining processes and equipment, and deals more particularly with a system for controlling processes performed by an automated friction stir welding machine.

BACKGROUND

Friction stir welding (FSW) produces welds using a combination of frictional heating of metal by a rotating tool, and mechanical deformation of the metal by the tool. The tool may include a weld tip comprising a rotating pin surrounded by annular shoulder. FSW tools can be used to perform various types of FSW welding, including fixed tool welding, retractable pin-tool welding and fixed stir spot welding. In order to practice these welding techniques, the pin is designed to retract relative to the shoulder, and both the pin and the shoulder may be independently rotated at the same or different speeds, in the same or opposite directions. The pin penetrates the workpiece and the shoulder rubs top surfaces of the heated metal to produce a weld joint. As the weld is completed, the tool shoulder and pin are withdrawn from the workpiece.

In order to move a FSW weld tip along a desired weld path, the weld tip may be mounted on a weld head that forms part of a multi-axis motion platform similar to a CNC machining center. In the case of workpieces having more complicated, contoured surfaces, such as those sometimes used in aircraft subassemblies, the problem of coordinating the movements of the FSW weld tip along a highly contoured weld path is challenging.

Further complicating the task of FSW process control is the need to provide auxiliary process capabilities such as milling, drilling and probing. For example, light milling of the workpiece is often required in order to remove flash or runoff tabs on the workpiece. Drilling may be required to produce through-holes in the workpiece at mounting locations. Probing may be required in order to locate workpiece features so that the exact position of the features is known in relation to the weld tip.

As a result of the forgoing requirements, CNC-type FSW machines have been produced that are capable of performing multiple FSW operations, including milling, drilling and probing. These processes use different tools and require differing control processes and control parameters. Thus, separate, sometimes proprietary, control systems and software logic may be required to support the individual machine processes, resulting in a relatively complex control system that may lack needed flexibility, particularly when tools or processes must be changed or added to the system.

Accordingly, there is a need for a process control system for FSW machines having a simplified, open architecture that is flexible and readily adaptable to accommodate new or different tools or processes. Embodiments of the disclosure are directed toward satisfying this need.

SUMMARY

Embodiments of the disclosure provide a process control system for FSW machines capable of carrying out multiple FSW processes as well as auxiliary operations such as milling, drilling and probing. Friction stir welding of workpieces having complex contours may be performed using conventional, single-piece tool welding, or advanced FSW techniques employing separate control of pin and shoulder tools during the weld process. Advanced algorithms may be used to achieve tunable axial force control, weld path force control, adaptive weld force control and position movement limits in combination with the force control. Additionally, tapered thickness welding, two sided welding and friction stir spot welding are possible.

The disclosed embodiments provide a systematic approach of defining process functionality, system parameters and limits to achieve process control for complex contour friction stir welding using a multi-axis motion platform. Process flow diagrams are used to define process functions in terms of individual steps that may be combined, as desired to produce process sequences for carrying out both simple and complex weld processes. A master set of expandable process parameters and limits are used to define, track and pass information from one level of programming to another. The master set of process parameters and limits provide a common nomenclature that may be used by programming and operating personnel to define processes and carryout machine sequences. The flow diagrams identify required system parameters, limit values and other system checks/values required to be incorporated into program logic.

In accordance with one disclosed embodiment, a method is provided for controlling a friction stir welding machine, comprising the steps of: generating definitions for each of a plurality of processes that may be performed by the machine; generating a master set of parameters used in the processes; and, using the definitions and the parameters to control the processes. The method may further comprising the step of associating certain of the parameters in the master set of parameters with at least one of the processes for which a definition was generated. The definitions may be generated by generating a plurality of process flowcharts respectively defining the processes, wherein each of the process flowcharts lists the steps for carrying out one of the processes. The method may also include the steps of associating certain of the parameters in the master set with at least certain of the steps in the flowcharts.

According to another disclosed embodiment, a method is provided for controlling multiple processes performed by a friction stir welding machine, comprising the steps of: generating a set of logic defining steps for carrying out each of the processes; generating a set of programmed instructions for controlling the machine based on the generated logic, including generating subroutines for controlling machine operations used in carrying out the processes; generating sets of process parameters respectively used in the subroutines to control the machine operations; and, using the programmed instructions and the parameters to control the machine. The logic may be generated by generating software flowcharts for each of the subroutines. The multiple processes may include one or more of the following: fixed tool welding, retractable pin-tool welding, fixed stir spot welding, milling, adaptive milling, drilling, and probing. The sets of generated process parameters may include one or more of the following: command parameters used in commanding the operation of the machine; measurement parameters reflecting the response of the machine to commanded operations; and process limit parameters defining selected limits on the processes performed by the machine.

According to a further disclosed embodiment, a method of controlling a friction stir welding machine is provided, comprising the steps of: generating a set of programmed instructions for automatically controlling operations performed by the machine on a workpiece; selecting a set of parameters used by the programmed instructions for controlling the machine operations; programming a controller using the generated programmed instructions and the selected parameters; and, using the controller to operate the machine. Selection of the parameters may be performed by: selecting a first a set of parameters defining operating characteristics of at least one welding tool; selecting a second set of parameters defining operating characteristics of a clamping system for clamping the workpiece during a weld operation; and, selecting a third set of parameters defining operating characteristics of a motion system used to move the weld tool and the clamping system along a weld path on the workpiece Other features, benefits and advantages of the disclosed embodiments will become apparent from the following description of embodiments, when viewed in accordance with the attached drawings and appended claims.

BRIEF DESCRIPTION OF THE ILLUSTRATIONS

FIG. 3 is a front illustration of the FSW machine shown in FIG. 2.

FIG. 4 is an isometric illustration of a weld head forming part of the FSW machine illustrated in FIGS. 2 and 3.

FIGS. 14a-14c, taken together, form a table of command parameters which identifies their use in each of the subroutines.

FIGS. 15a-15c, taken together, form a table of the primary measurement parameters, illustrating their use in each of the subroutines.

FIGS. 16a-16c, taken together, form a table illustrating the process limits and their use in each of the subroutines.

FIGS. 17a-17b, taken together, form a table illustrating the functional parameters used in the process control system.

Figure 18:
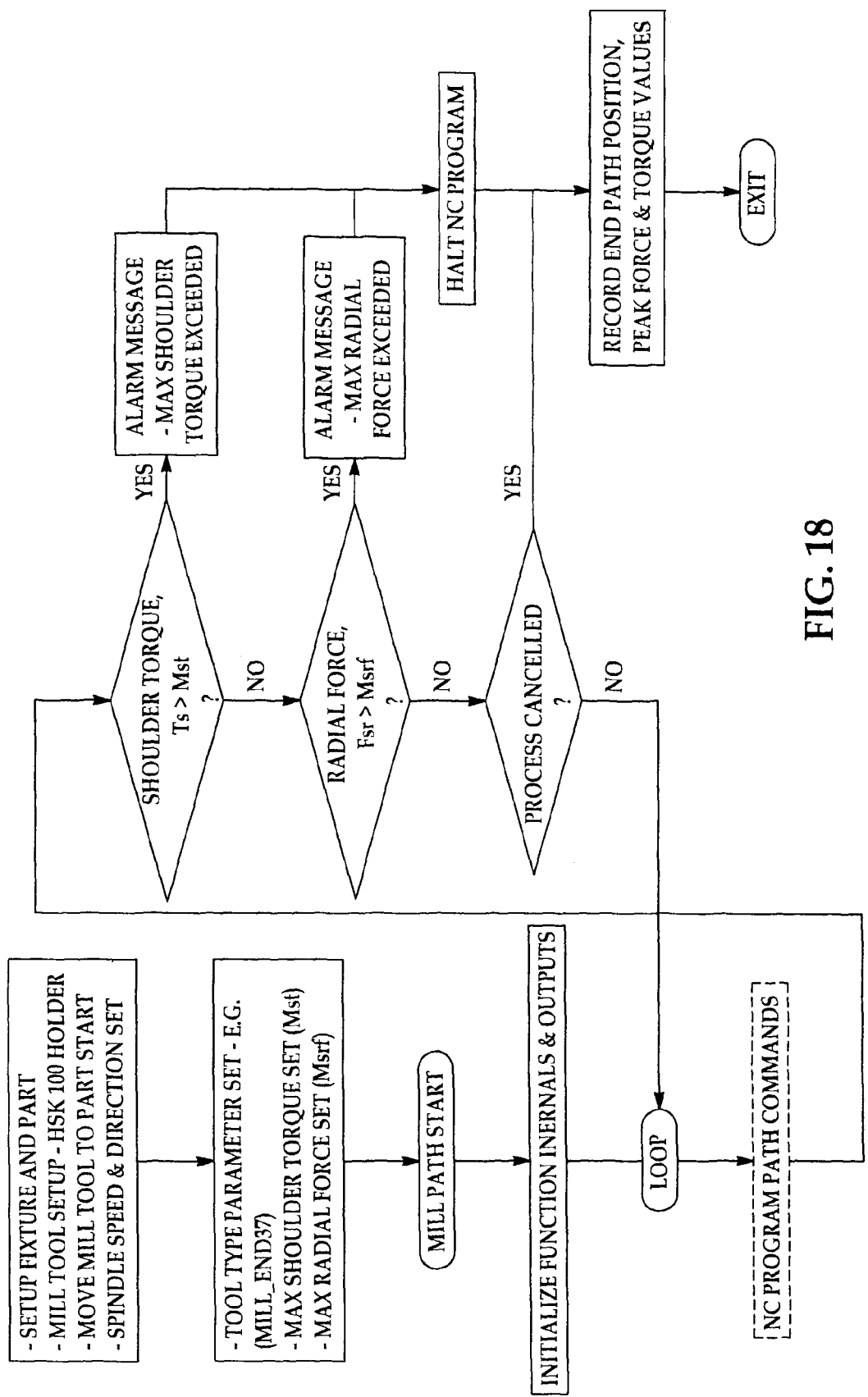

FIG. 18 is a flow diagram illustrating the logic used to perform a milling operation using the FSW shoulder spindle.

Figure 19B:
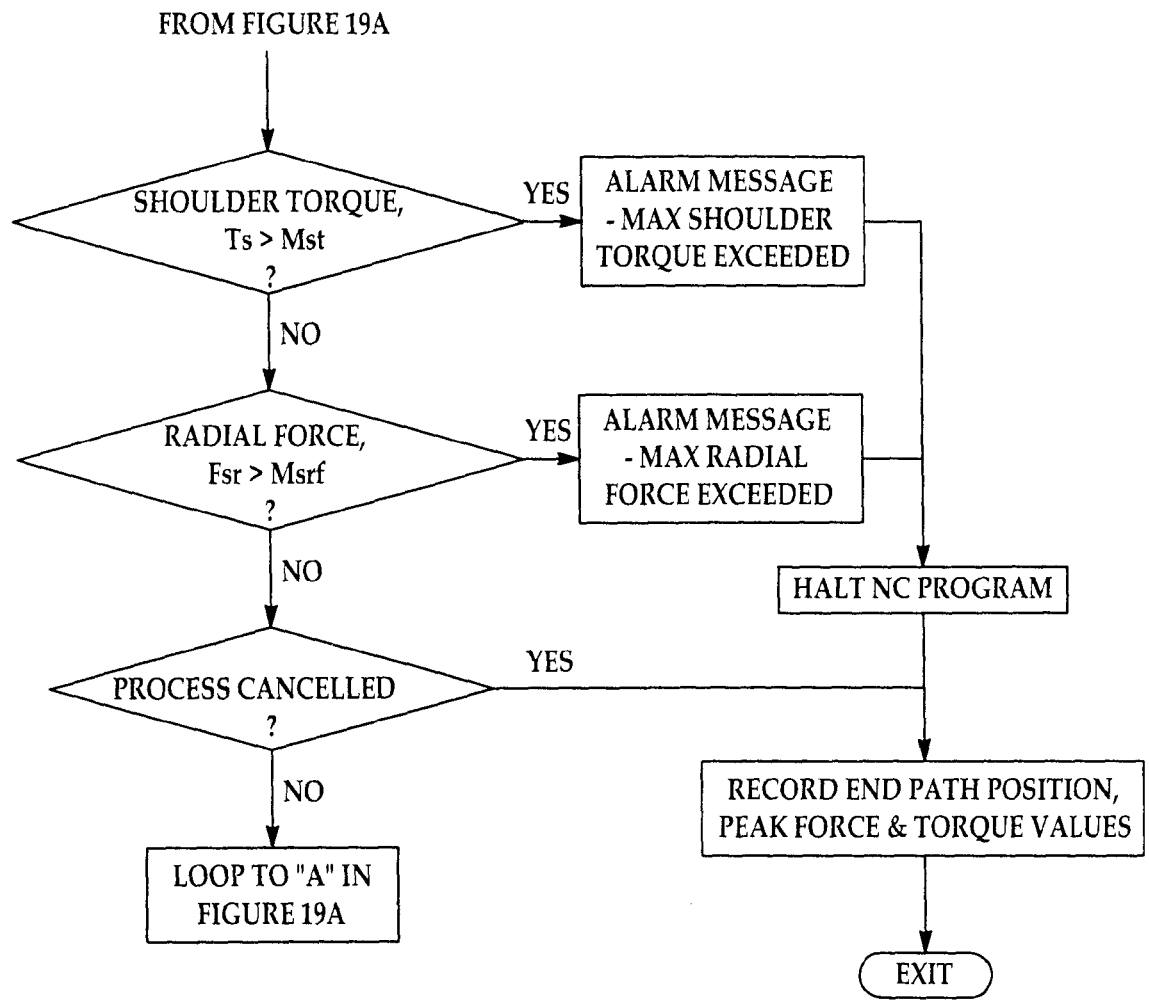
Figure 20A:
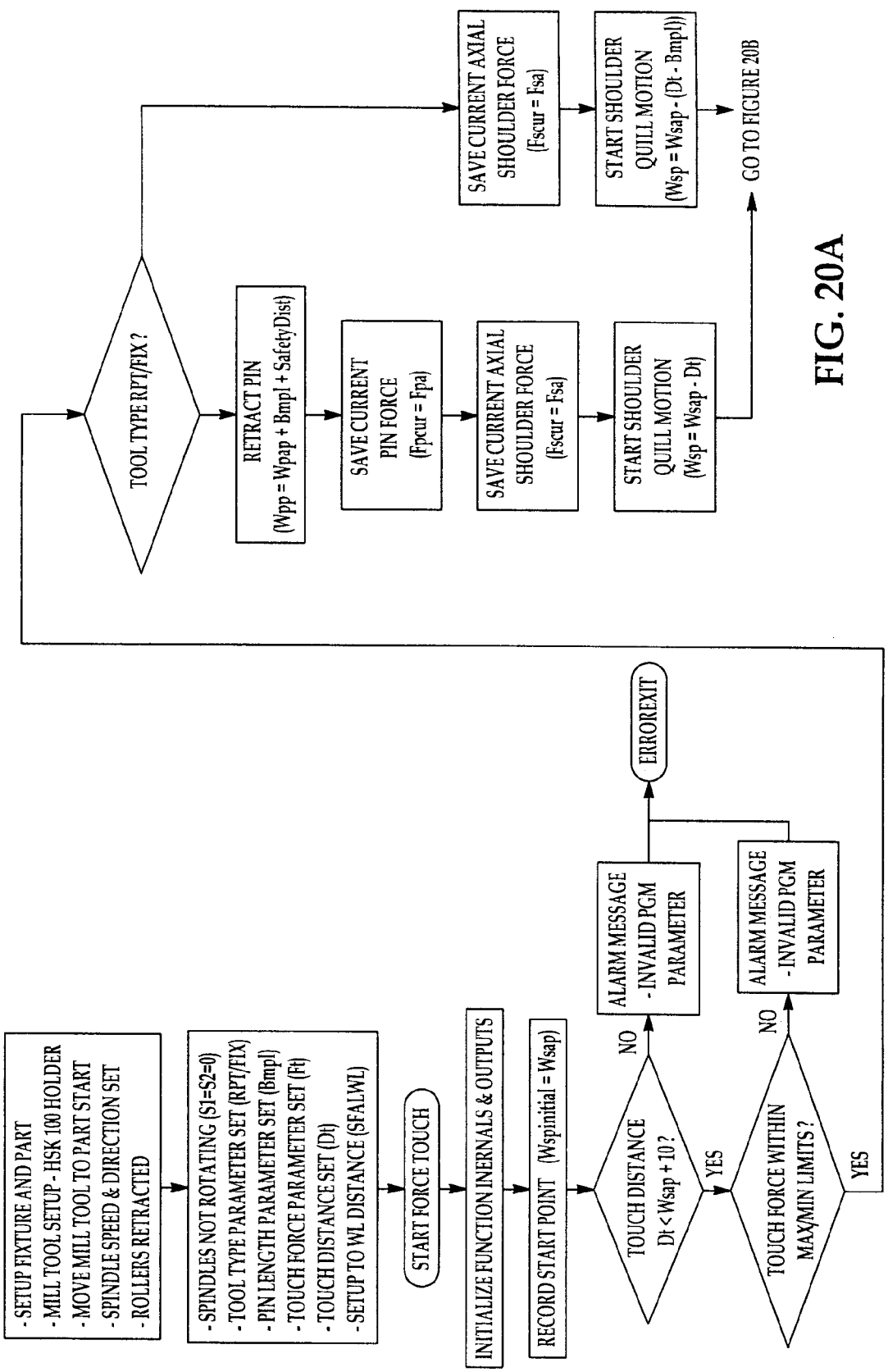
Figure 20B:
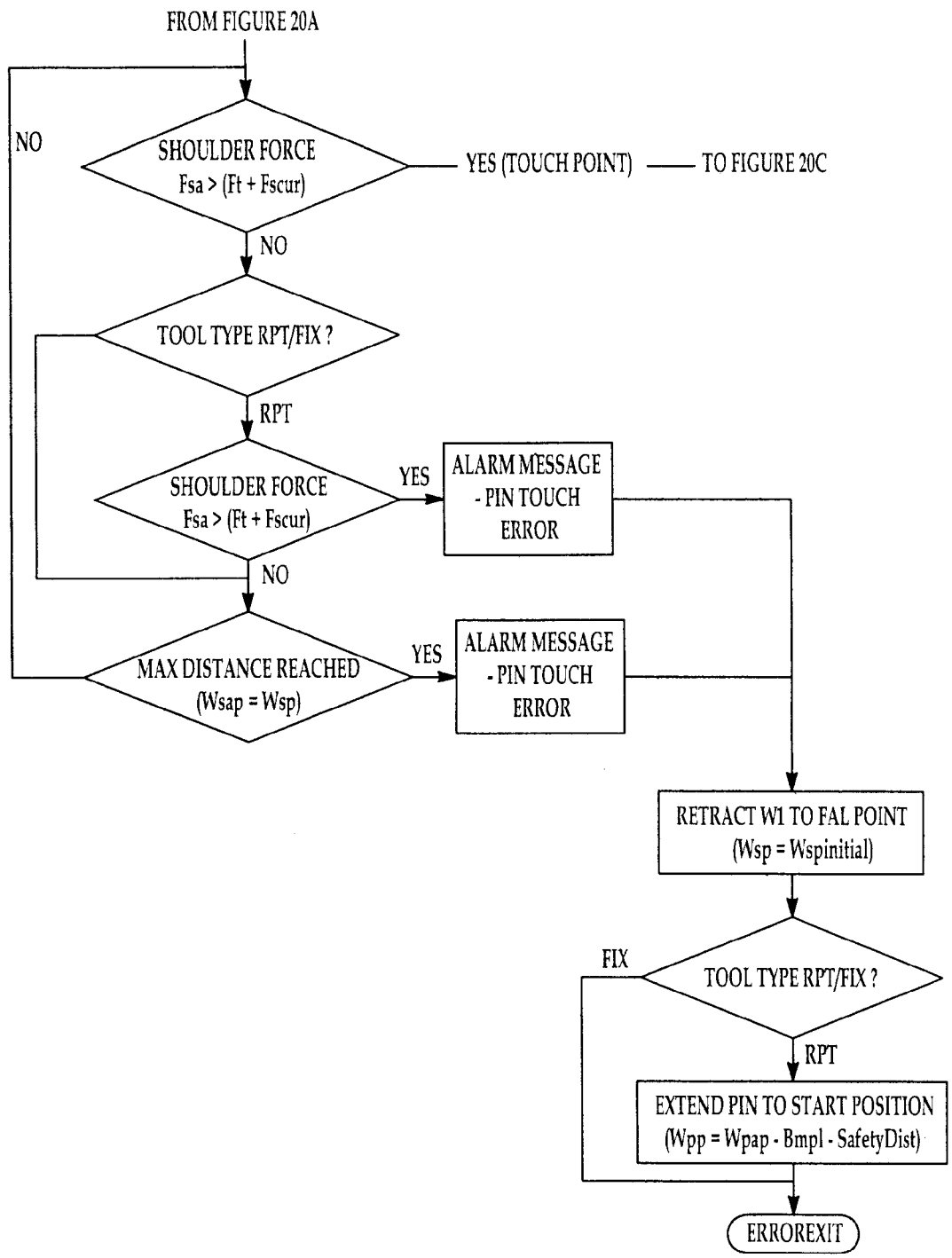
Figure 20C:
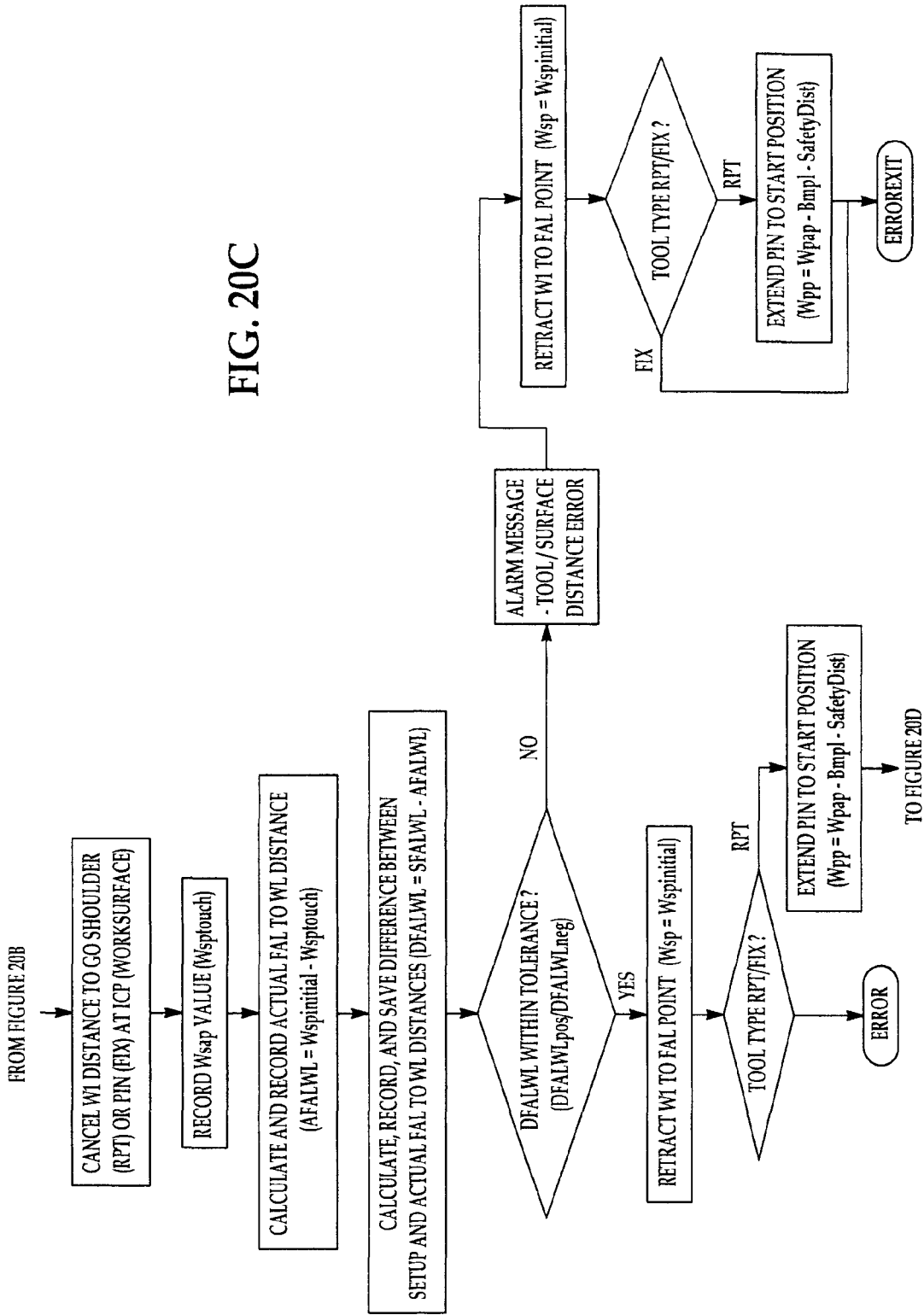
Figure 20D:
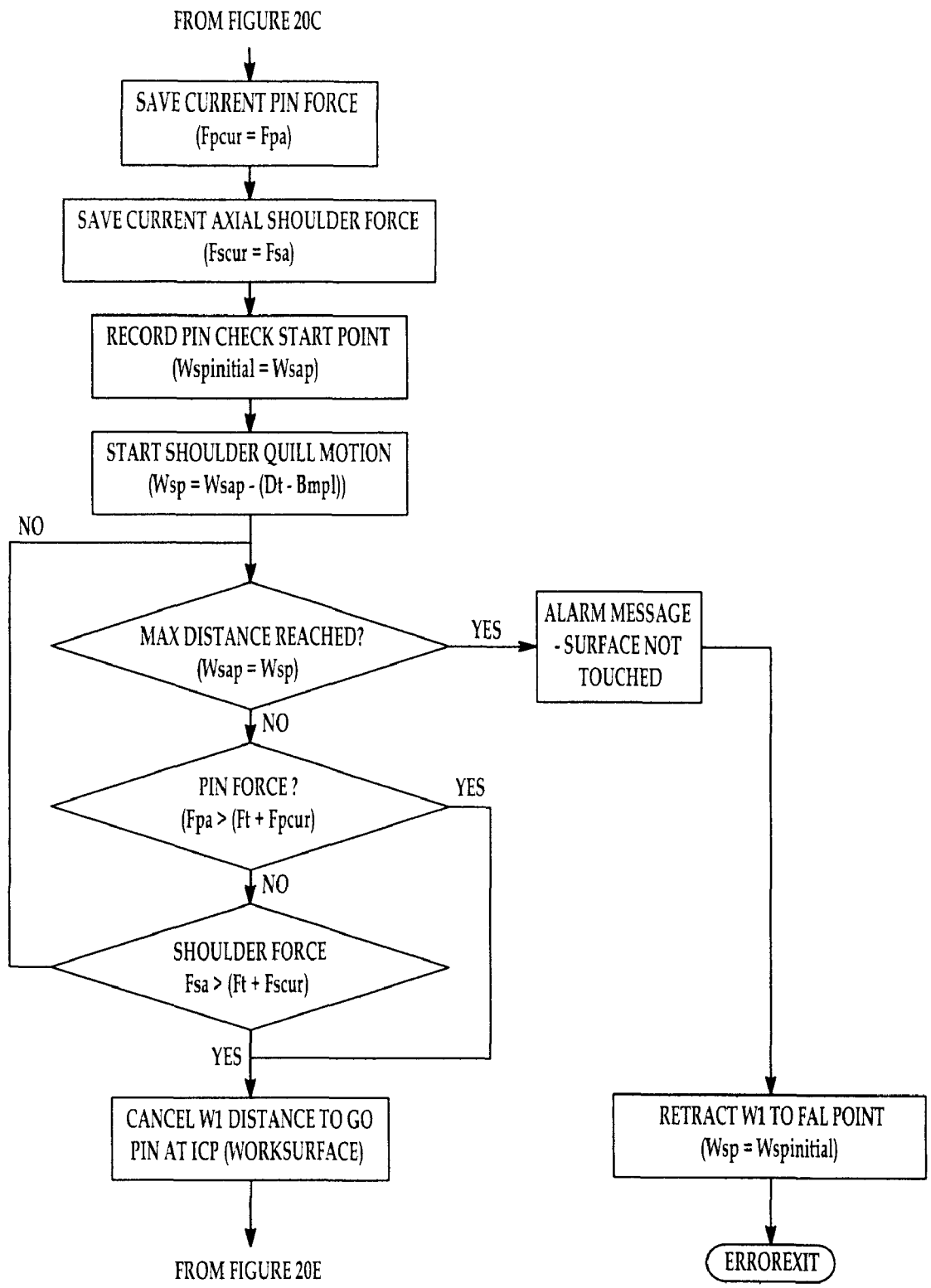
Figure 20E:
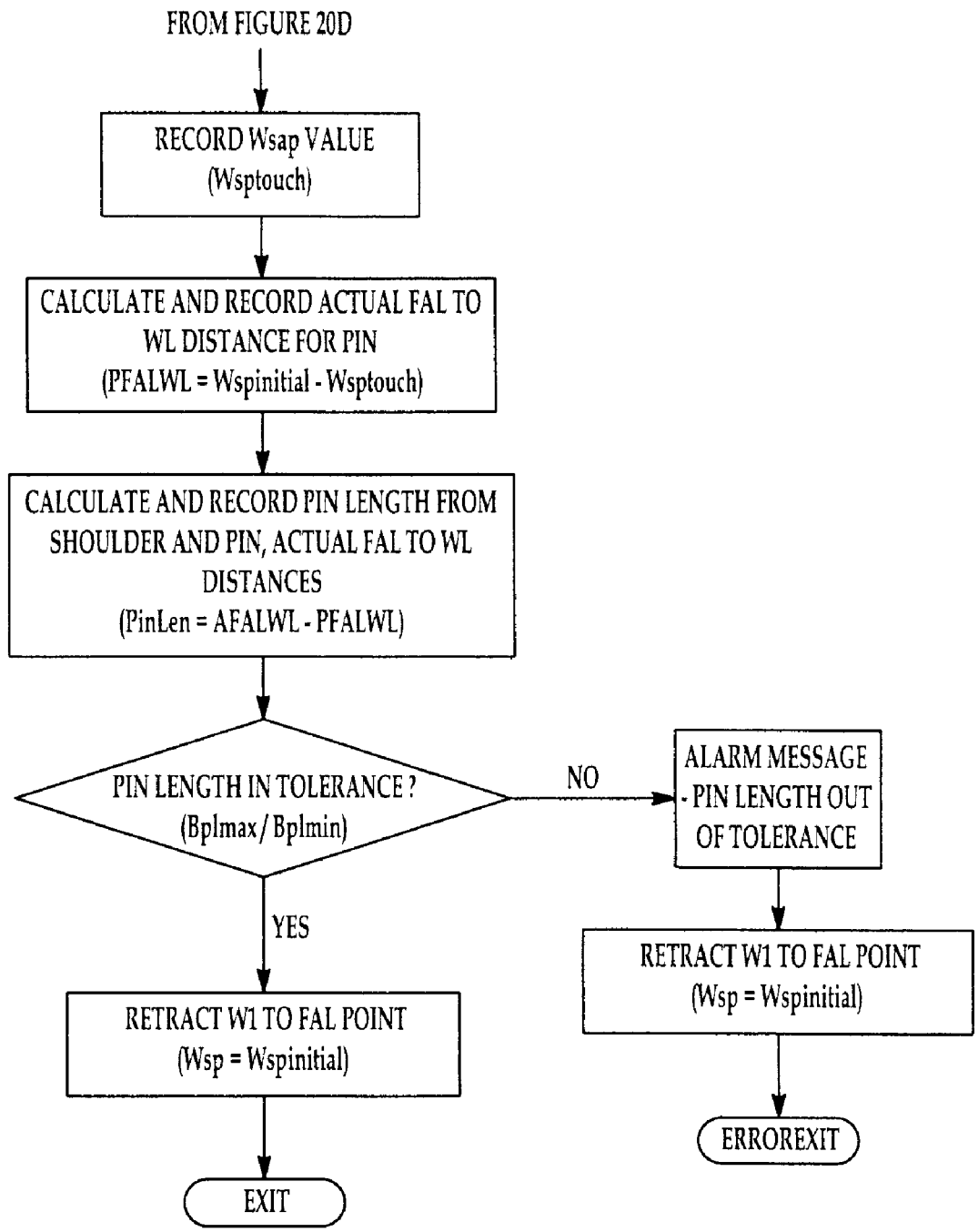
Figure 21A:
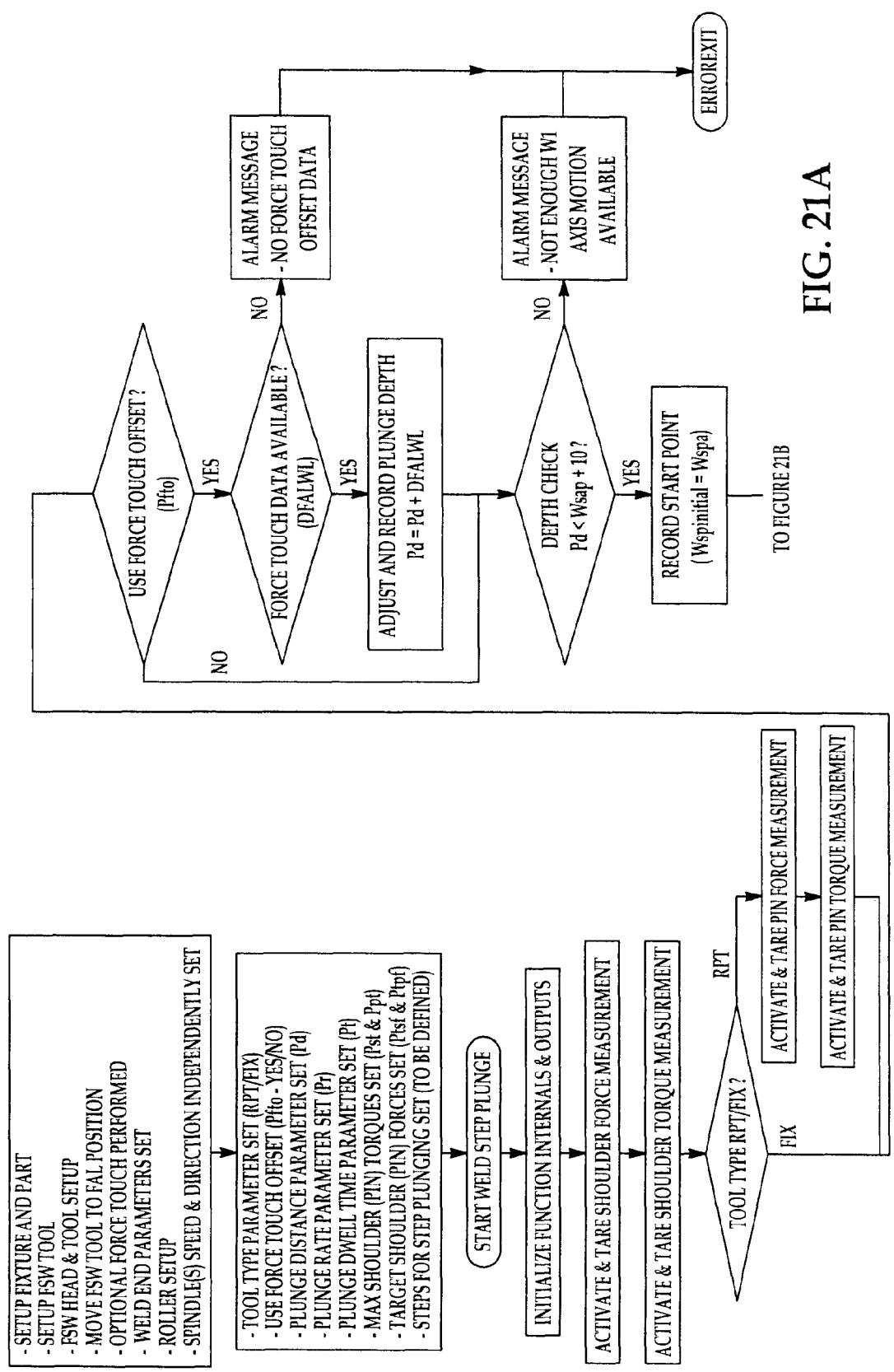
Figure 21B:
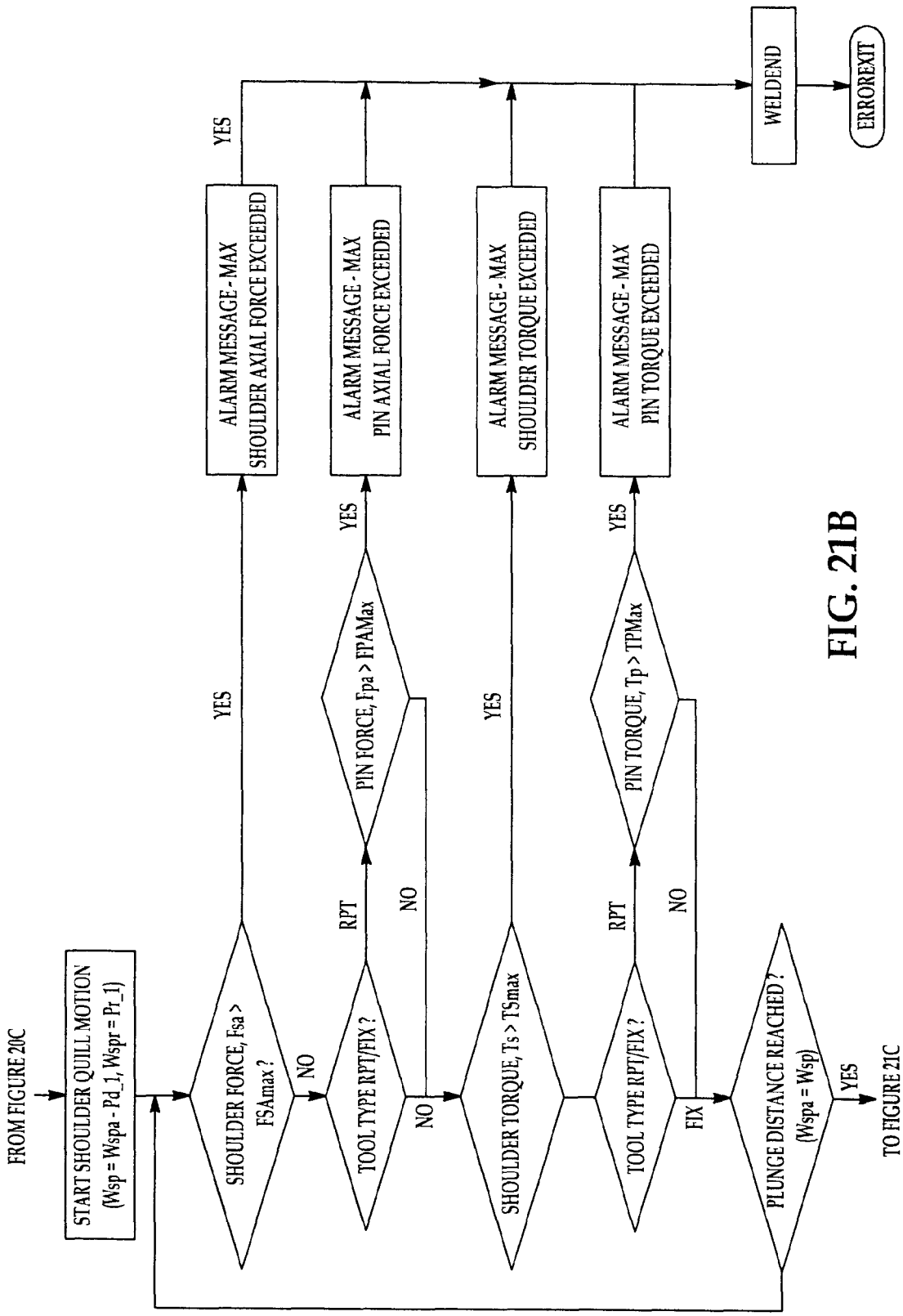
Figure 21C:
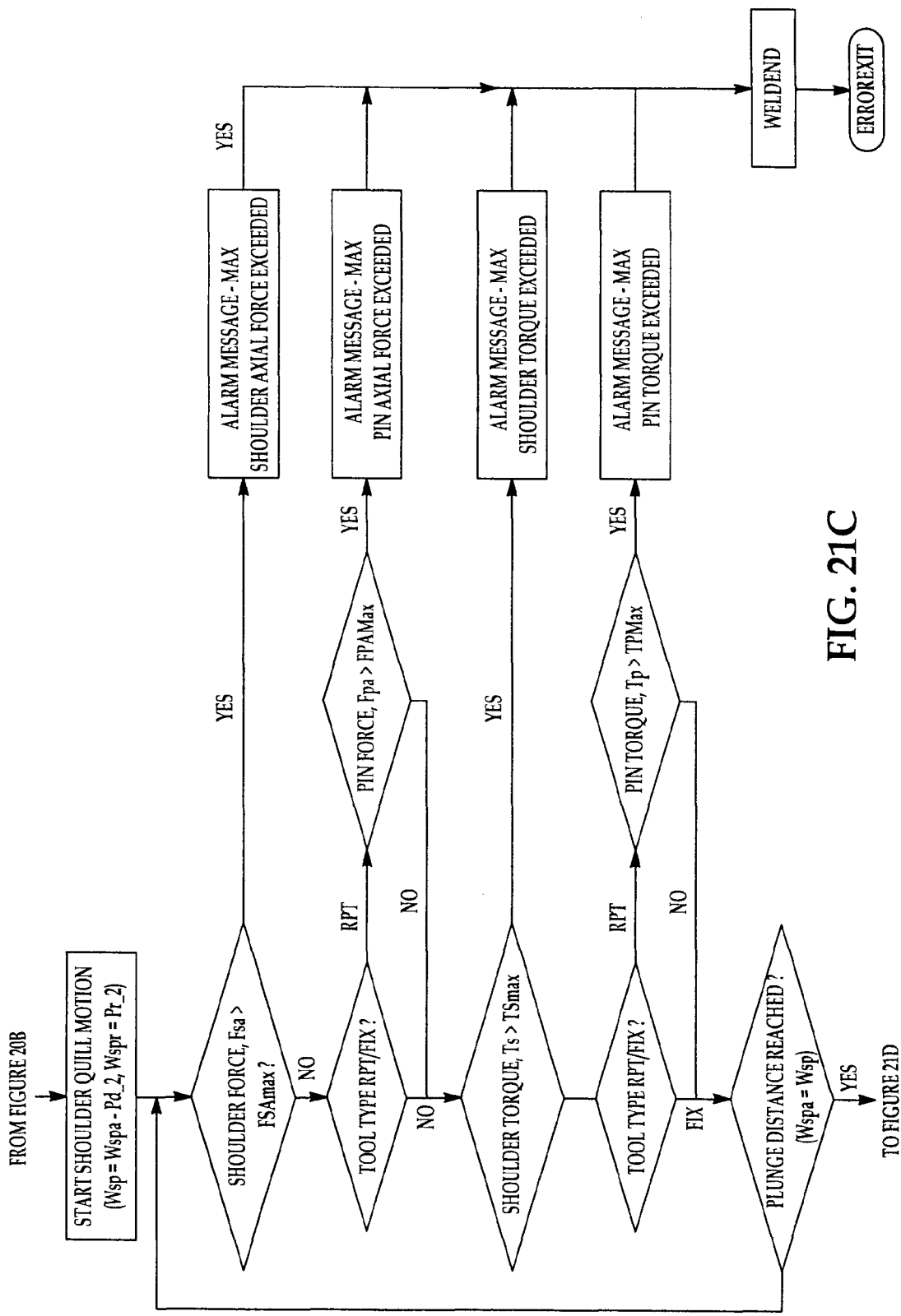
Figure 21D:
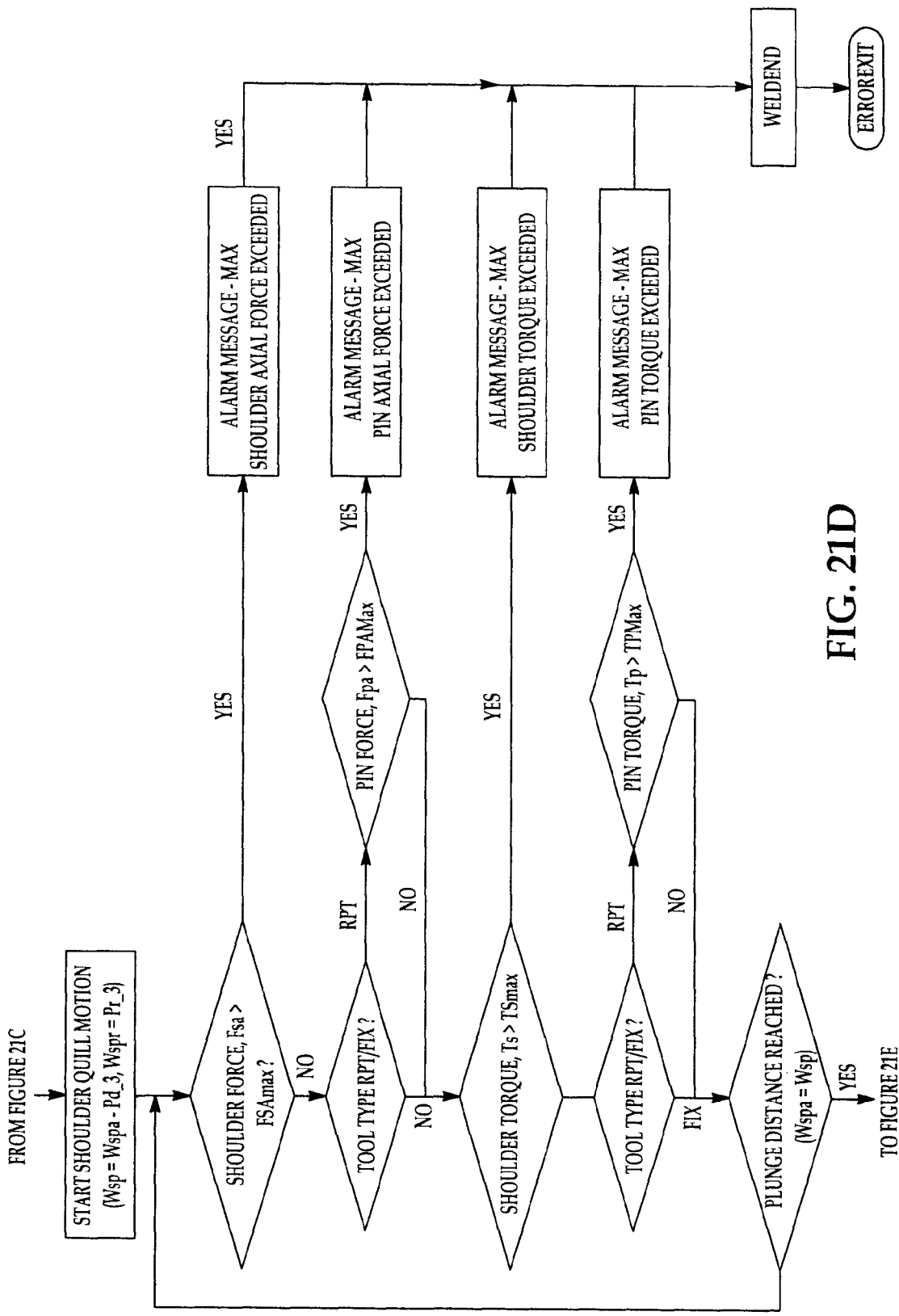
Figure 21E:
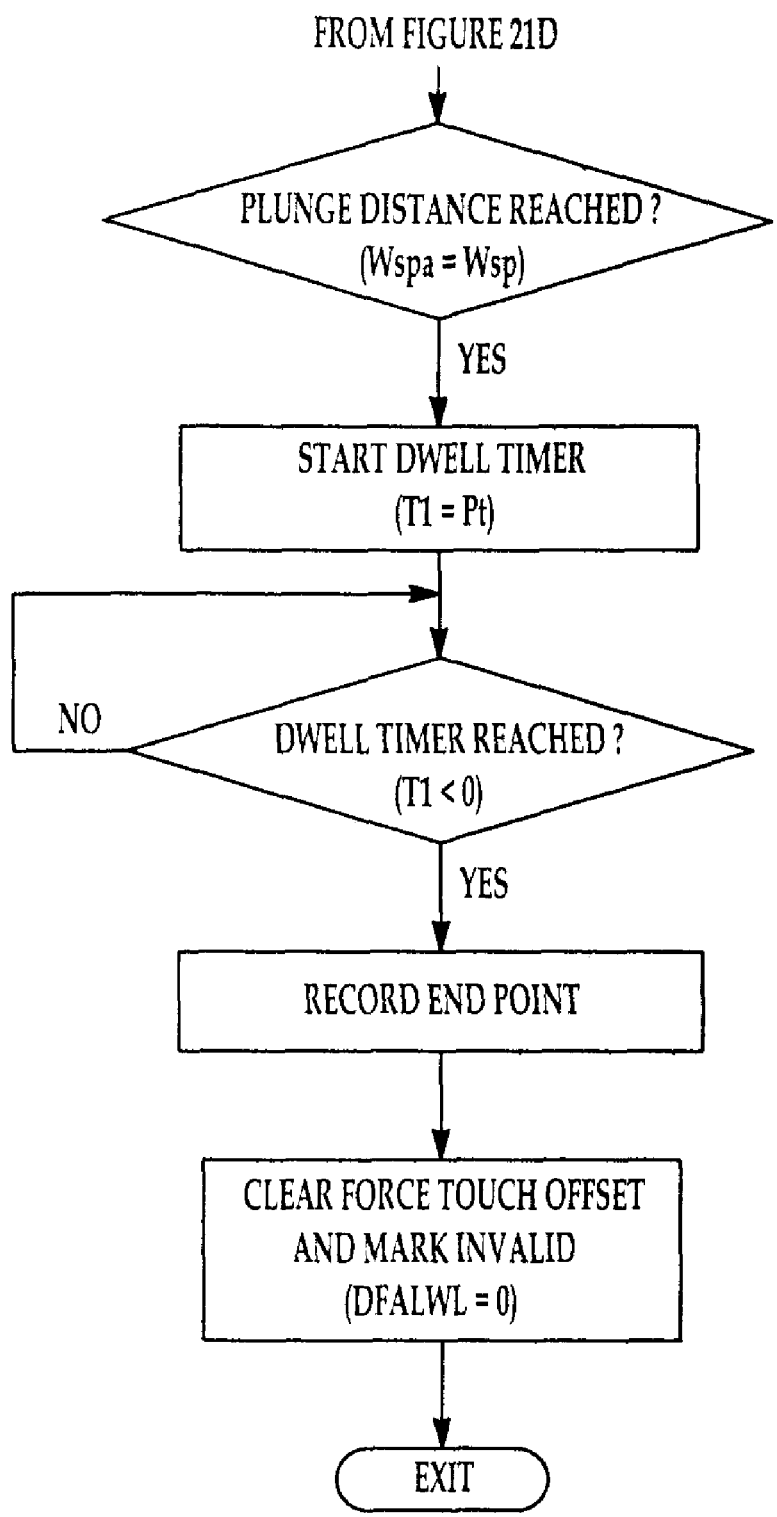

FIGS. 19a and 19b, taken together, form a flow diagram illustrating the process logic for performing an adaptive milling operation using the FSW shoulder spindle.

FIGS. 20a-20e, taken together, form a flow diagram illustrating a subroutine for determining the correct plunge distance for a weld plunge operation.

FIGS. 21a-21e, taken together, form a flow diagram illustrating a subroutine for performing a position controlled weld plunge at an adaptive feed rate determined by axial force.

Figure 22A:
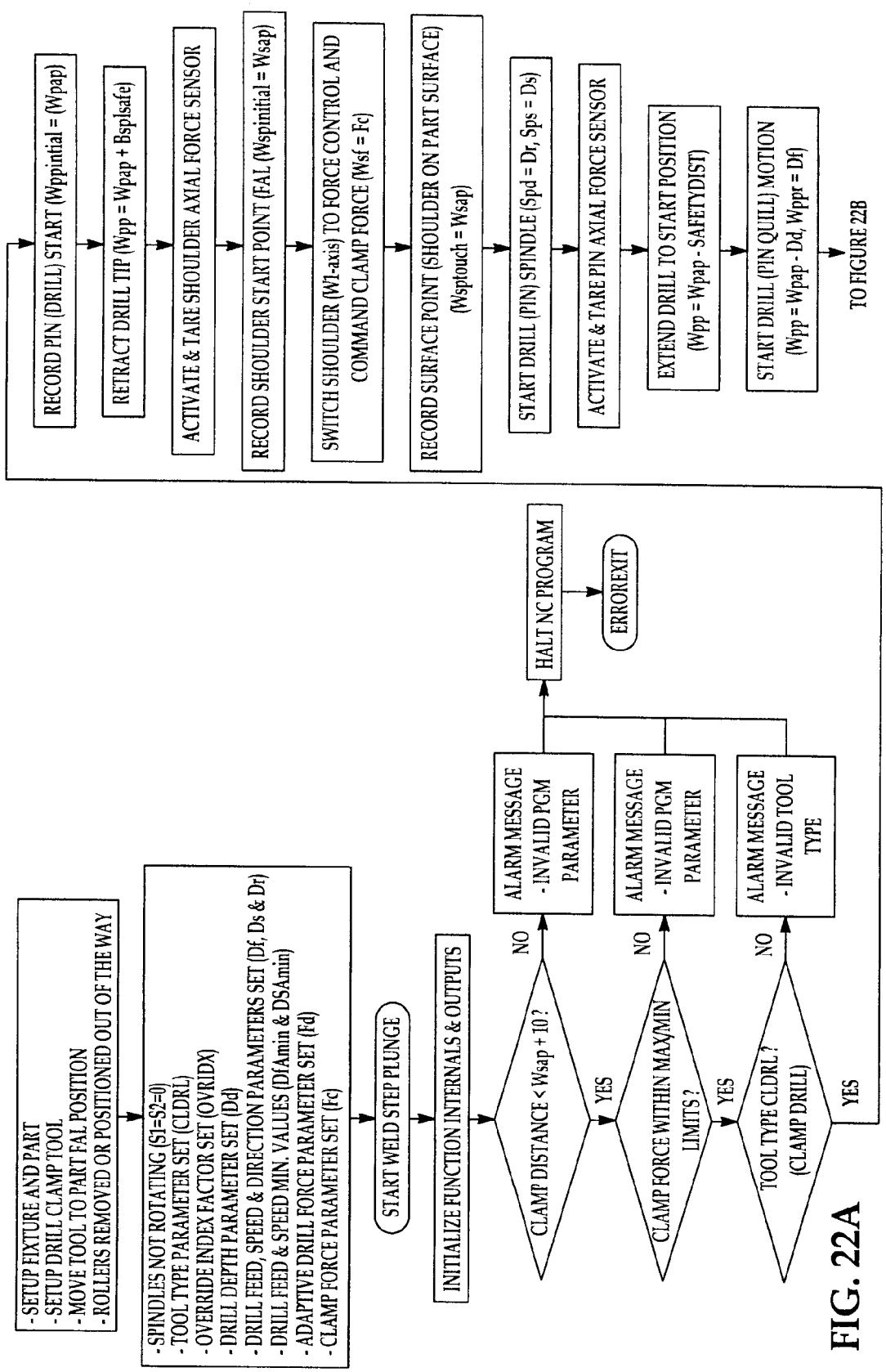
Figure 22B:
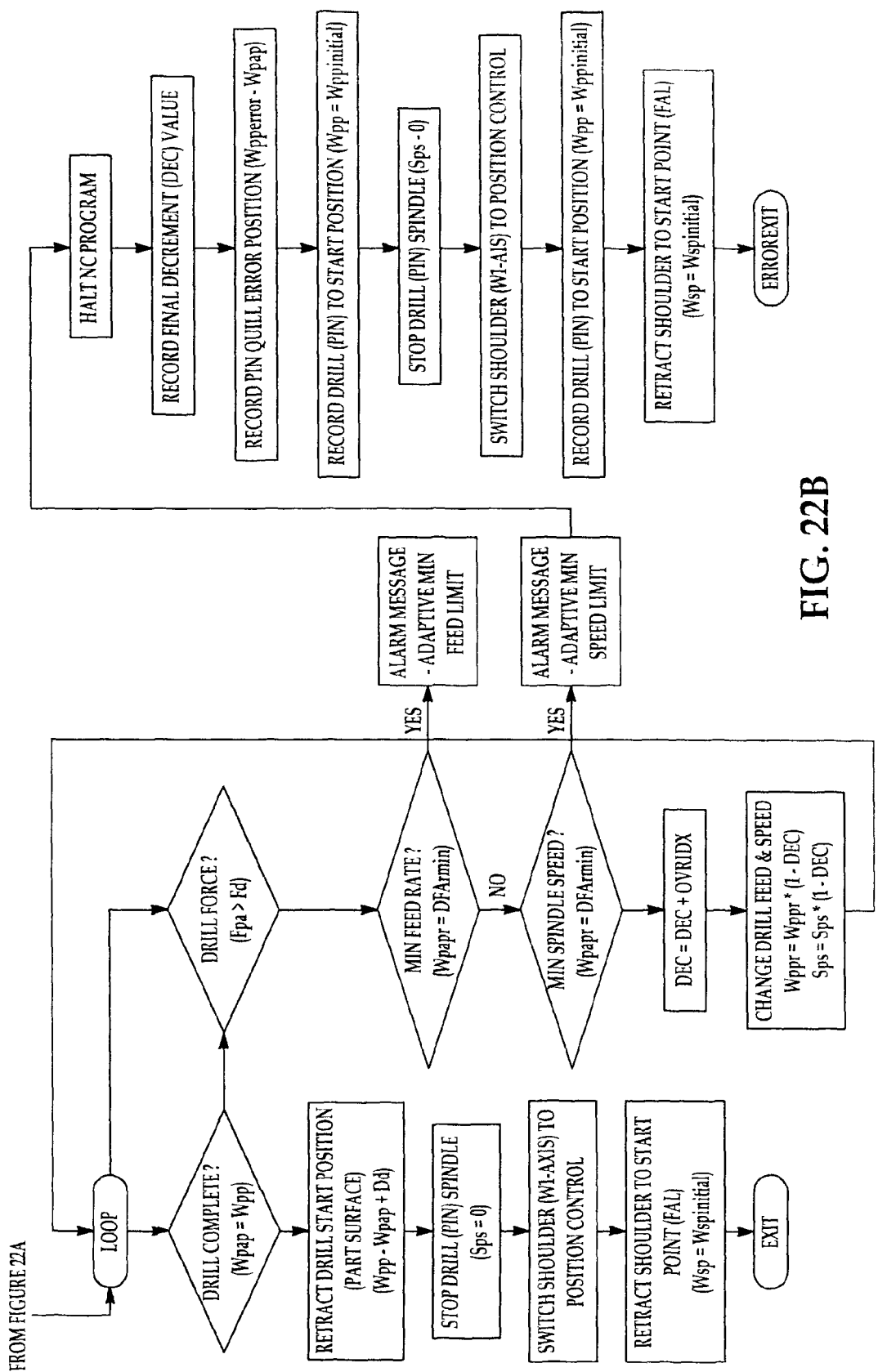

FIGS. 22a-22b, taken together, form a flow diagram illustrating a subroutine for performing adaptive drilling using clamp force provided by the shoulder tool.

Figure 23:
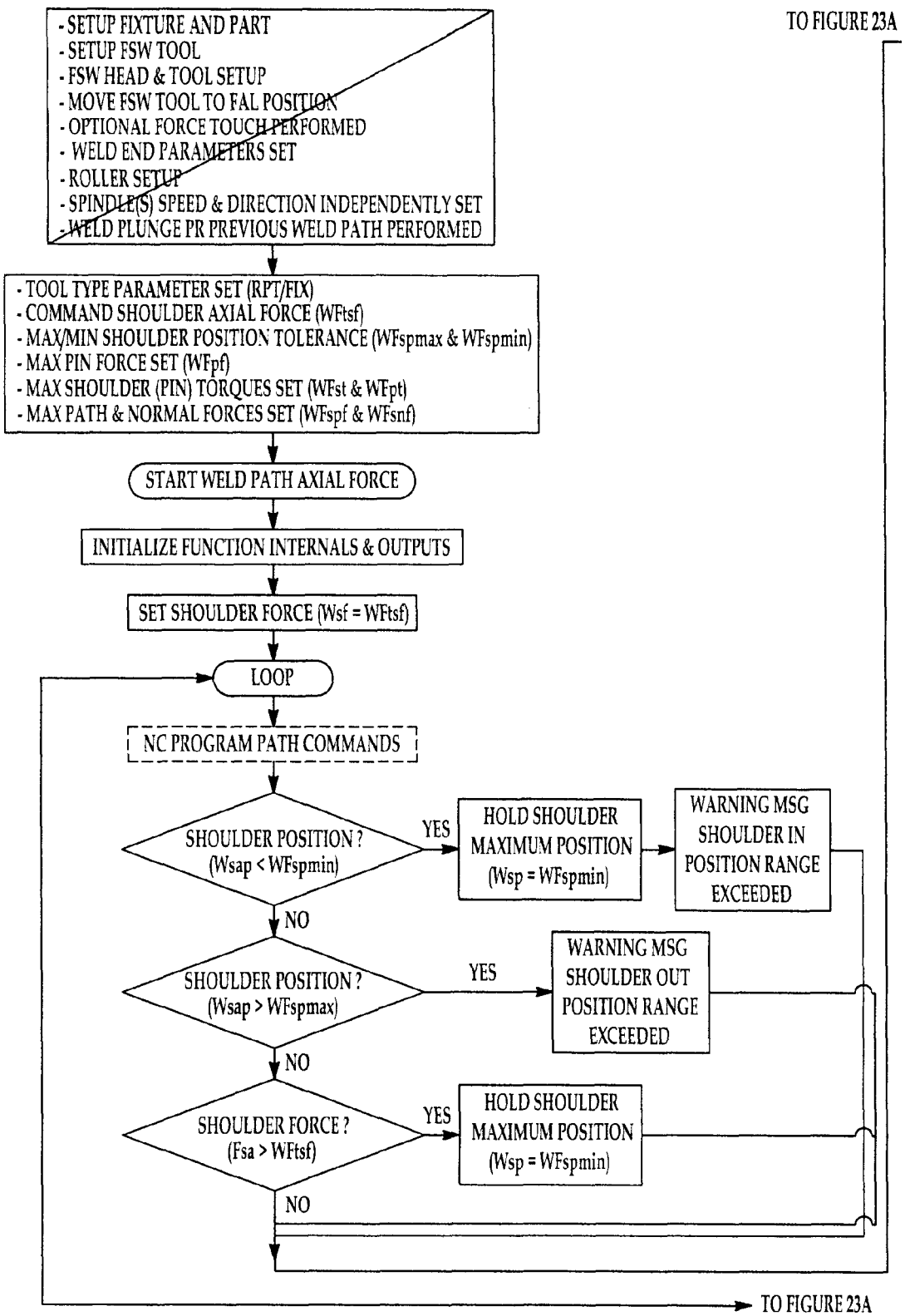
Figure 23A:
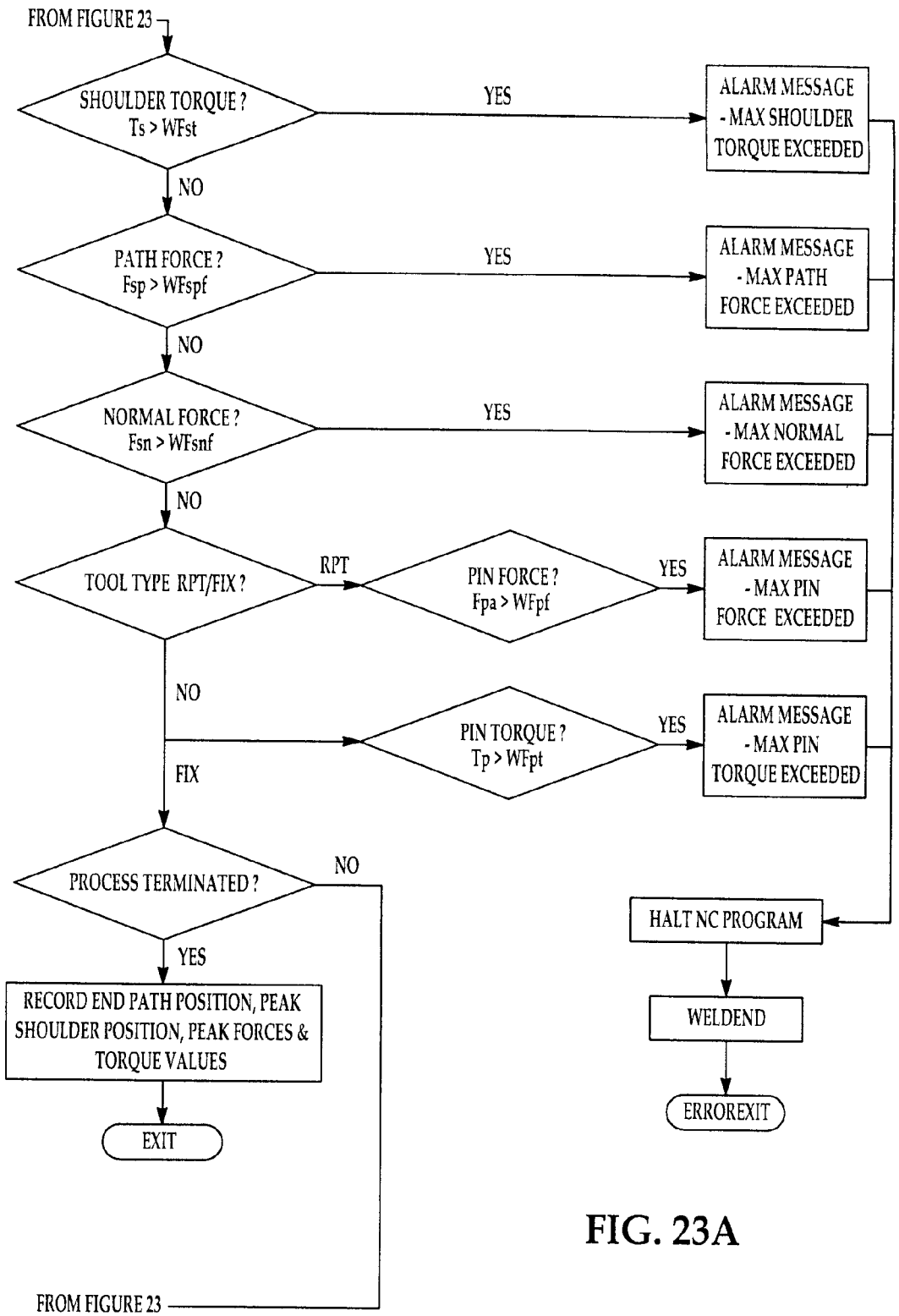

FIG. 23 is a flow diagram illustrating a subroutine for performing path welding with shoulder axial force control.

Figure 24A:
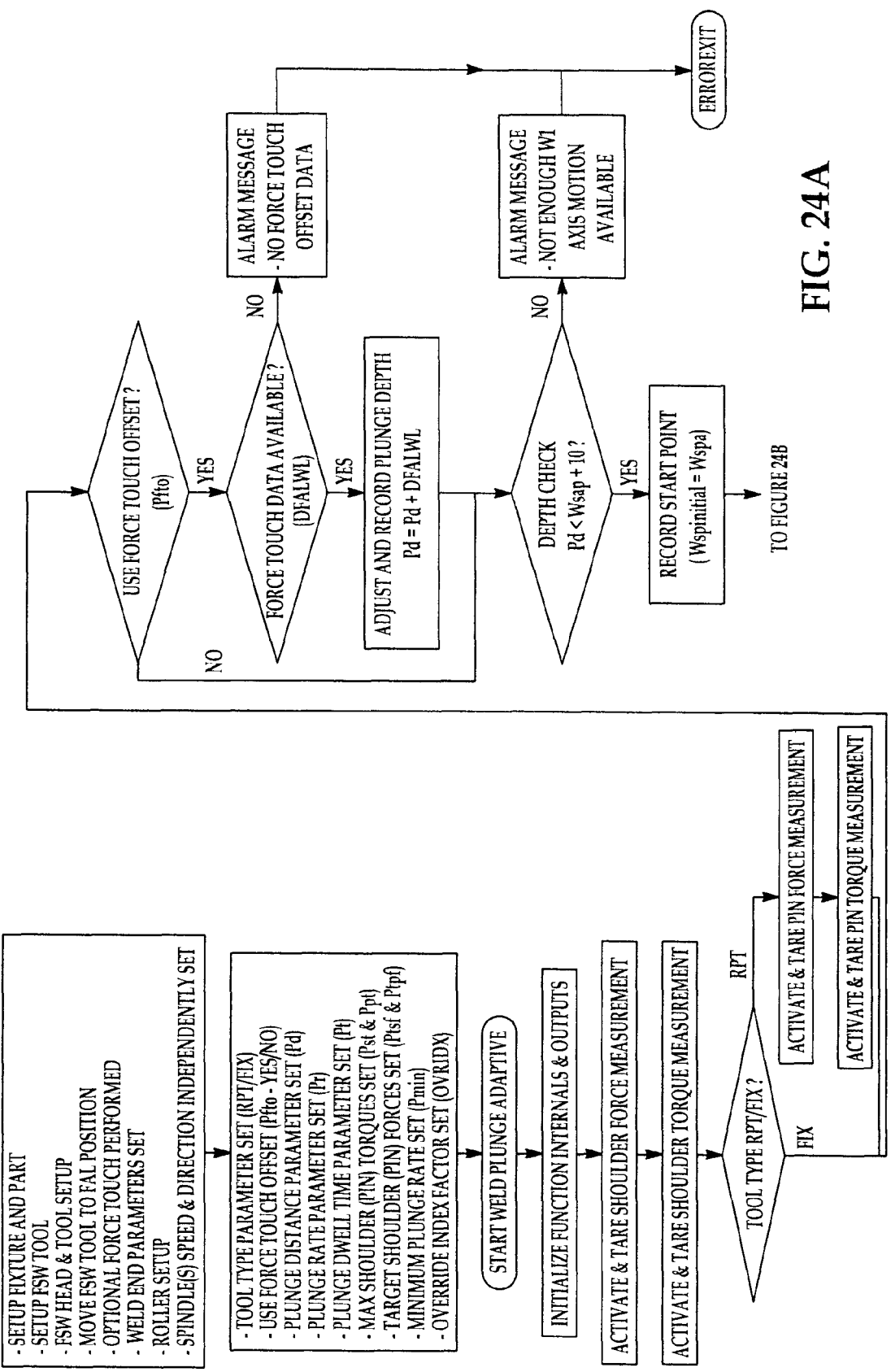

FIGS. 24a-24b, taken together, form a flow diagram illustrating a subroutine for performing position controlled weld plunge at an adaptive feed rate determined by axial force.

Figure 25:
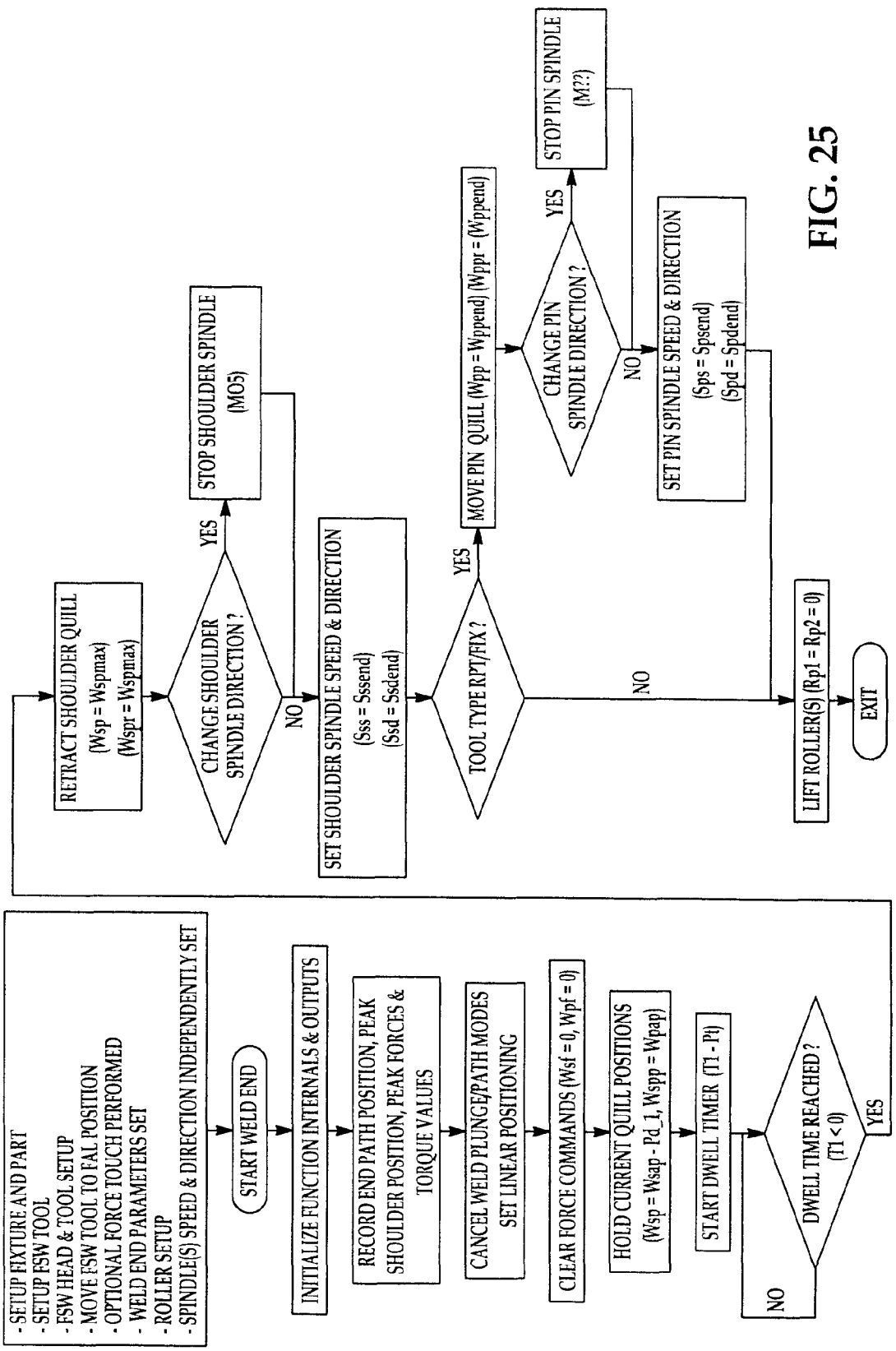

FIG. 25 is a flow diagram illustrating a subroutine for terminating a welding process.

Figure 26B:
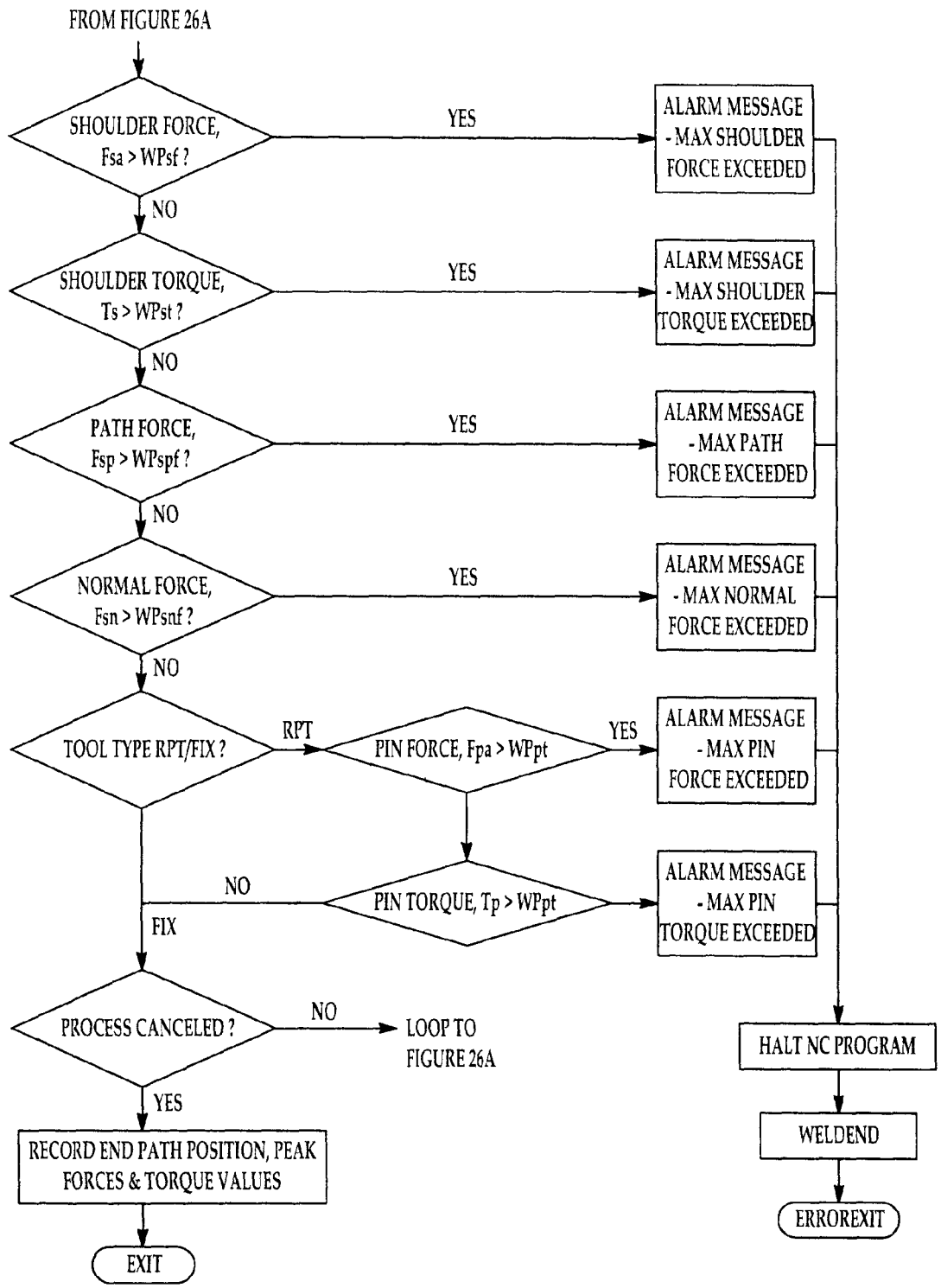

FIGS. 26a and 26b, taken together, form a flow diagram illustrating a subroutine for adaptive path welding using shoulder position control.

Figure 27A:
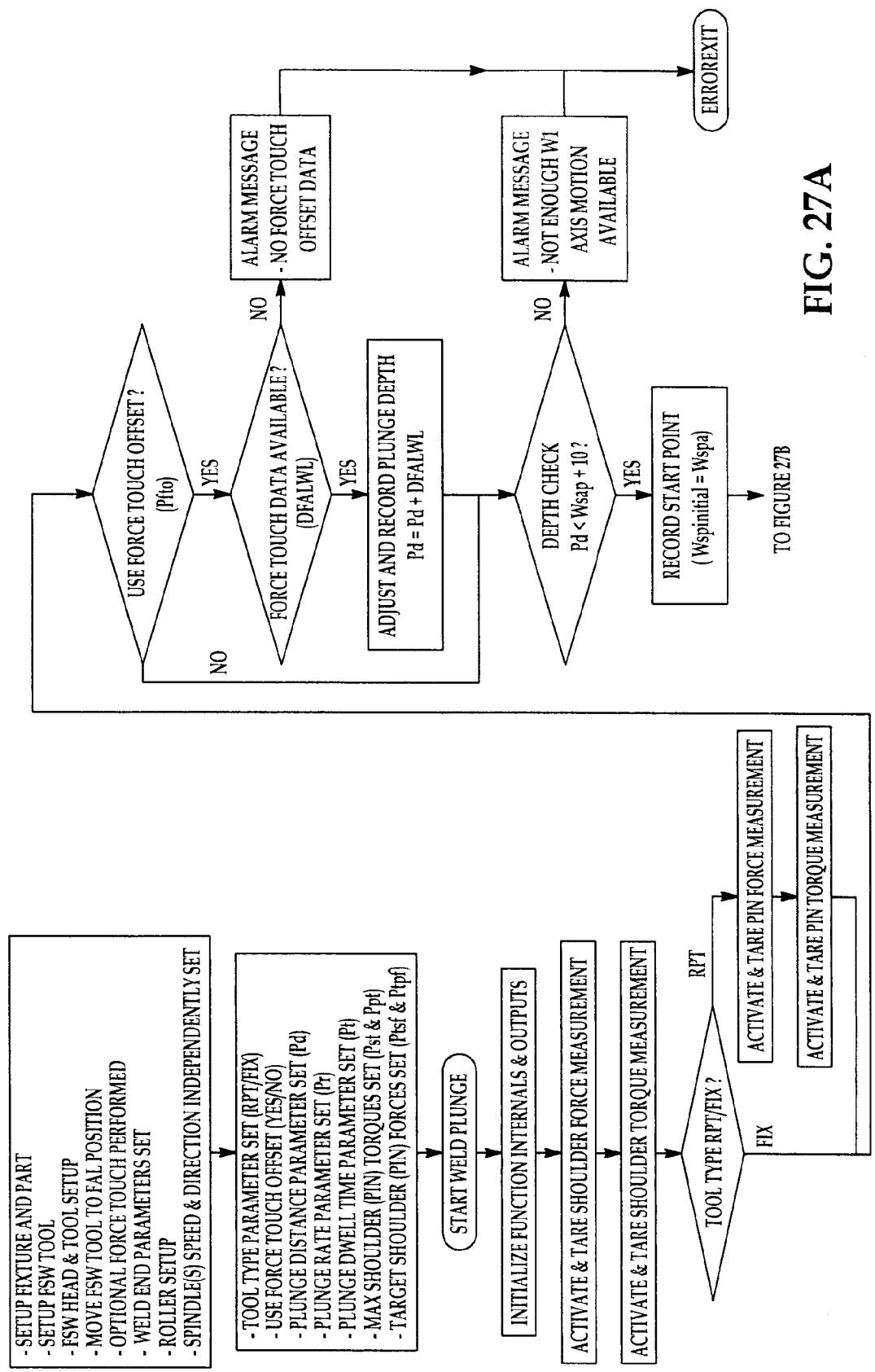
Figure 27B:
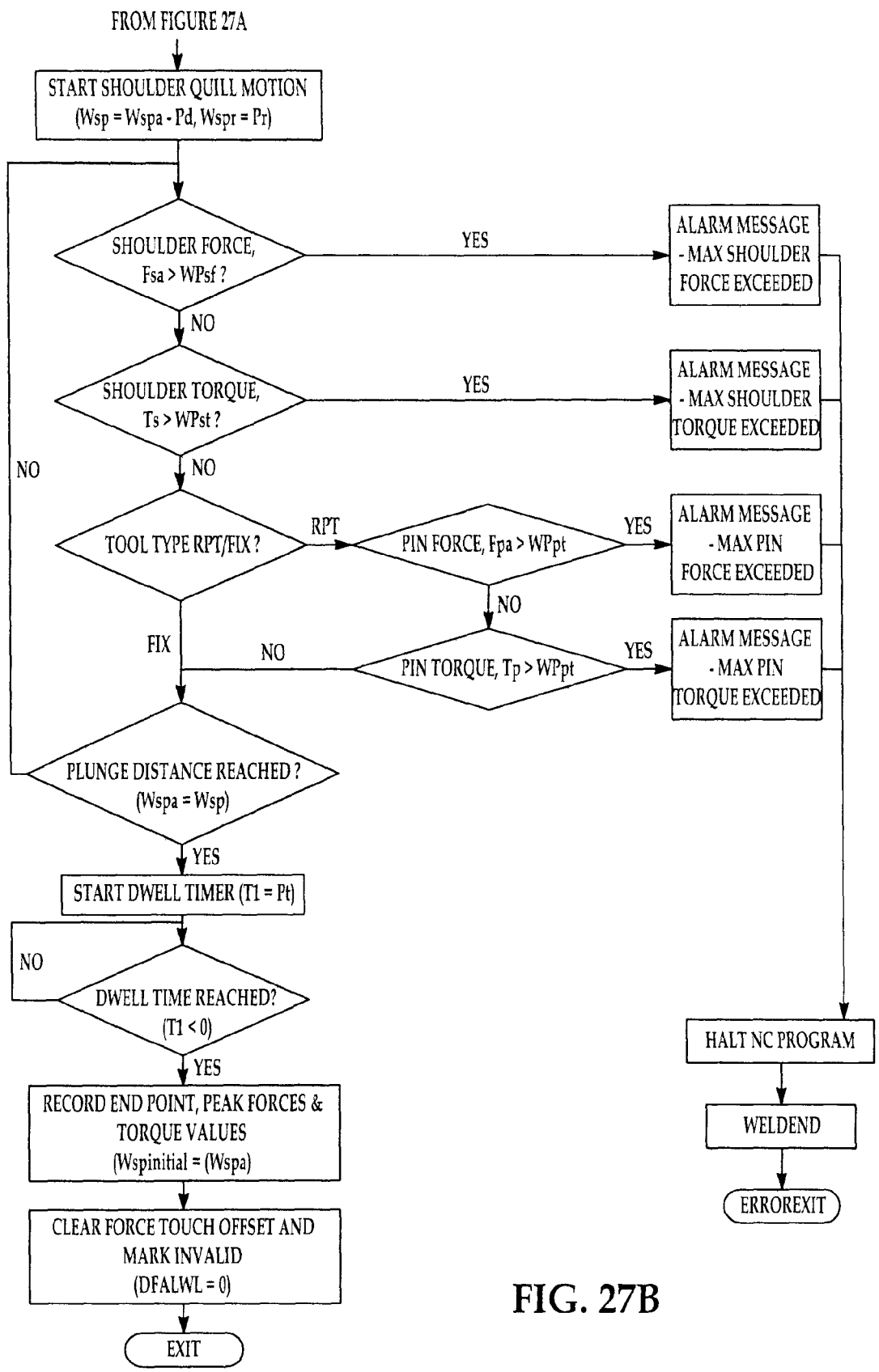

FIGS. 27a and 27b, taken together, form a flow diagram illustrating a subroutine for performing a position controlled weld plunge at a programmed feed rate.

Figure 28A:
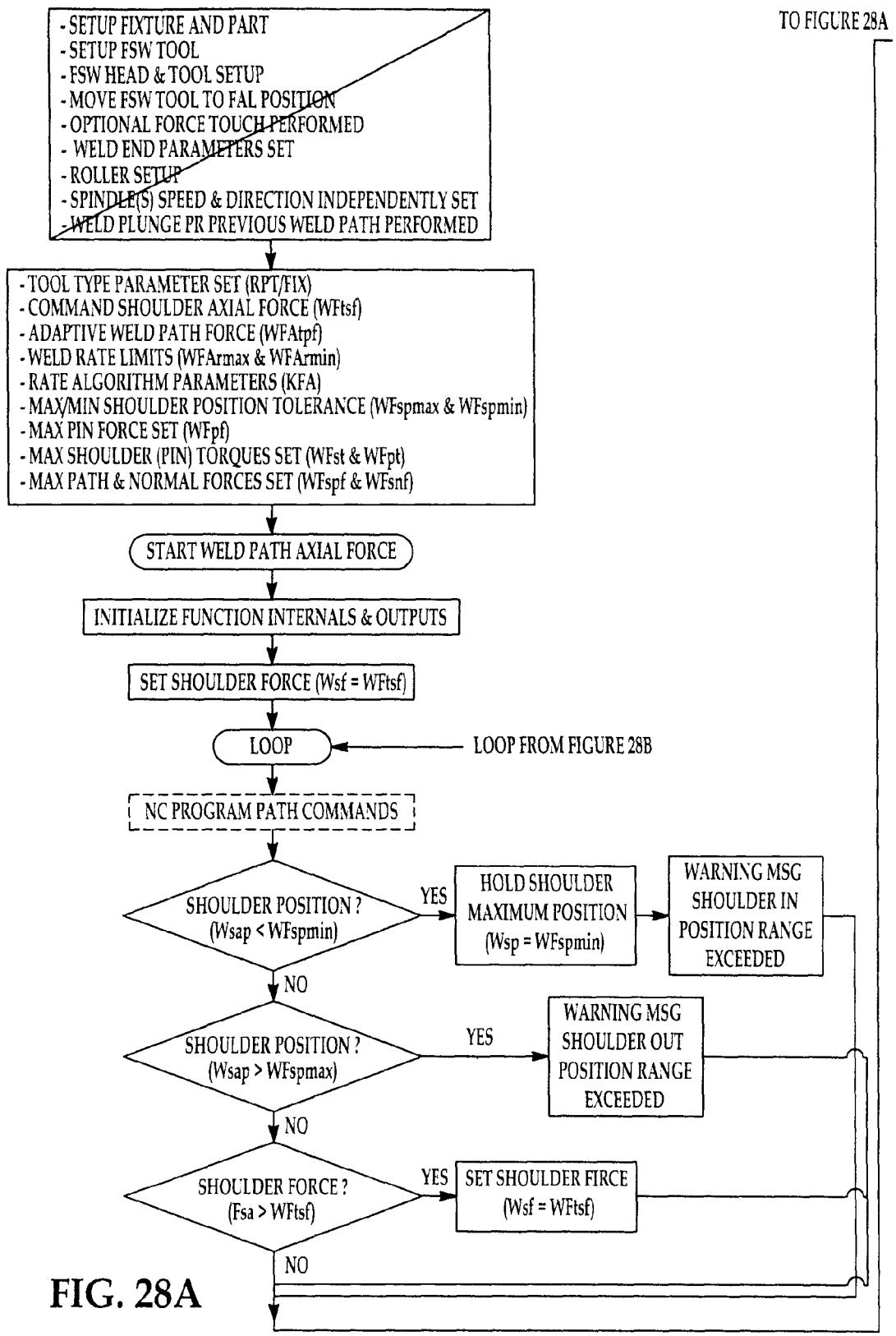
Figure 28A:
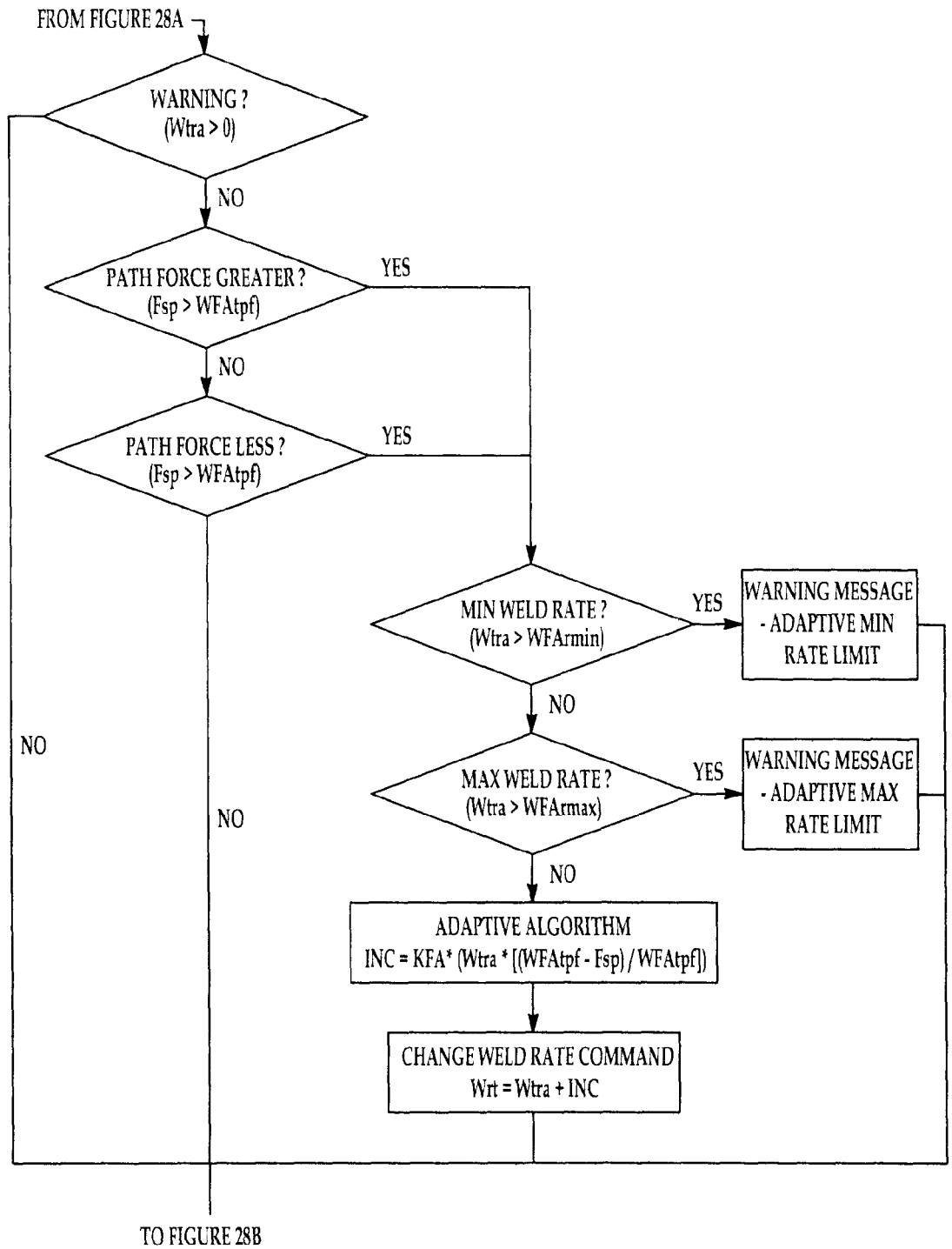
Figure 28B:
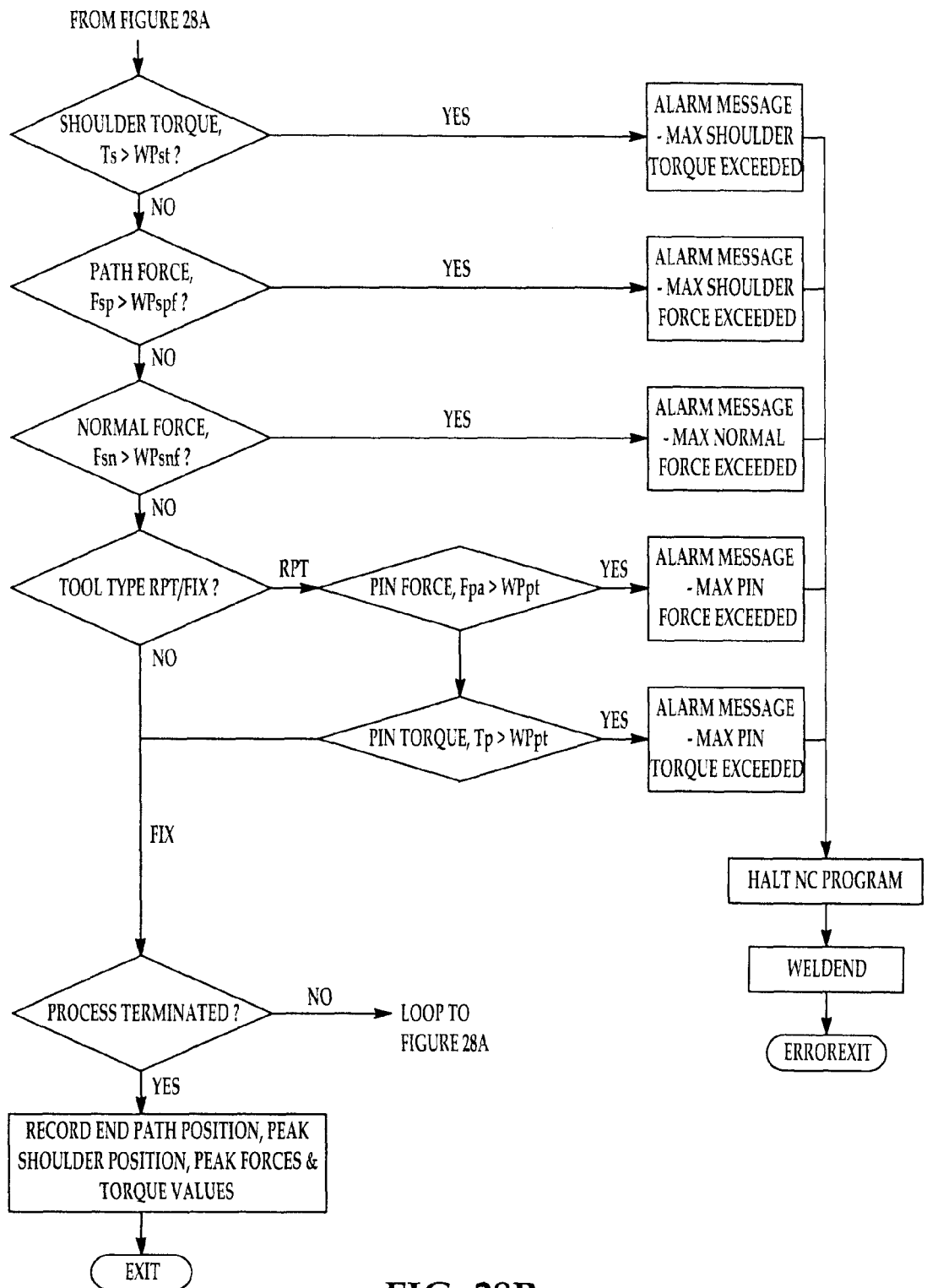

FIGS. 28a and 28b, taken together, form a flow diagram illustrating a subroutine for performing path welding using shoulder axial force control.

Figure 29:
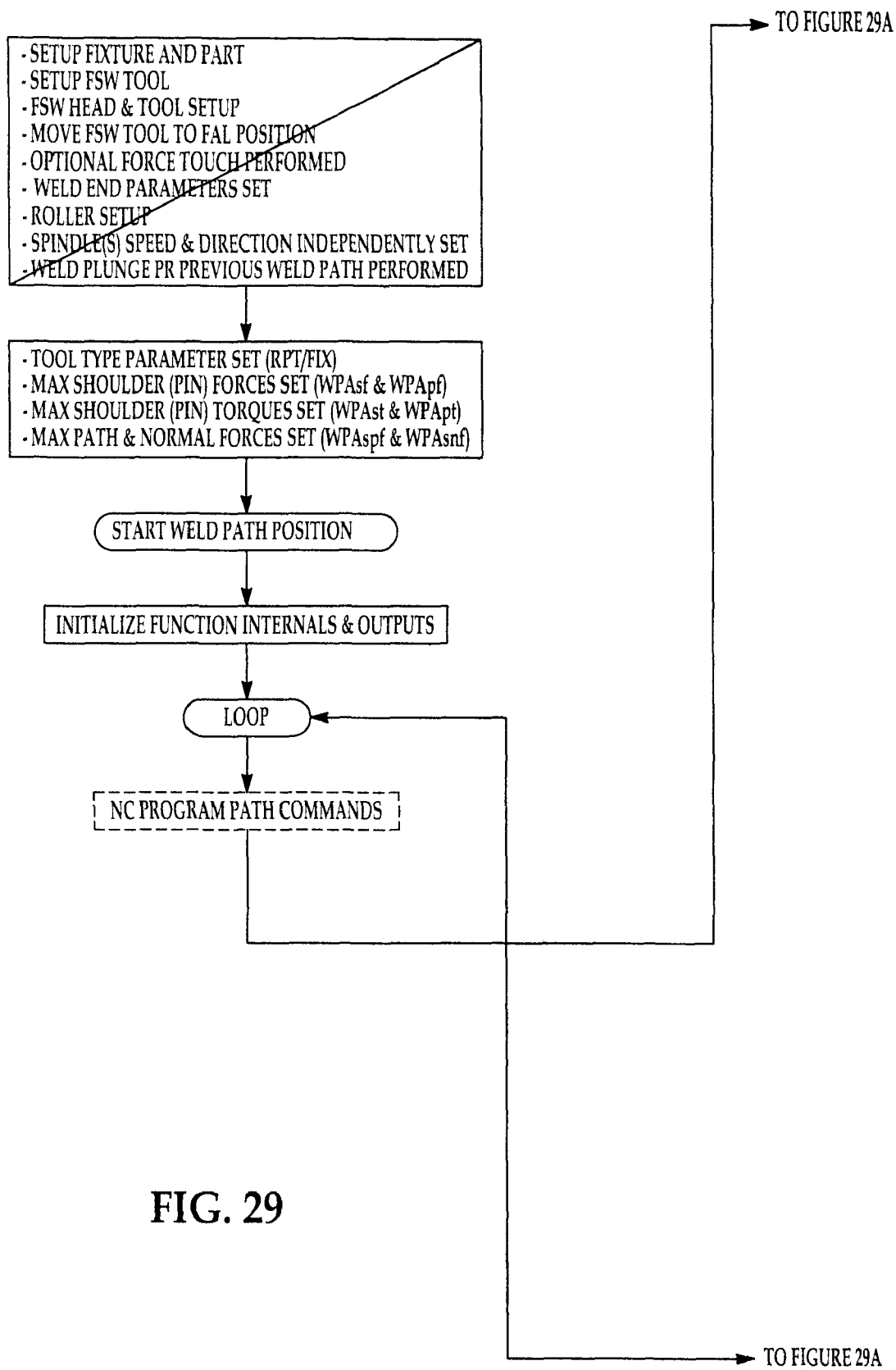
Figure 29A:
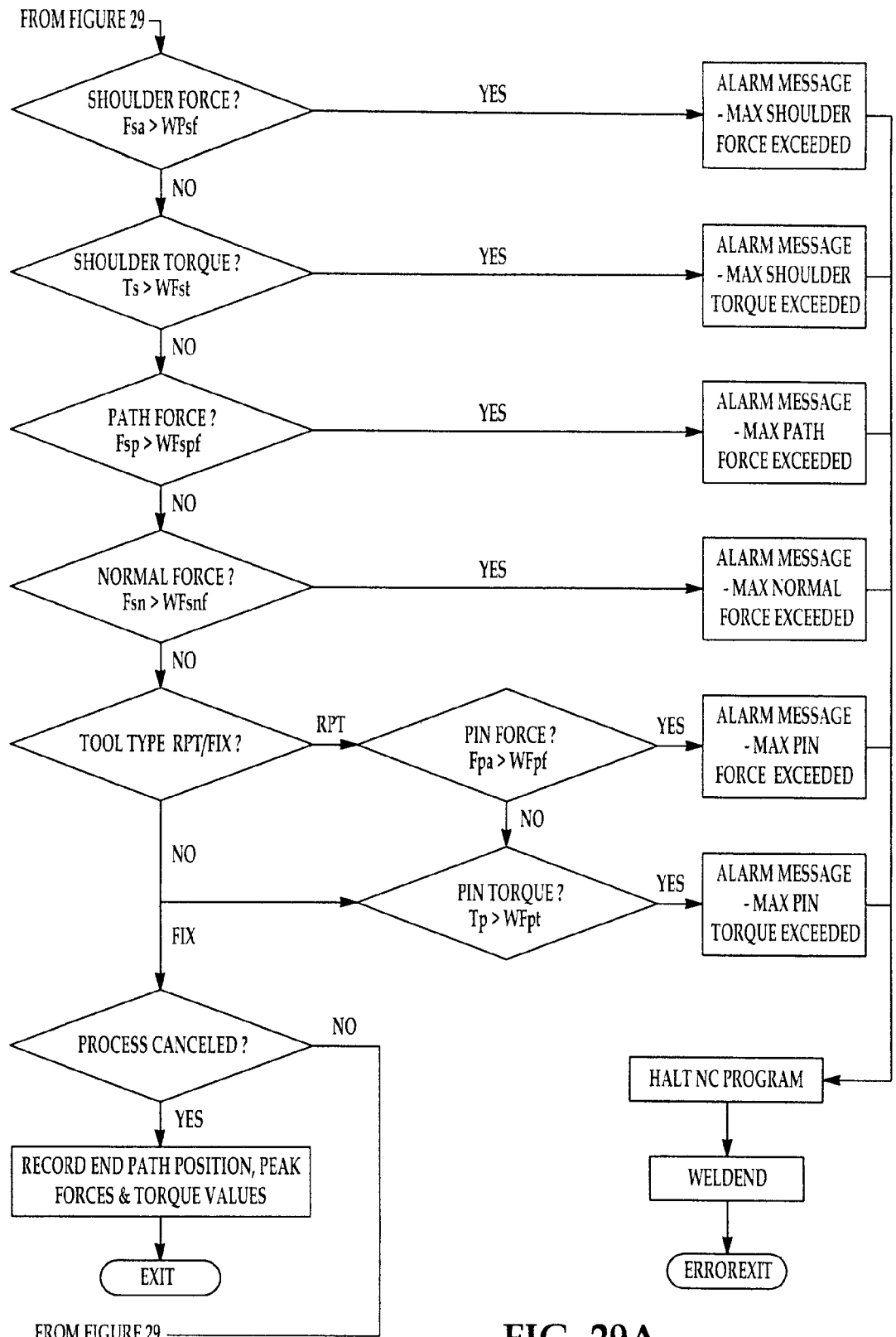

FIG. 29 is a flow diagram illustrating a subroutine for performing path welding under shoulder position control.

Figure 30:
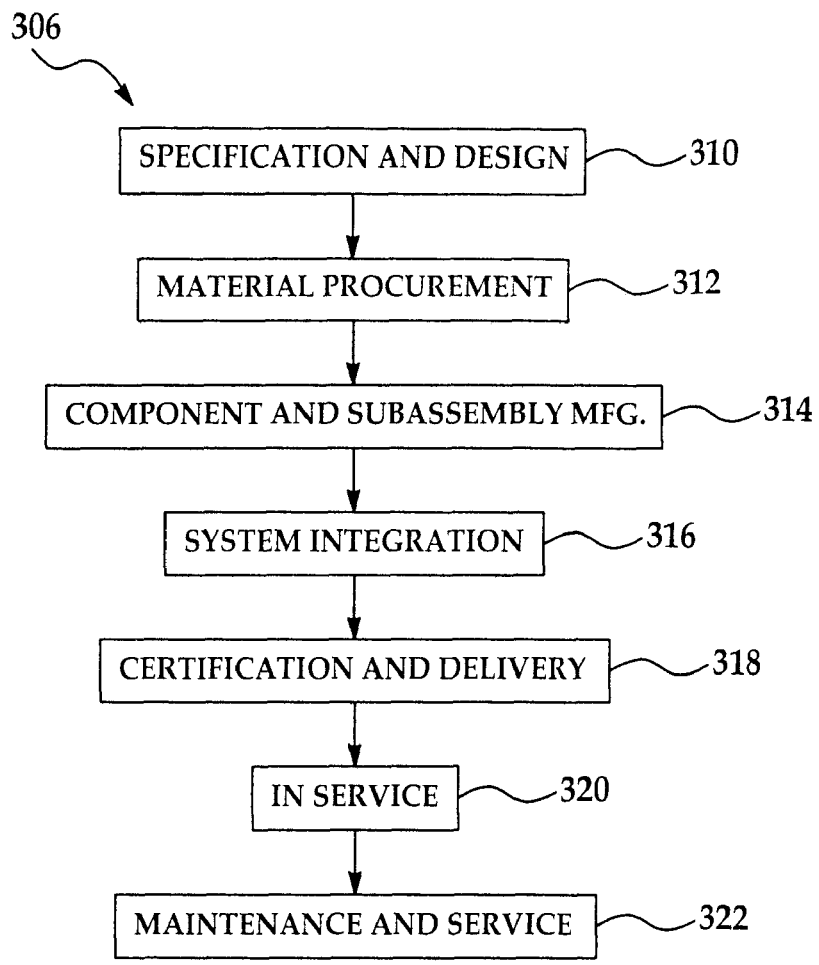

FIG. 30 is a flow diagram of aircraft production and service methodology.

Figure 31:
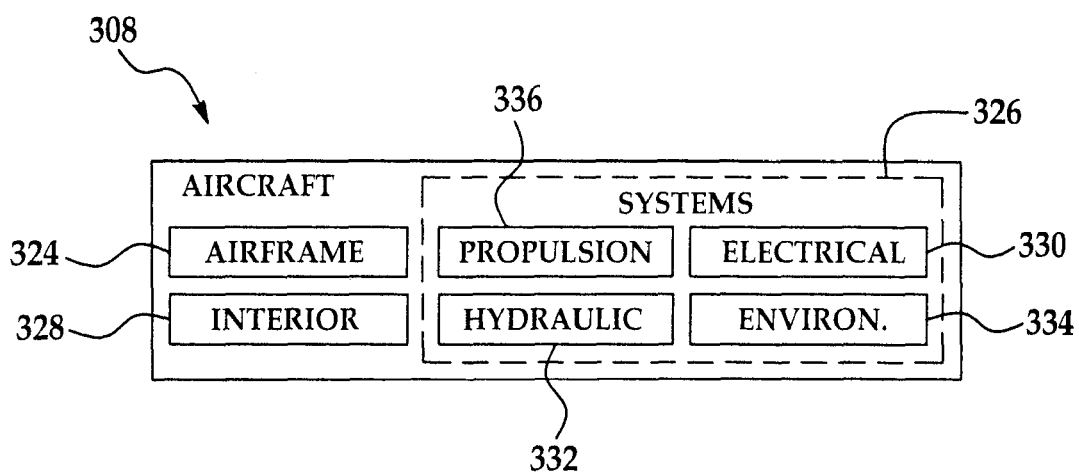

FIG. 31 is a block diagram of an aircraft.

DETAILED DESCRIPTION

Figure 1:
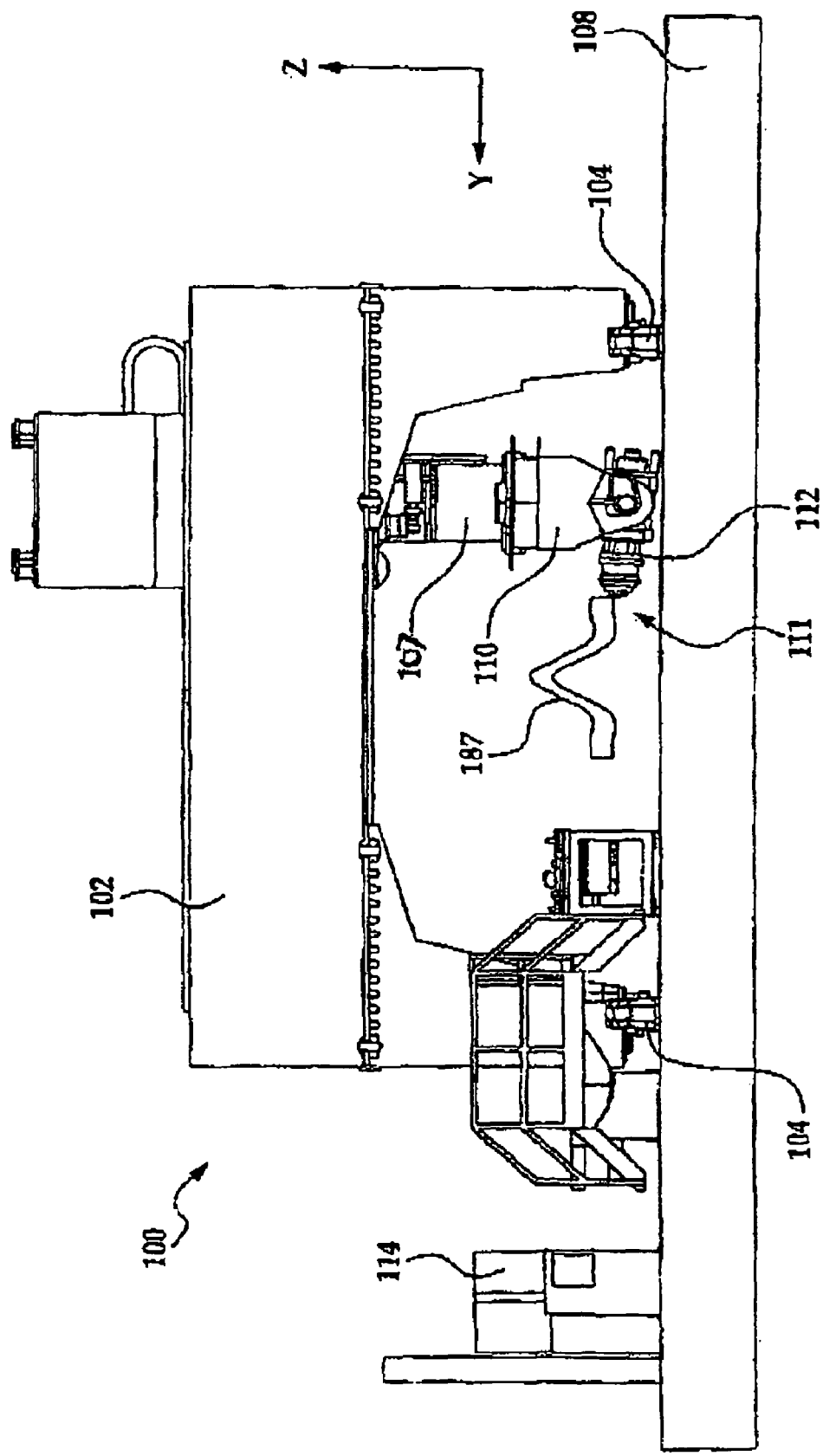
FIG. 1 is a block diagram illustrating the relationship between process definitions, process parameters and subroutines used in a process control system.
Figure 2:
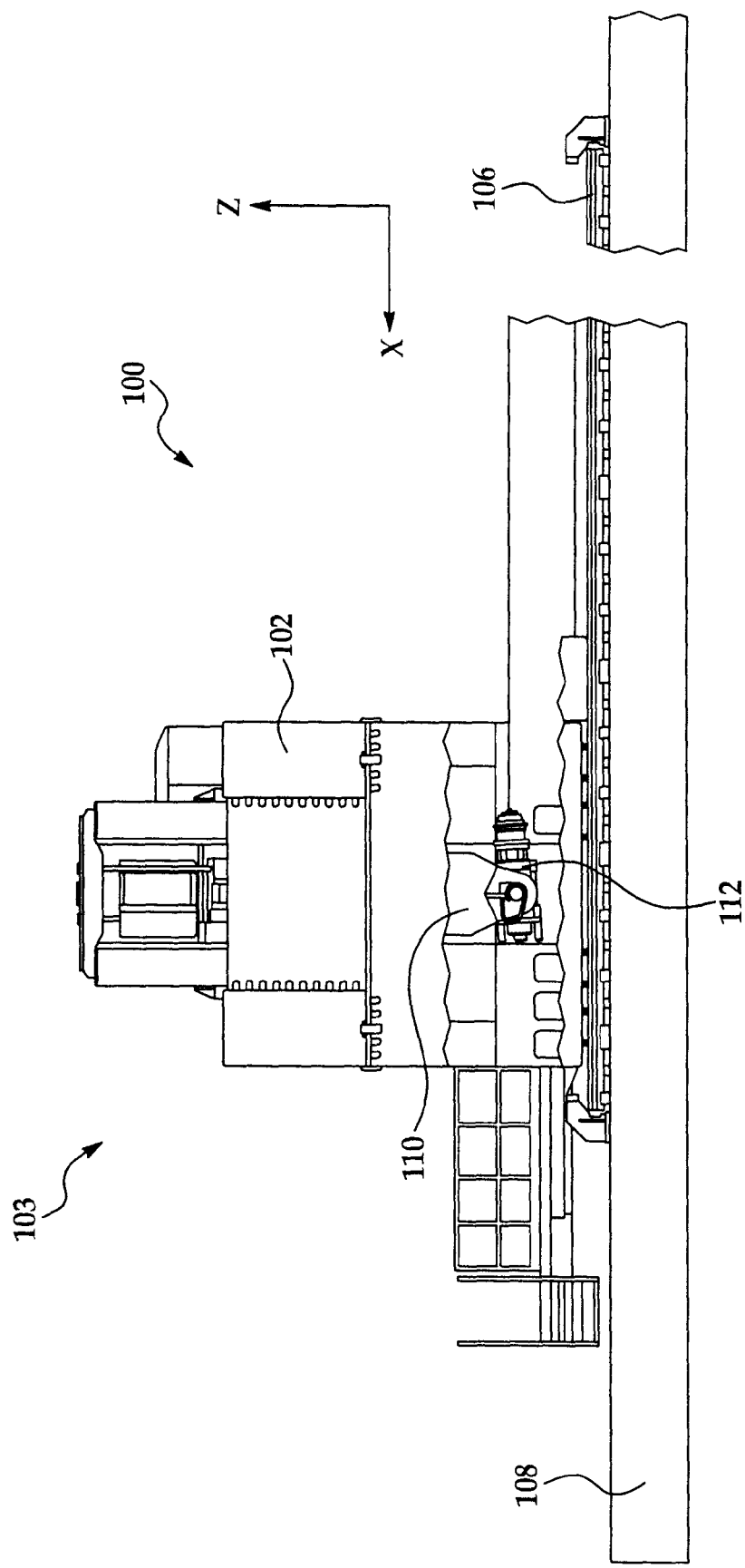
FIG. 2 is a side illustration of an FSW machine using the process control system according to the disclosed embodiments.
Figure 5:
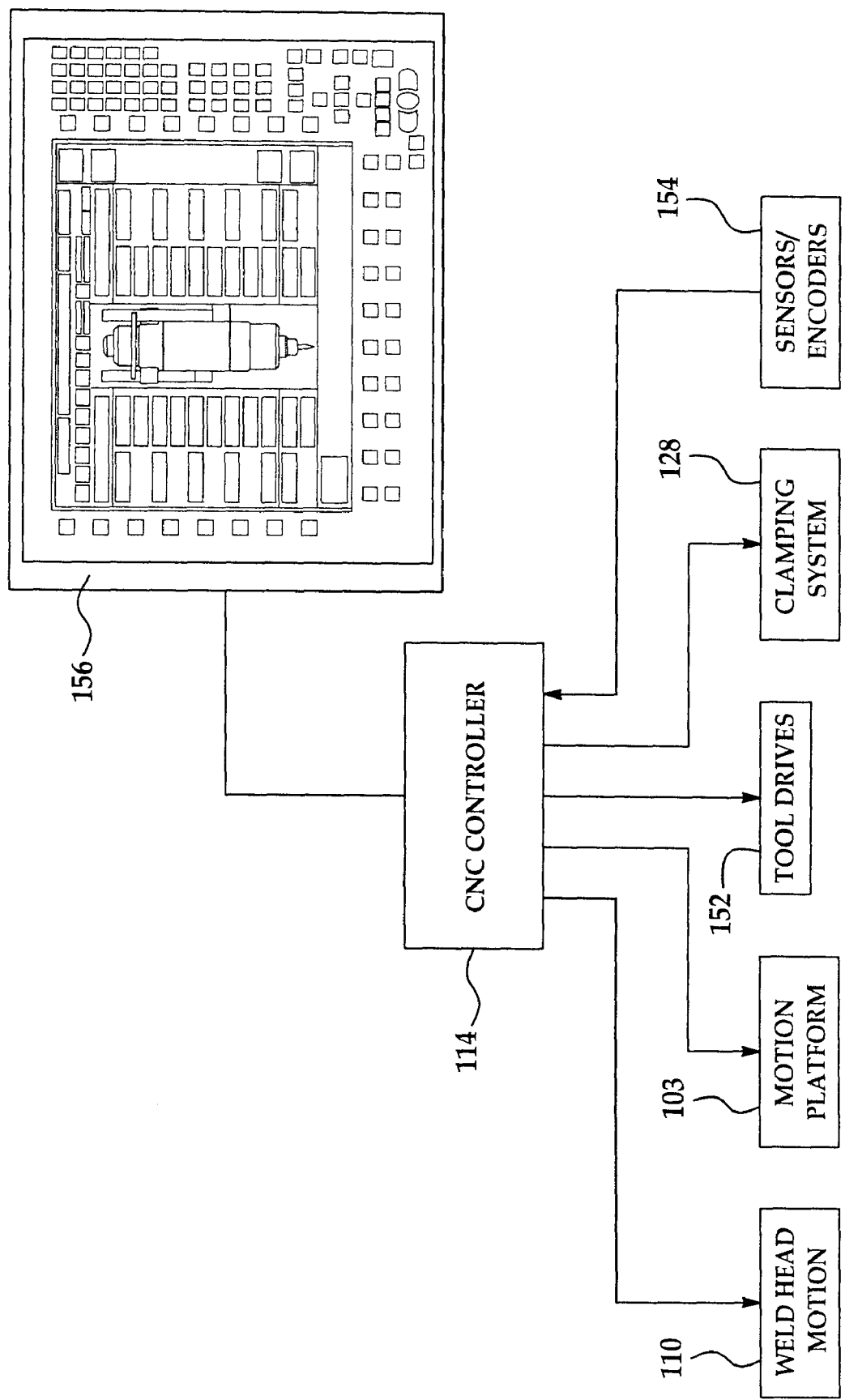
FIG. 5 is an isometric, cross-sectional illustration of a spindle forming part of the weld head illustrated in FIG. 4.
Figure 6:
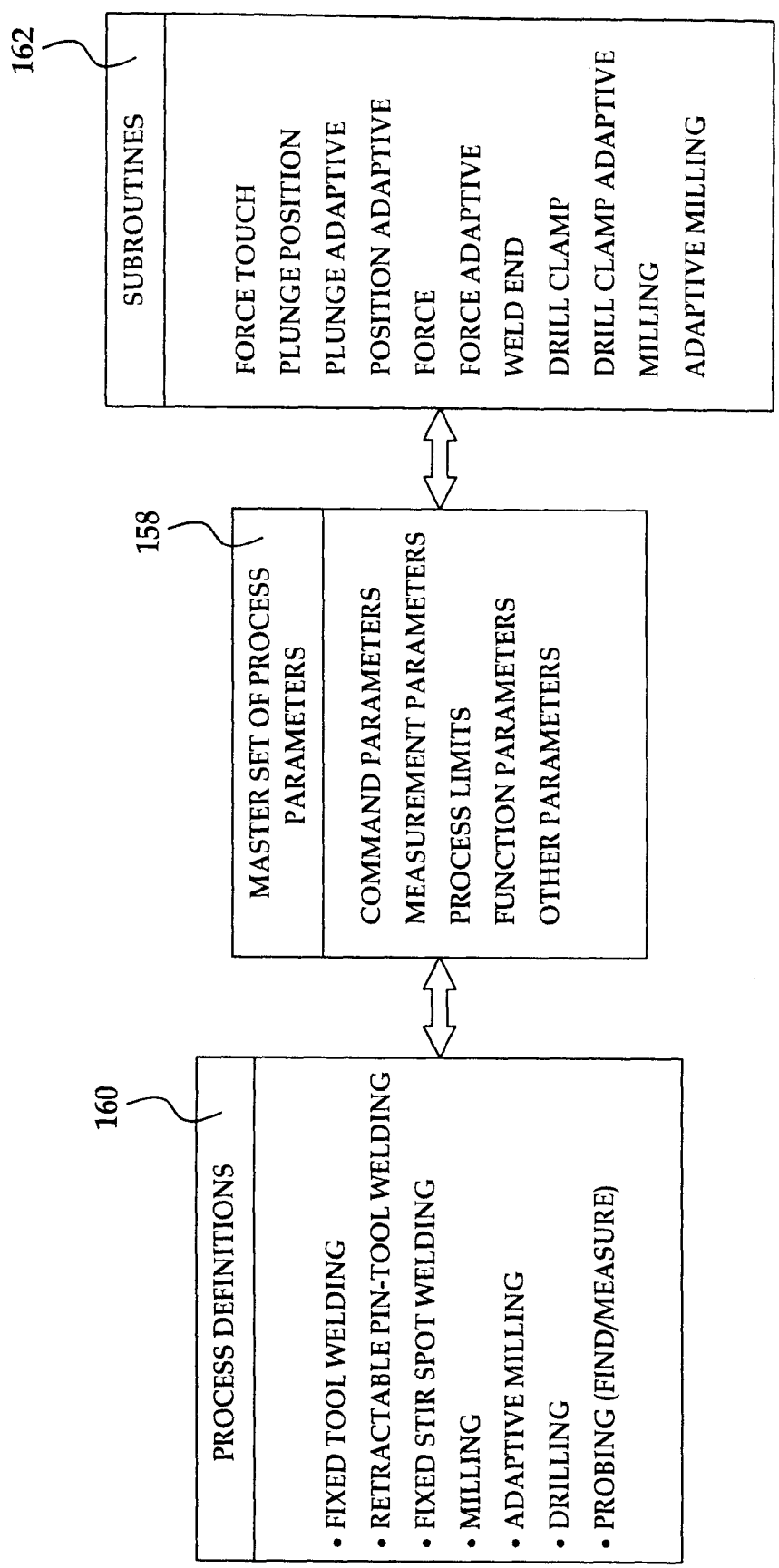
FIG. 6 is a combined block and diagrammatic illustration of a system for controlling the FSW machine shown in FIGS. 2 and 3.

Referring first to FIG. 1, a process control system for controlling the various operations performed by a FSW machine described below employ a master set of process parameters 158. The master set of process parameters 158 is used in combination with a set of process definitions 160 and subroutines 162 to provide a flexible system for controlling operations performed by the FSW machine, including various FSW processes and auxiliary operations such as, without limitation, probing, drilling and milling. The master set of process parameters 158 include command parameters, measurement parameters, process limits, function parameters and other parameters as may be required by the particular application. One or more of the subroutines 162 may be employed in carrying out any of the defined processes 160. Subroutines 162 comprise, for example, without limitation, Force Touch, Plunge Position, Plunge Adaptive, Position Adaptive, Force, Force Adaptive, Weld End, Drill Clamp, Drill Clamp Adaptive, Milling and Adaptive Milling.

Attention is now directed to FIGS. 2-6 which depict a CNC controlled FSW machine generally indicated by the numeral 100, of the type that may be controlled using the process control system of FIG. 1. The FSW machine 100 broadly comprises a weld head 110 mounted on a motion platform 103 for movement along X, Y and Z axes. In the drawings, the X and Y axes extend into the page as viewed in FIGS. 1 and 2, respectively. The weld head 110 is mounted on a support arm 107 for movement along the Z (vertical) axis. Support arm 107 in turn, is mounted for sliding movement along the Y axis on a gantry bridge 102. Gantry bridge 102 includes rollers 104 guided by tracks 106 which guide the movement of the gantry bridge 102, and thus the weld head 110 along the X axis.

The weld head 110 includes a weld tip 111 for performing FSW operations on a workpiece or part 187. The weld head 110 is mounted on the support arm 107 for rotation about a "C" axis 118, and includes a spindle housing 120 pivotally mounted on a yoke 116 for rotation about an "A" axis 122. The spindle housing 120 is also mounted for linear sliding movement on a track 124.

As best seen in FIG. 4, the spindle housing 120 contains a pair of coaxial spindles that form corresponding quills 140 and 146 which are independently rotatable in the same or opposite directions by electric drive motors (not shown). Quill 140 may be linearly displaceable by a ball gear drive (not shown) which may be contained within or on the spindle housing 120. The weld tip 111 comprises a pin tool 136 coaxially disposed within a shoulder tool 142. The pin tool 136 is mounted on the end of quill 140 by a tool holder 138. Similarly, the shoulder tool 142 is mounted on quill 146 by a second tool holder 144. The previously mentioned ball gear drive (not shown) is used to extend or retract the pin tool 136 relative to the shoulder tool 142 by displacing the quill 140.

A clamping system generally indicated by the numeral 128 is used to apply clamping pressure to a workpiece (not shown) during a weld operation. The clamping assembly 128 includes a pair of clamping packs 130 each having extendable clamping rollers 134 that engage and roll along the surface of the workpiece 187. The clamping packs 130 are removably secured to a collar 132 that is mounted on the spindle housing 120 for rotation around the "E" axis 126.

From the forgoing, it can be appreciated that the motion platform 103 provides for linear movement of the weld tip along the X, Y and Z axes, while features of the weld head 110 allow rotation of the weld tip 111 around the A, C and E axes, 122, 118 and 126, respectively.

The FSW machine 100 includes a CNC controller 114 which may be positioned adjacent the motion platform 103 on a base 108 or other factory floor. The CNC controller 114 may comprise a programmed computer that controls the operation of the weld head 110, motion platform 103, tool drives 152, clamping system 128 and sensors/encoders 154. The tool drives 152 may comprise, for example, the previously described electric motors on the spindle head 120 which rotate the quills 140, 146, as well as the gear drive (not shown) that controls the linear displacement of the pin tool 136. The sensors/encoders 154 may comprise sensing devices that sense the position of various movable components on the machine 100 such as, for example, and without limitation, the exact linear displacement position of the pin tool 136. An electronic display 156 connected to the CNC controller 114 may be provided to display various data and visual information useful or required for an operator.

Figure 7:
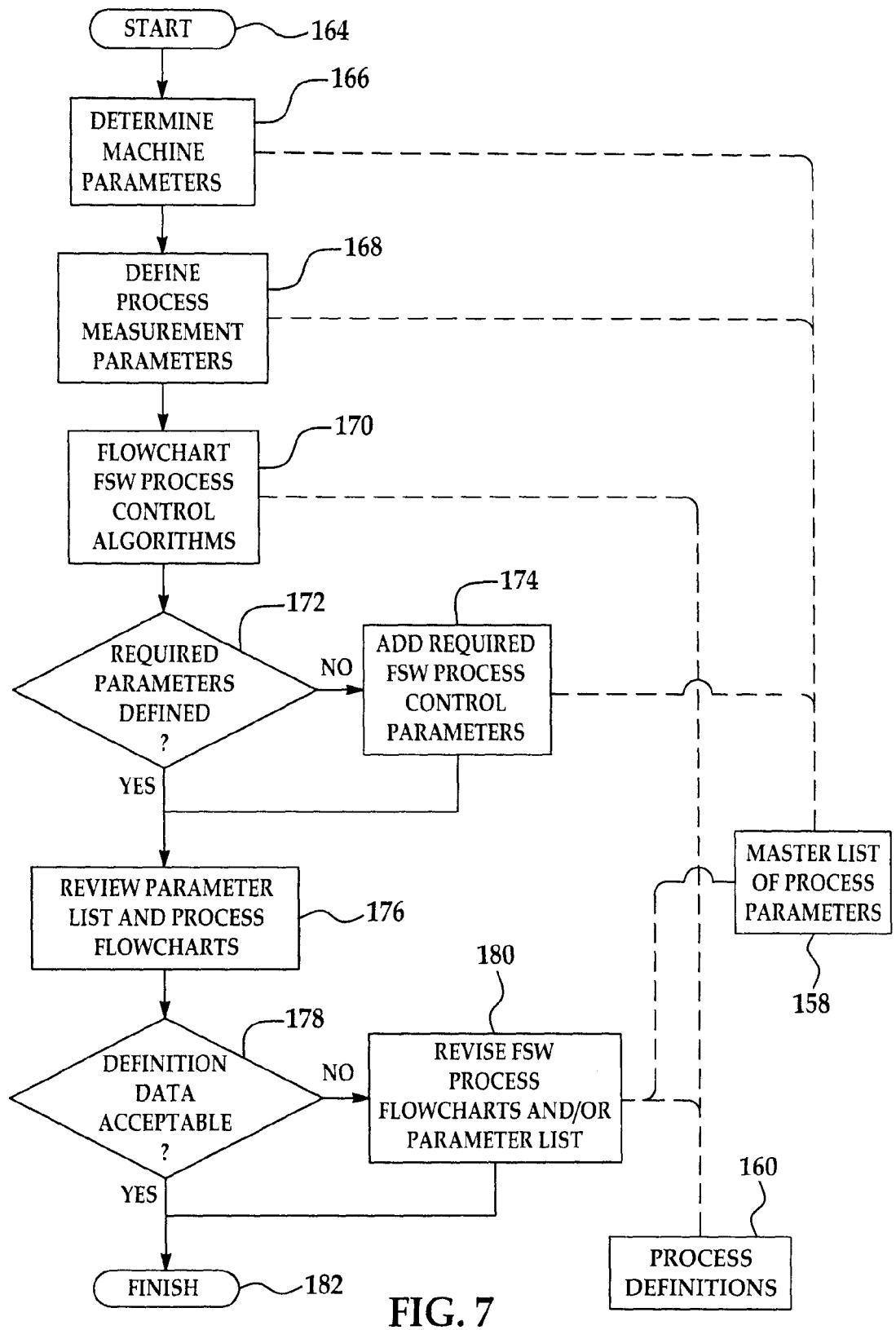
FIG. 7 is a flow diagram illustrating the steps for generating sets of process parameters and process definitions used in the process control system.

The master set of process parameters 158 and the process definitions 160 shown in FIG. 1 may be developed using a method described by the flow diagram illustrated in FIG. 7. Starting at 164, the parameters of the particular machine are determined at step 166, following which the process measurement parameters are defined at 168. The machine parameters determined at 166 and the process measurement parameters determined at 168 form the basic set of process parameters at 160, however as described below, additional process parameters may be added, depending upon the particular process control algorithms that are developed. At step 170, a flow chart is developed describing the logic for FSW process control algorithms. A determination is made at 172 as to whether the required parameters have been fully defined. If these parameters have not been fully defined, then further process control parameters are developed at 174 and added to the preliminary master list of parameters at 160. When the required process parameters have been defined at 172 the process parameter list and the process flow charts are reviewed at 176, and a determination is made at 178 as to whether the definition data is acceptable. If, for any reason, the definition data is not acceptable, then the FSW process flow charts and/or the parameter list is revised at 180 and the master list of process parameters 158 and the process definitions 160 are updated as appropriate. When the definition data is found to be acceptable at 178, the process is finished at 182.

Figure 8:
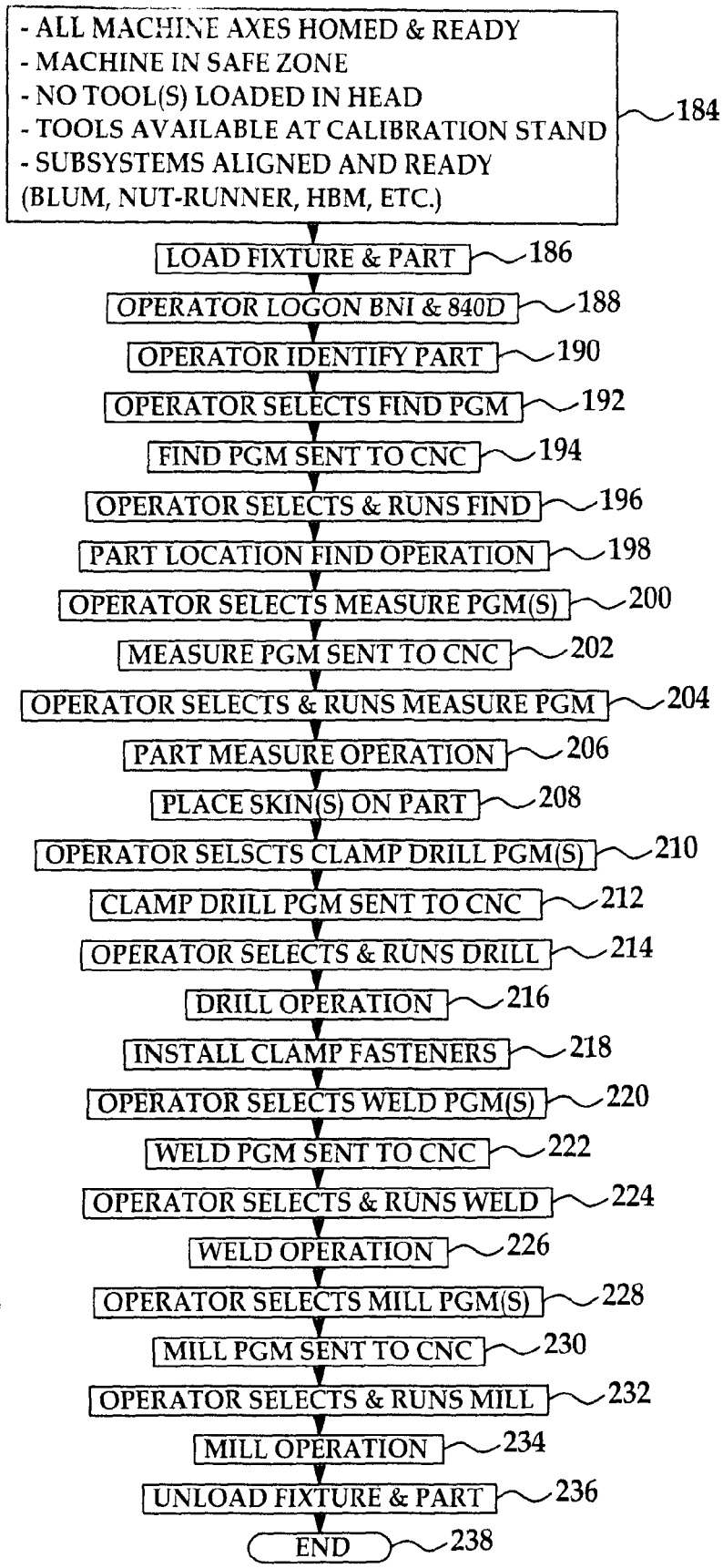
FIG. 8 is a flow diagram illustrating the logic steps for carrying out a sequence of find, measure, drill, weld and mill operations according to the process control system.
Figure 9A:
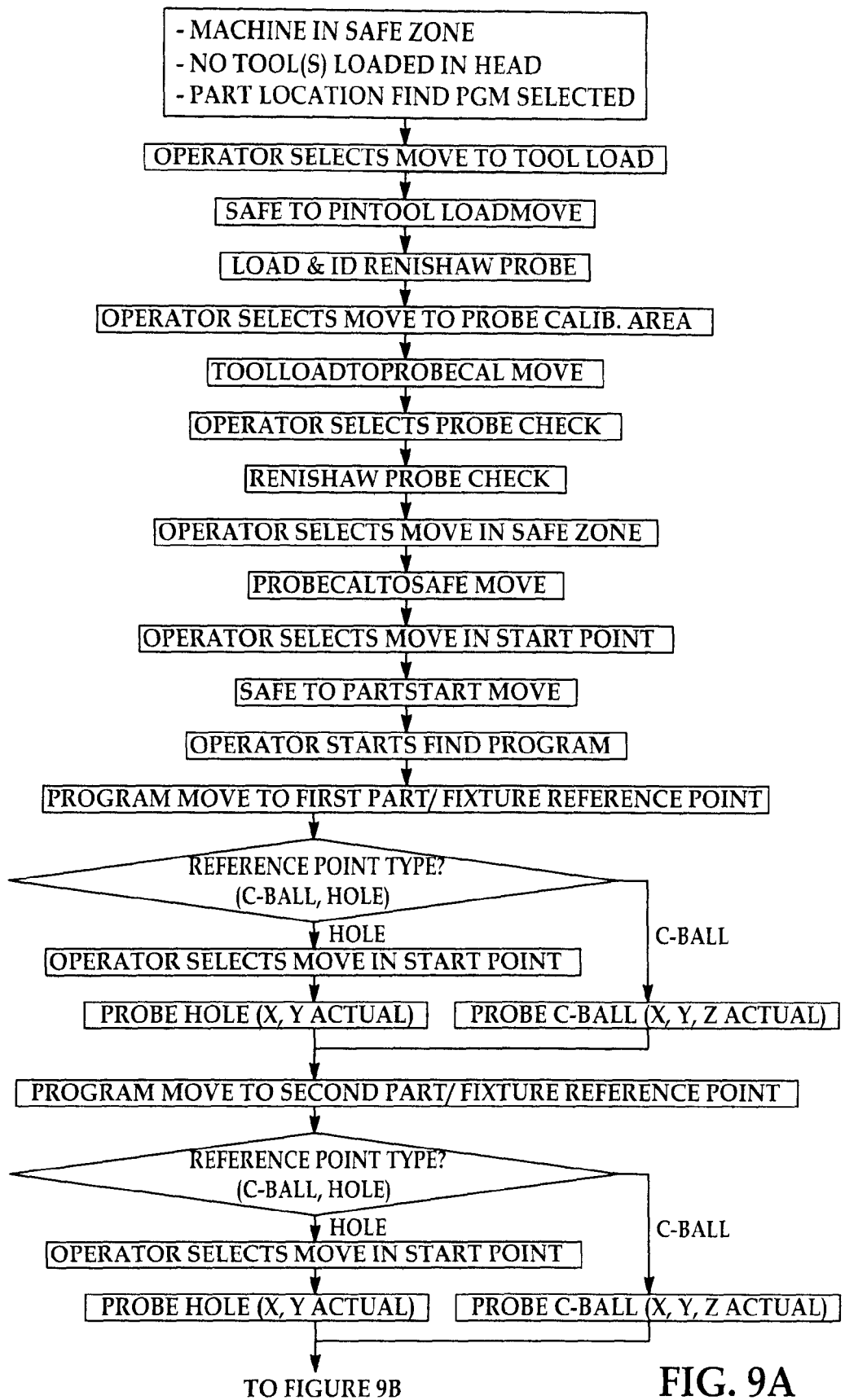
FIG. 9 is a flow diagram illustrating further details of the steps for performing the find operation.
Figure 9B:
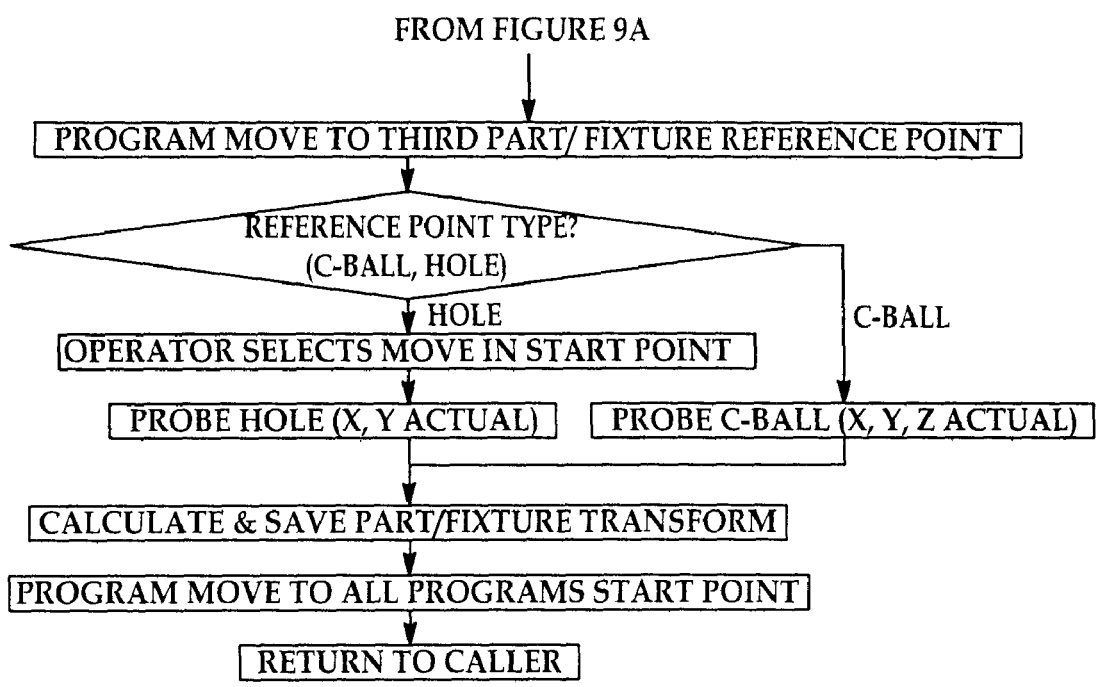

Attention is now directed to FIG. 8 which illustrates the basic steps of a complete FSW welding sequence which includes probing (finding), drilling, welding and milling a workpiece or part 187. It should be understood that not all of these processes may be required for a particular welding sequence and that the operations illustrated in FIG. 8 are merely intended to provide an overview of a complete sequence of possible welding operations.

Beginning at 184, all axes of the FSW machine 100 are moved to their home position and readied. The machine 100 is placed in a safe zone and no tools have been yet loaded into the weld head 110. The appropriate tools to be used may be made available at a calibration stand (not shown), for example that may be located in proximity to the machine 100. All subsystems of the machine 100 are aligned and readied.

Next, at 186, a part 187 (FIG. 2) and any associated fixturing (not shown) are loaded onto a support table (not shown), in readiness for a weld operation. An operator logs on to the CNC controller 114 at 188 and identifies the part at 190. The operator may also log in the identification of the part 187, as well as any other information, using any appropriate I/O devices such as, for example, a touch screen display, such as the screen 156 shown in FIG. 6. At 192, the operator selects the "find" program, following which the find program is sent to the CNC controller 114, as shown at step 194. At 196 the operator then selects and runs the find program, resulting in a part location find operation being carried out by the machine 100 at step 198. At this point, the machine 100 has located the part 187 within an operating envelope and therefore knows its precise location within the XYZ coordinate system used by the machine 100.

Next, at step 200, the operator selects one or more measurement programs, resulting in the measurement program being sent to the CNC controller 114, as shown at step 202. At 204, the operator selects and runs the particular measurement program, resulting in a part measurement operation being performed at step 206 to determine location of individual part substructure elements. In the illustrated example, the part 187 comprises a base part on which a skin is to be welded. Accordingly, as shown at step 208, an operator places one or more skins on the part 187. Then, at step 210, the operator selects one or more clamp drill programs which are sent to the CNC controller 114 at step 212. The operator selects and runs the drill at 214, causing a drill operation to be performed at 216. The drilling operation at 216 results in one or more holes being drilled in the part 187 as well as the skins (not shown). Drilling processes may be used later, to receive through-hole fasteners in the skins. At step 218 clamp fasteners may be installed which clamp the skin to the part 187, as required. At step 220, the operator selects one or more weld programs which are sent to the CNC controller 114 at step 222. The operator then selects and runs the weld program 224, resulting in a weld operation being carried out at step 226.

With a weld operation having been completed, the operator may then select one or more mill programs at 228 which are loaded in the CNC controller 114 at step 230. The operator selects and runs the mill program at 232, resulting in a mill operation being performed at 234, which may be required for example, to mill away flash created by the weld operation at step 226 or to trim the skin outside edges. Finally, at 236, the welded, finished part 187 and any associated fixtures are unloaded, and the process ends at 238.

Further details of the find, measure, drill, weld and mill programs are shown in FIGS. 9-13, respectively. The find program illustrated in FIG. 9 essentially comprises finding the part 187 and locating it within the XYZ coordinate system of the machine 100 so that the weld head 110 can be brought to a starting point whose coordinates are known in relation to various locations and/or features on the part 187. Steps 400-422 used in the find program, load and identify a probe which is then calibrated and used to probe various features or locations on the part 187. When it has been determined that it is safe to start at 422, the operator may begin the find program at 424 which results in the probe being moved to the first part/fixture reference point at 426. Depending on whether the reference point is a C-ball or a hole, at 428, the reference point is probed at 430, 432. The find program proceeds to move and locate second and third reference points as shown at steps 434-452.

Figure 10:
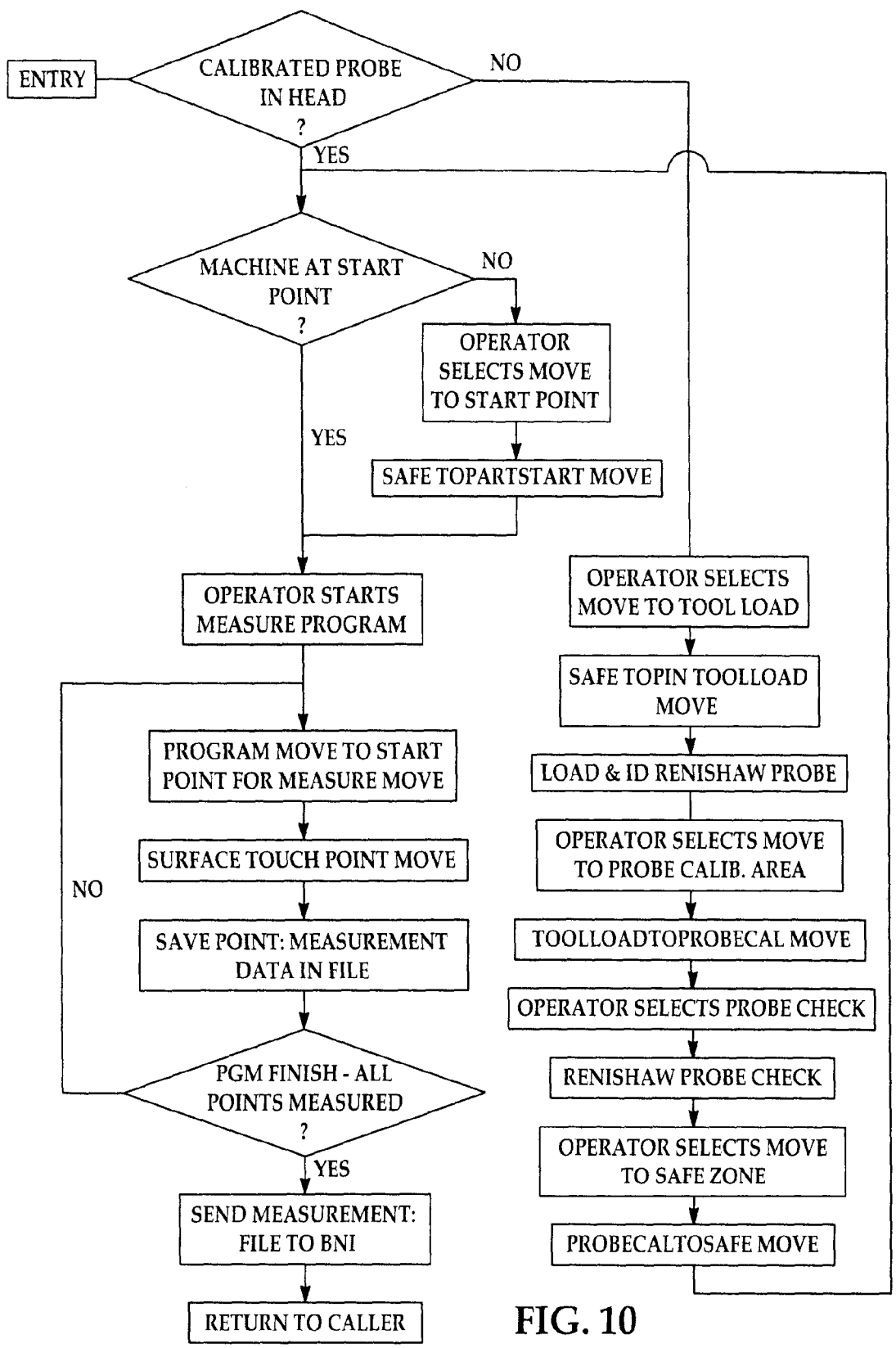
FIG. 10 is a flow diagram illustrating further steps for performing the measure operation.

With the part 187 having been located within the working envelope of the machine 100, the measurement program illustrated in FIG. 10 is used to measure features or distances on the part 187 using a probe (not shown) that has been previously loaded into the weld head 110. A determination is made at 454 of whether or not a calibrated probe is present on the weld head 110. If it is found that a probe is not present, then the operator proceeds through steps 456-472 in order to load and calibrate a probe. With a properly calibrated probe loaded in head 110, the operator may complete steps 474-480 to start the measurement program. The probe is moved to a starting point at 482 and then is brought into contact with the part at step 484 to perform a measurement which is then saved at step 486. Steps 482-486 are repeated until all points have been measured at 488, following which the measurements are stored at step 490.

Figure 11:
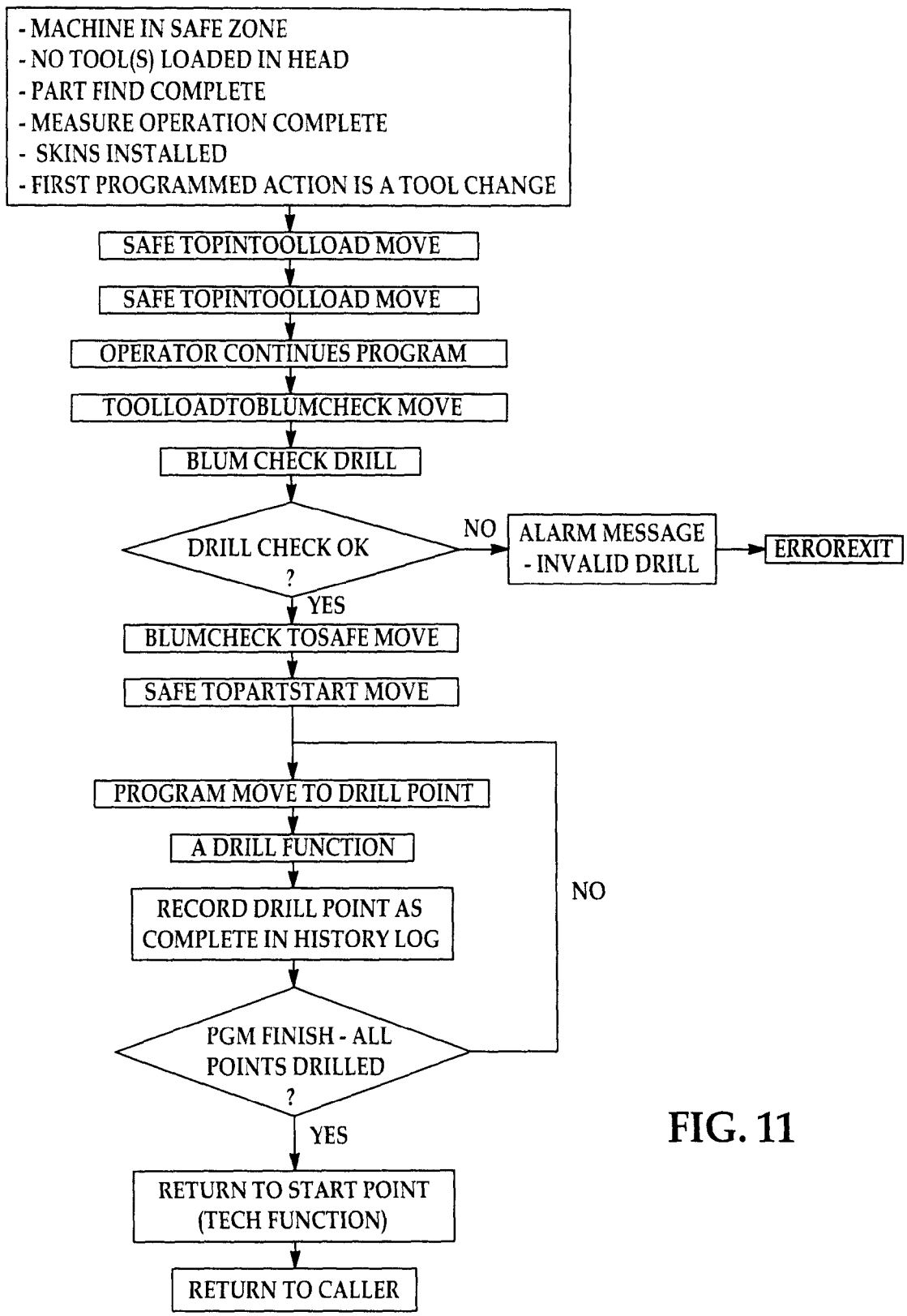
FIG. 11 is a flow diagram illustrating further steps for performing the drill operation.

The drill program illustrated in FIG. 11 is used to drill any holes that may be required in the part 187 prior to performing a weld operation. The drill program includes moving the weld head 110 to a tool changing location installing an appropriate drill tool, measuring tool parameters such as length and diameter, and verifying tool parameters, following which the weld head 110 is moved to one or more locations over the part 187 where holes are drilled. The drill program starts at 492, with the machine in a safe zone and no drill bit having yet been loaded into the weld head 110. The operator then selects and loads a drill at steps 494-498, following which laser measurements are performed at steps 500-512 to verify that the drill has been properly loaded and positioned. One or more drilling operations are then performed at steps 514-518. When all points have been drilled at 520, the weld head 110 returns to its starting point, as indicated at 522.

Figure 12:
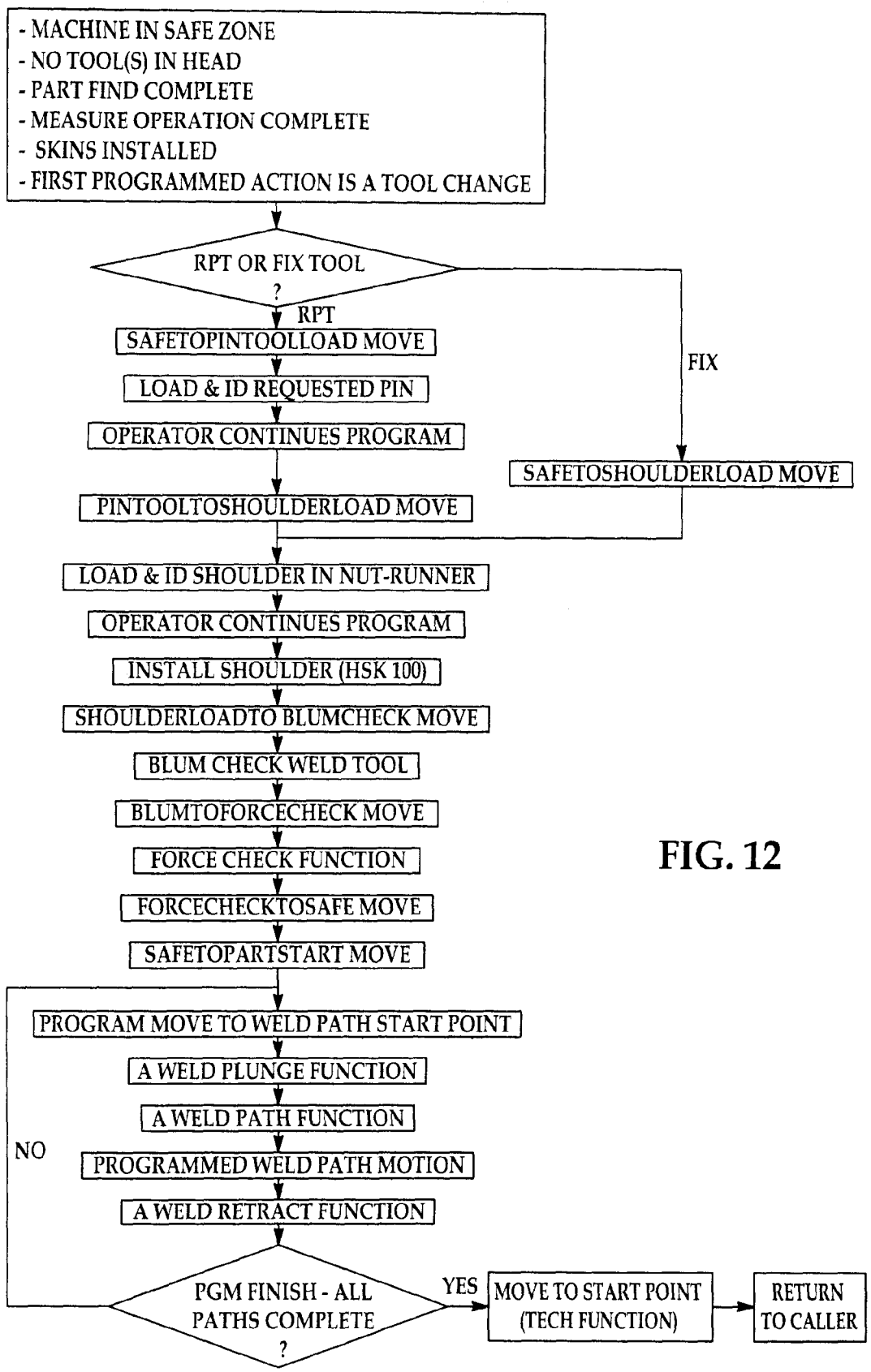
FIG. 12 is a flow diagram illustrating further steps for performing a weld operation.

The part 187 having been measured and drilled, the weld program shown in FIG. 12 is then used to carryout the desired weld operation which, as previously discussed, may comprise fixed tool welding, retractable pin tool welding or fix stir spot welding. The weld program shown in FIG. 12 includes selecting the particular type of welding operation to be performed and loading the corresponding pin and shoulder tools into the weld head 110. The welding operation may include one or more subroutines which will be described later in more detail. These subroutines may include, for example, controlling the weld plunge process and the weld path process as well as the process that is used to retract the weld tools from the workpiece 187. More particularly, the weld program begins at 524 with the machine 100 in a safe zone as indicated at 524, with no tools present in the weld head 110.

A determination is made at 526 as to the type of weld tool that is to be used. The selected weld tool is loaded at steps 528-538. The operator then continues to program at step 540. The shoulder is installed at step 542 and is measured at steps 544, 546. A force check function is performed at steps 548-552, following which the weld head 110 is moved to a start position at 554. A weld is performed using steps 556-566 which includes a force touch function 558, weld plunge function 560, weld path function 562, programmed weld path motion 564, and weld retract function 566. When all weld paths have been completed at step 568, the weld head 110 returns to its start position at 570.

Figure 13:
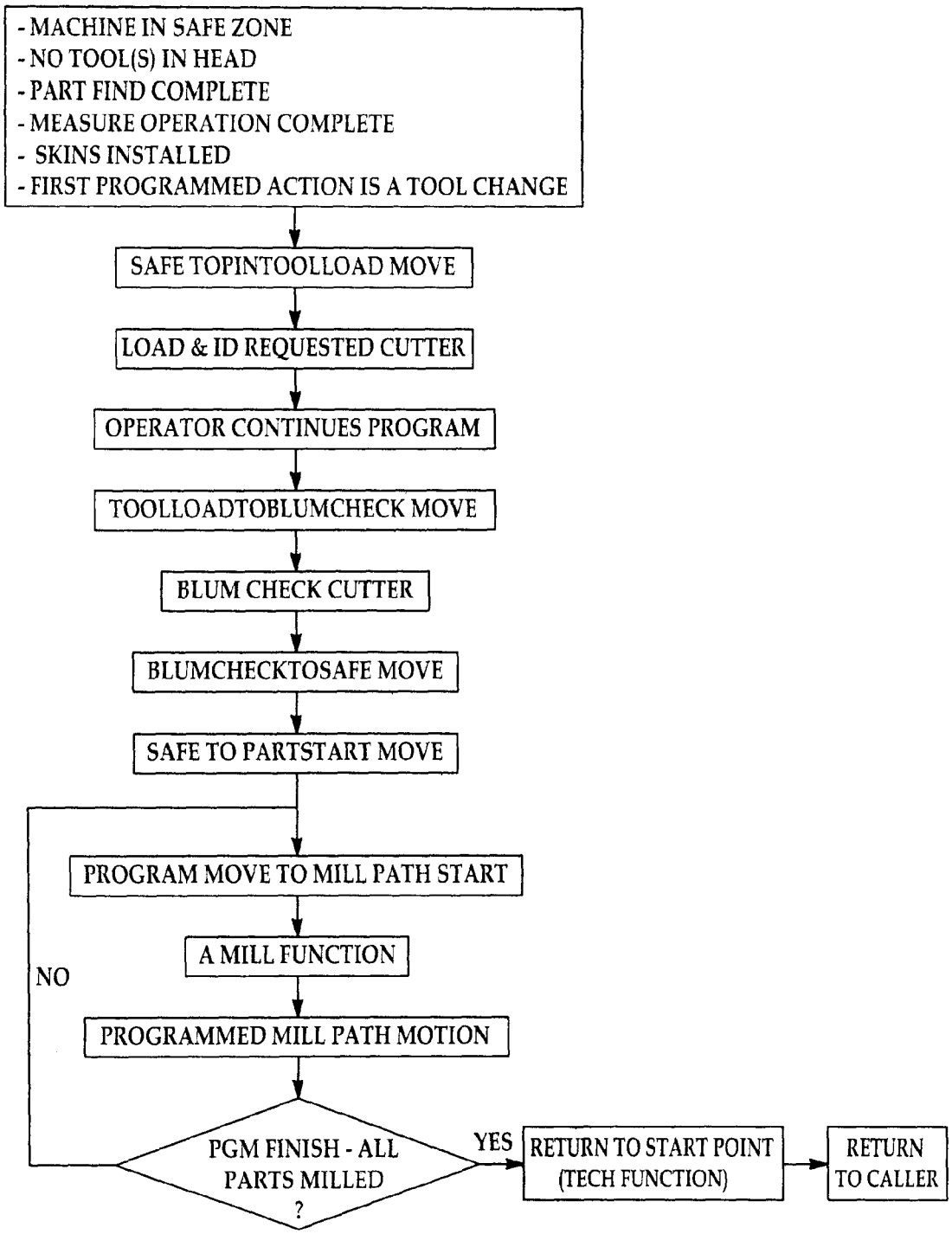
FIG. 13 is a flow diagram illustrating further steps for performing a mill operation.

The mill program illustrated in FIG. 13 includes loading an appropriate milling tool on the weld head 110, conducting cutter checks and moving the mill tool through a path over the workpiece 187 to mill away excess material. With the machine in a safe zone at 572, a cutter is loaded at steps 574, 576 following which the operator continues the program at 578 to check the position of the cutter at 580, 582. The cutter is then moved to a start position at 584, 586, following which milling operations are performed at steps 588, 590 and 592. When all of the milling paths have been completed at step 594, the program terminates at 596.

Attention is now directed to FIGS. 14a-14c which provide additional details of the command parameters that form part of the master set 158 (FIG. 6) used to control machine operations. The command parameters are broadly divided into those controlling the shoulder element 134, pin element 136, clamping packs 130 and the weld head 110. The particular command element is shown in column 240 in terms of a control axis. The specific command parameters are shown in column 242 and a description of these command parameters and their units of measure are shown in column 244. Column 246 provides an explanation of the parameter, while columns 248 show the use of the parameter in each of the various subroutines which will be described below in more detail. As shown at 250, command parameters relating to the shoulder tool 142 include parameters relating to a quill axis Ws and a spindle Ss. By way of example, the command parameter Wspr is the linear rate of displacement of the shoulder quill, while command parameter Ss indicates the rotational speed of the shoulder spindle in terms of revolutions per minute.

The parameters indicated at 252 relate to the pin 136 which include those pertaining to the quill axis Wp and the spindle Sp. Parameters shown at 254 relating to the rollers 134 are given in terms of their relation to the rotary axis "E" and roller pressure Rp. Finally, parameters 256 relating to the weld head 110 are given in relation to a weld tool Wt and tool angle A.

Depending on the application, additional parameters 260 relating to external command elements 258 may be provided. Thus, command parameters may be used that relate to temperature of the weld Tex or measurements of a tool performed, for example by a laser device ("Blum") such as the length of the pin shown as Bpl.

Referring now to FIGS. 15a-15c, measurement parameters are defined that relate to the shoulder 142, pin 136, roller 134, weld head 110 and external elements 258. Column 262 identifies the particular measurement element while column 264 gives the measurement parameter. A description of the measurement parameter is provided in column 266, and column 268 provides an explanation of the parameter. Columns 248 show the use of the particular measurement parameter in each of the subroutines used to carryout the various processes. As shown at 270, measurement parameters relating to the shoulder include those pertaining to the quill axis Ws, the spindle Ss, shoulder force Fs and shoulder torque Ts. Parameters relating to the pin 136 are given in terms of the quill axis Wp, the spindle Sp, pin force Fp and the pin torque Tp. Parameters relating to the roller 134 are given in terms of the rotary axis "E" and roller pressure Rp. Parameters relating to the weld head 110 include those relating to the weld tool Wt and the tool angle H. Parameters relating to external factors, may include, for example, those relating to temperature Tex and measurements of tool geometry B by the Blum laser tool measurement subsystem.

FIGS. 16*a*-16*c* describe in greater detail the parameters relating to process limits. Process limit parameters are provided for the shoulder 142, pin 136, weld head 110, and external elements 258. Column 280 describes the particular element while column 282 provides the parameters relating to the element. Column 284 provides a description of the parameter and its units of measure while column 286 provides an explanation of the parameter. Columns 288 show the application of the parameter in the various subroutines discussed below.

As shown at 290, limit parameters are provided which relate to the quill axis Ws, spindle Ss, shoulder force Fs and shoulder torque Ts. With respect to the pin tool 136, limit parameters are provided for the quill axis Wp, spindle Sp, pin force Fp and pin torque Tp. As shown at 294, limit parameters are provided which relate to the weld tool rate Wtr. Additional parameters can be provided for external elements shown at 296 which may include by way of example, without limitation, weld nugget temperature Tex and tool measurement.

Attention is now directed to FIGS. 17*a* and 17*b* which provide a list of function parameters 298 that are used in processes 302 carried out in the various operation modes 300 of the machine 100. The machine modes include weld preparation 301, weld plunge 303, weld path 305, weld termination 307, drilling 309 and milling 311. The processes 302 include Force Touch 313, Position Plunge 315, Position Plunge Adaptive 317, Position Control 319, Position Control Adaptive 321, Force Control 323, Force Adaptive 325, Weld End 327, Clamping 329, Clamping Adaptive 331, Milling 333 and Adaptive Milling 335. A description of the various function parameters 298, which are programmable, is given in column 304, along with the corresponding units of measure.

FIG. 18 illustrates a flow diagram for a milling subroutine in which the shoulder spindle 146 is used to drive a cutter to perform milling and routing. In the context of aerospace applications for example, the milling subroutine may be used to remove weld tabs in structural skins and to provide access door cutouts. Instrumentation (not shown) may be provided to measure both the milling radial force and torque. Shoulder spindle radial force and torque are compared to their respective programmed maximum levels and the mill process is aborted if a maximum level is exceeded. The mill function is modal and may remain in effect until explicitly canceled or superseded by another programmed modal function.

The mill subroutine uses the parameters of radial shoulder force Fsr and shoulder tool torque Ts. The milling subroutine begins at steps 598 and 600 with setting preliminary parameters, following which the mill path is started at 602. Function internals and outputs are initialized at 604, following which shoulder and radial torque are checked at steps 610, 612, 616 and 618. If the shoulder or radial forces exceed pre-selected limits, alarm messages are issued at 616 and 618, and the program is halted at 620. If it is determined at 614 that the process has not yet been cancelled, then the program continues to a loop point 606, otherwise the end path position as well as peak force and torque values are recorded at 622 and the subroutine ends at 624.

FIGS. 19*a* and 19*b* illustrate a flow diagram for the mill adapt subroutine which uses the shoulder spindle 146 to perform milling and routing operations, in which the commanded milling path rate (tool tip velocity) is overridden to maintain a constant milling reactive force. The mill adapt subroutine provides an adaptive control based on the shoulder radial force. A preprogrammed, target milling force is compared with actual radial force levels to increase or decrease the milling rate within given tolerance limits. The shoulder spindle radial force and torque are compared to their respective programmed maximum levels and the milling process is terminated if a maximum level is exceeded. The mill adapt subroutine is modal, and remains in effect until explicitly cancelled or superseded by another programmed modal function. The mill adapt subroutine utilizes the parameters of: radial shoulder force Fsr, maximum radial shoulder force limit Fsrmax, shoulder tool torque Ts, maximum shoulder tool torque limit Tsmax, commanded milling rate Wtr, maximum milling rate limit Wtrmax and minimum milling rate limit Wtrmin. The mill adapt subroutine may use the following parameters:

Fsr: Radial Shoulder Force
Ts: Shoulder Tool Torque
Wtr: Commanded Milling Rate
Wtra: Actual Milling Rate The mill adapt program is readied at 626, 628 and started at 630. Function internals and outputs are initialized at 632. Path commands are issued at 636, following which milling motion is checked at 638 and radial force is checked at 640 and 642. The milling rate is checked to determine whether it is within minimum and maximum limits at step 644, 646 and alarms are issued at 648, 650 if the milling rate exceeds these limits. An adaptive algorithm is carried out at 652 and the mill rate command is changed, as appropriate at 654. Next, the shoulder torque and radial force are checked at 656 and 660, respectively, and alarms are issued at 658 and 662 if pre-selected limits are exceeded. If the limits are exceeded, the program is halted at 664. Providing the process has not been cancelled at 666, the program loops back to loop point 634 where the subroutine is repeated. If the process has been cancelled at 666 or if the program has been halted at 664, then the end path position is recorded along with peak force and torque values at 668, following which the subroutine terminates at 670.

FIGS. 20*a*-20*e* illustrate a flow diagram for the force touch flow subroutine which may be used before each weld plunge operation to ensure that the correct plunge distance is achieved and the force instrumentation is operational. The force touch subroutine may handle both fixed and retractable pin welding tools. The FSW tool is positioned a fixed distance above the work surface which may be referred to as the FAL point. The tool is then slowly moved until it touches the work surface (WL point) with a specified force level. The actual distance moved is recorded and compared to a calibrated value obtained during FSW tool setup. The difference between these two values may be used to adjust program plunge distance of the following weld plunge operation. The adjustment compensates for workpiece surface variations and FS tool and head thermal growth. The adjustment value is zeroed by a subsequent, successful weld plunge process. This subroutine may use the following parameters: Wsp, Wsap, Wpp, Wpap, Fsa, Fstmax, Fstmin, Fpa, Fptmax, Fptmin, Bmpl, Bplsafe, Bplmax, Bplmin.

Additional details of the force touch subroutine are shown in FIGS. 20a-20e. Preliminary checks are made at step 672, 674, following which the subroutine starts at 676. Function internals and outputs are initialized at 678 and a start point is recorded at 680. Checks are made on the touch distance and touch force to determine whether they are within limits, and if they are outside the limits alarms are issued at 684, 688 and an error is issued at 686. A determination is made at 692 as to what type of weld tool is being used. If a fixed tool is being used, the current axial shoulder force is saved at 694 and the shoulder quill motion is started at 696. If a retractable pin weld tool is being used, the pin is retracted at 698 and the current point force and axial shoulder force are saved at steps 700, 702, respectively. The shoulder quill motion is then started at 704. A check is made of the shoulder force at 706. If the shoulder force is less than a pre-selected value, a determination is made of what tool type is being used at 708 and the pin force is measured at 710. Also, at 714, a determination is made as to whether the pin has reached a maximum distance. Alarms may be issued at 712, 716, following which the pin is retracted at 718. Depending upon the tool type determined at 720, the pin is extended to the start position and the subroutine is terminated at 724.

If the check made at 706 indicates that the shoulder force exceeds the pre-selected value, the process continues through steps 726-732 in which parameters are calculated, recorded and saved. The subroutine is completed through steps 734-746 and the subroutine ends at 750, 752. As shown at step 740, however, if the weld tool is a retractable pin tool, then the pin is extended to the start position at 748 at steps 756-774 are completed. If the maximum distance has been reached at 764 the subroutine ends at 776 otherwise step 778-792 are completed and the process ends at 790, 794.

FIGS. 21a-21e illustrate a flow diagram for a weld step plunge operation. The weld step plunge operation provides a position-controlled weld plunge at an adaptive (override) feed rate determined by axial force. The plunge distance is the distance from the FAL (fast access level) to the WL (work surface level). If the force touch function is not executed immediately, the programmed plunge distance can be adjusted by the difference between the touched work surface and programmed work surface. The plunge rate is decreased if an axial force target value is exceeded.

The weld step plunge process handles both the fixed and retractable pin welding tools. The shoulder tool is positioned at a programmed plunge point, some fixed distance above the work surface. The plunge function moves the tool the requested plunge distance at programmed steps. Plunge distance is compensated, if desired, from data from the force touch subroutine (FIG. 20). The shoulder quill axis W1 is used to obtain require plunge distance and rate. Torque and rate override are compared to their respective programmed limits, and the plunge is aborted in the event a limit is exceeded. After the plunge distance is reached, a programmed dwell time is maintained before the function is completed. Upon successful completion, the force touch developed offset data is cleared and marked invalid to prevent possible misuse at a future plunge point. For retractable pin tool welding, for example the weld step plunge subroutine may use the following parameters:

Wsp & Wsap: Shoulder Position (command & actual)
Wspr & Wsapr: Shoulder Rate (command & actual)
Fsa: Axial Shoulder Force
Fpa: Axial Pin Force
Ts: Shoulder Tool Torque
Tp: Pin Tool Torque
Wspend: Retract to Shoulder position (W1)
Wsprend: Retract Rate for Shoulder
Sssend: Retract Shoulder Speed (S1)
Ssdend: Retract Shoulder Direction
Wppend: Move to Pin position (W2)
Wpprend: Move Rate for Pin
Spsend: Move Pin Speed (S2)
Spdend: Move Pin Direction Referring particularly to FIGS. 21a-21e, the weld step plunge subroutine begins with initial checks at 796, 798, following which the subroutine is started at 800. Shoulder force and torque are checked at 802-806 and the tool type is checked at 808-812. Additional checks are performed at 814-824 and an error is issued at 820 if the checks are not satisfactory. A start point is recorded at 828 following which the shoulder quill motion is started at 830. Then, a series of checks are performed at 832-856. If certain of these checks are not satisfactory, the weld procedure ends at 836, 838. At 856, if the plunge distance has been reached, the shoulder quill motion is started at 858 and again, a series of parameters are checked at 860-882. If these checks are not satisfactory, the process ends at 864, 866. The plunge distance is checked at 884, and if the pre-selected plunge distance has been reached, the shoulder quill motion is started at 886, and a series of checks are again performed at 888-910. If these checks are not satisfactory, the process ends at 892, 894. If the plunge distance has been reached at 912, 914, a dwell timer is started at 916 and when the dwell time has been reached at 918, an end point is recorded at 920, following which the force touch offset is cleared at 922 and the process ends at 924.

FIGS. 22a and 22b illustrate a flow diagram for the drill clamp adaptive subroutine which may be used to perform an adaptive drill operation with clamping force provided via shoulder and axial force control. Drill feed and speed are adaptively controlled based on drill axial force (pin quill axis). An adaptive drill axial force level is programmed so that the pin (drill) axial forces in excess of this value reduce both drill feed and speed. Feed and speed reduction will in turn reduce the drill axial force. The clamping pressure applied by the shoulder reduces any gap between the skin and a substructure, and also accurately locates the skin surface for potential countersink or multi-diameter hole operations.

The drill (pin) tool tip and clamp (shoulder) tool surfaces are set to be at the same position. The CNC controller 114 moves the positioner to the FAL (fast approach level) above the work surface. Certain of the programmed parameters are then verified, and if valid, the process continues. The shoulder quill W1 axis is used to provide a clamping force and a measurement of the work surface location. The pin spindle is started and the pin axial force measurement system is activated and zeroed. Pin quill motion and rate are commanded according to the programmed parameters. Pin axial force is monitored to determine if the programmed adaptive level is exceeded. If the drilling axial force exceeds the adaptive level, both drill (pin) feed and speed are reduced until drill force is less than the adaptive level. In the event that the drill feed and/or speed are reduced below the set minimum values, an alarm message is generated and the drill function is aborted. The drill clamp adaptive subroutine may use the following parameters:

Wsp & Wsap: Shoulder quill command & actual position
Wsf: Shoulder quill command force Wpp & Wpap: Pin quill command and actual position
Bplsafe: Additional Distance to retract pin
Wppr & Wpapr: Pin quill command and actual rate
Spd & Sps: Pin spindle rotation direction and speed
Spsa: Actual Pin Spindle Speed
Fpa: Axial Pin Force Additional details of the drill clamp adaptive subroutine are shown in FIGS. 22a and 22b. After preliminary checks are performed at 926, 928, the drill clamp adaptive subroutine is started at 930. After function internals and outputs are initialized at 932, checks are made on the clamp distance and clamp force relative to pre-selected limits at steps 934, 936. If these parameters are not within the proper ranges, alarms are issued at 940, 946 and the program is halted at 942 following which the subroutine is exited at 944. Assuming the parameters are within limits, a check is made at 938 to determine whether the proper drill clamp has been installed. If the proper drill clamp has not been installed, an alarm is issued at 948 and the program is halted at 942. Assuming the checks performed at 934, 936 and 938 are satisfactory, steps 950-968 are carried out which result in extension of the drill to the start position 966 and starting of the drill motion at 968.

A check is made at 972 to determine whether the drill operation has been completed. If the drill operation is not complete, a check on drill force is made at 974 and if the drill force is not greater than a pre-selected value, the subroutine loops back to point 970, otherwise the process continues to steps 976, 978 where the feed rate and spindle speed are checked relative to minimum values. If the feed rate and spindle speed are less than the pre-selected values, alarms are issued at 984, 986 and steps 998-1010 are carried out before the process ends at 1012. Returning to step 972, if the drill operation is determined to be complete, then the drill is retracted to the start position at 988, the drill spindle is stopped at 990 and steps 992-996 are completed before the subroutine exits at 997.

Reference is now made to FIG. 23 which illustrates a flow diagram for a weld path axial force subroutine used for path welding with shoulder axial force control. Shoulder axial force is held constant over the programmed weld path and weld rate. The weld path axial force subroutine handles both fixed (FIX) and retractable pin (RPT) welding tools. The FSW tool shoulder (W1-axis) has been positioned at the work surface W1, by a preceding weld plunge or path process.

The commanded FSW shoulder axial force is held constant during the path welding action specified via following positional control statements in the program. The shoulder quill (W1) length is varied so that the axial force level is held at the desired value. This length variation is checked against programmed limits and if the workpiece limits WFspmin or WFspmax are exceeded, the condition is alarmed. For the minimum limit case, the current W1 axis length is fixed at the minimum limit until the axial reaction force increases beyond the target value. In those situations where the shoulder axial force exceeds the target value, control reverts to force permitting the W1 length to be decreased, thus moving the shoulder out of the workpiece 187. Head torque, path forces and pin axial force are compared to their respective programmed process limit levels, and if a limit is exceeded, the weld is aborted in a defined way by the Weld End function. For retractable pin tool welding, for example, the weld path axial force subroutine may use the following parameters:

Wsf: Commanded Axial Shoulder Force
Fsa: Axial Shoulder Force
Wsp: Commanded Shoulder Position
Wsap: Shoulder Actual Position
Fpa: Axial Pin Force
Ts: Shoulder Tool Torque
Tp: Pin Tool Torque
Fsp: Radial Path Shoulder Force
Fsn: Radial Normal Shoulder Force
Wspend: Retract to Shoulder position (W1)
Wsprend: Retract Rate for Shoulder
Sssend: Retract Shoulder Speed (S1)
Ssdend: Retract Shoulder Direction
Wppend: Move to Pin position (W2)
Wpprend: Move Rate for Pin
Spsend: Move Pin Speed (S2)
Spdend: Move Pin Direction As shown in FIG. 23, the weld path axial force subroutine begins with preliminary checks 1014, 1016 and is started at 1018. Function internals and outputs are initialized at 1020 and the value of the shoulder force is set at 1022. NC program path commands are issued at 1026 resulting in value checks of the shoulder position, and shoulder force at 1028, 1034 and 1038. These values are either fixed or alarms are issued at 1030, 1032, 1036, and 1040 as appropriate. Checks are carried out of the shoulder torque, path force and normal force at 1042, 1046, and 1050, respectively. If these values exceed preset values, then alarms are issued at 1044, 1048 and 1052 resulting in the subroutine being halted at 1070 which in turn causes the process to end at 1072, 1074.

A determination is made at 1054 of the type of tool. If an RPT tool is being used, a determination is made as to whether the pin force exceeds a pre-selected value at 1056. If the pin force exceeds pre-selected value, an alarm is issued at 1058. If the pin force pre-selected value is not exceeded, then a determination is made of whether the pin torque exceeds another pre-selected value at 1060. If the pin torque exceeds the pre-selected value, an alarm is issued at 1062, and the program is halted at 1070. Assuming the checks made at 1042, 1046, 1050 and 1054 are satisfactory, and the tool type is a fixed tool, a determination is made at 1064 of whether the process terminated. If the process has been terminated, end path position, peak shoulder position, peak forces and torque values are recorded at 1066 and the subroutine ends at 1068. If, however, the process has not been terminated as determined at step 1064, then the subroutine returns to the loop point 1024.

FIGS. 24a and 24b illustrate a flow diagram for a weld plunge adaptive subroutine which functions to provide a position controlled weld plunge at an adaptive (override) feed rate determined by axial force. The plunge distance is the distance from FAL (fast access level) to WL (work surface level). If the force touch function is executed immediately before this subroutine process, the programmed plunge distance can be adjusted by the difference between the touched work surface and programmed work surface. In this subroutine process, the plunge rate is decreased if an axial force target value is exceeded. The weld plunge adaptive process handles both fixed and retractable pin welding tools. The FSW tool shoulder is positioned at a programmed plunge point, some fixed distance above the work surface, the FAL point. The plunge function moves the tool of requested plunge distance at an adaptive feed rate based on axial force. Plunge distance is compensated, if desired, by data from the force touch function. The shoulder quill axis W1 is used to attain the required plunge distance and rate. Torque and rate override are compared to their respective programmed limits and the plunge is aborted in the event that a limit is exceeded. To abort the non-modal weld plunge process, a Weld End function is called to retract the weld tool. For retractable pin tool welding, for example the weld plunge adaptive subroutine may use the following parameters:

Wsp & Wsap: Shoulder Position (command & actual)
Wspr & Wsapr: Shoulder Rate (command & actual)
Fsa: Axial Shoulder Force
Fpa: Axial Pin Force
Ts: Shoulder Tool Torque
Tp: Pin Tool Torque
Wspend: Retract to Shoulder position (W1)
Wsprend: Retract Rate for Shoulder
Sssend: Retract Shoulder Speed (S1)
Ssdend: Retract Shoulder Direction
Wppend: Move to Pin position (W2)
Wpprend: Move Rate for Pin
Spsend: Move Pin Speed (S2)
Spdend: Move Pin Direction As shown in FIGS. 24a and 24b, the weld plunge adaptive subroutine begins with preliminary checks at 1076, 1078 and starts at 1080. Function internals and outputs are initialized at 1082 following which the active and tare shoulder force are measured at 1084. The active and tare shoulder torque are measured at 1086 and a determination is made of the tool type at 1088. If the tool type is RPT, additional measurements are performed at 1090, 1092. If the tool type is a fixed tool the determination is made at 1094 of whether the force touch offset is being used. If the force touch offset is being used, a determination is made at 1096 of whether the force touch data is available. If this data is not available, an alarm is issued at 1100 and an error is issued at 1108. If the force touch data is available, then the plunge depth is adjusted and recorded at 1098 following which a depth check is performed at 1102. If this depth check results in the value that is greater than a pre-selected limit, then an alarm is issued at 1104 and the subroutine ends at 1108. If, however, the depth check at 1102 is satisfactory, then a start point is recorded at 1106 and shoulder quill motion is started at 1110.

A check is made on shoulder force level at 1114 and if the tool type determined at 1116 is RPT, then a determination is made at 1118 of whether the pin force exceeds a limit value. If the pin force exceeds a limit value, the process continues to step 1130 where a determination is made of whether the minimum plunge rate has been achieved. If the minimum plunge rate has not been achieved, an alarm is issued at 1132 and the process ends at 1138, 1140. If the tool type determined at 1116 is a fixed tool, then a check is made of shoulder torque at 1120.

If the shoulder torque is greater than a preset limit, an alarm is issued at 1134 and the process ends at 1138, 1140. If the tool type determined at 1122 is RPT, then a determination is made at 1124 of whether the pin torque is greater than a pre-selected value, and if the pre-selected value is exceeded, an alarm is issued at 1136 and the process ends at 1138, 1140. If the tool type is a fixed tool then a determination is made of whether the plunge distance has been reached at 1142. If the plunge distance has not been reached, then the subroutine returns to a loop point 1112. However, if the plunge distance has been reached, then a dwell timer is started at 1144 and when the dwell time has been reached as determined at 1146, final values, including the end point are recorded at 1148. Then, the force touch offset and mark invalid are cleared at 1150, following which the subroutine ends at 1152.

FIG. 25 illustrates a flow diagram for a weld end subroutine which functions to terminate a welding process and retract the welding tool as well as the pressure rollers. The weld end subroutine is initiated as a result of an abort condition from the weld path and weld plunge subroutines. The weld end subroutine generates a weld end event, cancels the modal weld process, retracts the FSW tool and lifts the rollers from the workpiece 187. For retractable pin tool welding, for example, the weld end subroutine may use the following parameters:
Wsp & Wsap: Shoulder Position (command & actual)
Wspr & Wsapr: Shoulder Rate (command & actual)
Fsa: Axial Shoulder Force
Fpa: Axial Pin Force
Ts: Shoulder Tool Torque
Tp: Pin Tool Torque
Wspend: Retract to Shoulder position (W1)
Wsprend: Retract Rate for Shoulder
Sssend: Retract Shoulder Speed (S1)
Ssdend: Retract Shoulder Direction
Wppend: Move to Pin position (W2)
Wpprend: Move Rate for Pin
Spsend: Move Pin Speed (S2)
Spdend: Move Pin Direction As shown in FIG. 25, the weld end subroutine begins with preliminary checks 1154, 1156 and the subroutine starts at 1158. Function internals and outputs are initialized at 1160 and a series of values are recorded at 1162. Weld plunge/path modes are cancelled at 1164 and force commands are cleared at 1166. The current quill positions are held at 1168 and a dwell timer is started at 1170. When the dwell time is reached at 1172, the shoulder quill is retracted at 1174 and a determination is made at 1176 of whether the shoulder spindle direction should be changed. If the shoulder spindle direction should be changed, the shoulder spindle is stopped at 1178, following which the shoulder spindle speed and direction are reset at 1180. If the tool type, as determined at 1182 is an RPT/FIX then the pin quill is moved at 1184 and a determination is made at 1186 of whether the pin spindle direction should be changed. If the pin spindle direction should be changed, the pin spindle is stopped at 1188 and the spindle speed and direction are reset at 1190. Finally, the clamping rollers are lifted at 1192 and the subroutine ends at 1194.

FIGS. 26a and 26b illustrate a flow diagram for a weld path position adaptive subroutine which is used to provide adaptive path welding with shoulder position control. Shoulder position is held constant over a programmed weld path and weld rate. The commanded weld path rate is overridden to maintain a constant weld path reactive force.

The weld position adaptive subroutine handles both fixed and retractable pin welding tools. The FSW tool shoulder (W1-axis) has been positioned at the work surface by a preceding weld plunge or path function. The shoulder quill position is held constant during the path welding action specified. This subroutine provides an adaptive control based on the shoulder weld path force. A preprogrammed, target weld path force is compared with actual path force levels to increase or decrease the weld path rate within given tolerance limits. Weld variables (forces, torques, etc.) are compared to their respective programmed limits and the weld is aborted in the event that a tolerance level is exceeded. For retractable pin tool welding, for example, the weld path position adaptive subroutine may use the following parameters:
Fsp: Path Reactive Shoulder Force
Wtr: Commanded Weld Path Rate
Wtra: Actual Weld Path Rate
Fsa: Axial Shoulder Force
Fpa: Axial Pin Force
Ts: Shoulder Tool Torque
Tp: Pin Tool Torque
Fsn: Reactive Normal Shoulder Force
Wspend: Retract to Shoulder position (W1)
Wsprend: Retract Rate for Shoulder
Sssend: Retract Shoulder Speed (S1)

Ssdend: Retract Shoulder Direction
Wppend: Move to Pin position (W2)
Wpprend: Move Rate for Pin
Spsend: Move Pin Speed (S2)
Spdend: Move Pin Direction The weld path position adaptive subroutine begins, as shown in FIGS. 26a and 26b with preliminary checks at 1196, 1198. The weld path position adaptive subroutine starts at 1200. Function internals and outputs are initialized at 1202 and NC program path commands are then issued at 1206. Values are checked at 1202, 1210 and 1212 relating to tool motion and path force. If the weld rate is less then the minimum value at 1214, an alarm is issued at 1216. Similarly, if the weld rate exceeds maximum value at 1218, an alarm is issued at 1220. Assuming the values checked at 1214, 1218 are within acceptable ranges, an adaptive algorithm is carried out at 1222 and changes are made in the weld rate command at 1224.

Next, shoulder force, shoulder torque, path force and normal force are compared with preset values at steps 1226, 1228, 1230, 1232 respectively. If these values are not within the proper ranges, then corresponding alarms are issued at 1236, 1238, 1240, 1242 and the program is halted at 1258. Assuming the checks made at 1226 1232 are satisfactory and the tool type determined at 1234 is RPT, then the pin force is checked at 1244 and if it is not within range, an alarm is issued at 1246. If the pin force is within range, then the pin torque is checked at 1248. If the pin torque is not satisfactory an alarm is issued at 1250, otherwise a determination is then made at 1252 of whether the process should be cancelled. If the process has been cancelled, then values are recorded at 1254 and the subroutine ends at 1256. However, if it has been determined that the process has not been canceled at 1252, then the subroutine returns to the loop point 1204.

FIGS. 27a and 27b illustrate a flow diagram for a weld plunge subroutine used to provide a position controlled weld plunge at a programmed feed rate. The weld plunge distance is the distance from FAL to WL. If the force touch function is executed immediately before this subroutine, the programmed plunge distance can be adjusted by the difference between touched work surface and programmed work surface. This subroutine handles both fixed and retractable pin welding tools. The FSW tool shoulder is positioned at the programmed plunge point a fixed distance above the work surface. The plunge subroutine moves the tool to a requested plunge distance at a constant feed rate. The shoulder quill axis (W1) is used to obtain required plunge distance and rate. Force and torque are compared to their respective programmed maximum levels, and the plunge is aborted in the event that a maximum level is exceeded. After the plunge distance is reached, a programmed dwell time is maintained before this function is completed. For retractable pin tool welding, for example, the weld plunge position subroutine may use the following parameters:

Wsp & Wsap: Shoulder quill command and actual position
Wspr: Shoulder quill command rate
Fsa: Axial Shoulder Force
Fpa: Axial Pin Force
Ts: Shoulder Tool Torque
Tp: Pin Tool Torque
Wspend: Retract to Shoulder position (W1)
Wsprend: Retract Rate for Shoulder
Sssend: Retract Shoulder Speed (S1)
Ssdend: Retract Shoulder Direction
Wppend: Move to Pin position (W2)
Wpprend: Move Rate for Pin
Spsend: Move Pin Speed (S2)
Spdend: Move Pin Direction As shown in FIGS. 27a and 27b, the weld plunge subroutine begins with preliminary checks 1264, 1266 and the weld plunge subroutine starts at 1268. Function internals and outputs are initialized at 1270 following which measurements are made of active and tare shoulder force and shoulder torque at 1272, 1274 respectively. If the tool type is RPT as determined at 1276, then measurements are made of active and tare pin force and torque at 1278, 1280 respectively. Next, a determination is made at 1282 of whether a force touch offset is to be used. If the offset is to be used, then a determination is made as to whether force touch data is available at 1284. If this data is not available, an alarm is issued at 1286 and the subroutine ends at 1288. However, assuming the force touch data is available, then the plunge depth is adjusted and recorded at 1290. Then, a depth check is performed at 1292 and if the depth is not within range, an alarm is issued at 1294 and the subroutine ends at 1288.

At 1296, a start point is recorded and shoulder quill motion is commenced at 1298. Shoulder force and shoulder torque are checked at 1300, 1360, respectively and alarms are issued at 1302, 1304 if these values are not within appropriate ranges. If the tool type as determined at 1316 is RPT, then the pin force and pin torque are checked at 1318 and 1320, and alarms are issued at 1306, 1308 as appropriate. Next, a determination is made at 1302 of whether the plunge distance has been reached, and when the plunge distance as been reached, a dwell timer is started at 1324. When the dwell time has been reached at 1326, values, including an end point, are recorded at 1328 following which the force touch offset and marked invalid are cleared at 1330 and the subroutine ends at 1332.

FIGS. 28a and 28b illustrate a flow diagram for a weld path axial force adaptive subroutine. This subroutine provides path welding with shoulder axial force control and an adaptive control on the weld path rate. Shoulder axial force is held constant over the programmed weld path and weld rate. The commanded weld path rate is overridden to maintain constant weld path reactive force. This subroutine handles both fixed and retractable pin welding tools. The FSW tool shoulder has been positioned at the work surface by a preceding weld plunge or path process. The commanded FSW shoulder axial force is held constant during the path welding actions specified in the program.

The shoulder quill access (W1) length is varied so that the axial force level is held at the desired value. This length variation is checked against programmed limits and if the workpiece limit (WFspmin) is exceeded, control is switched to position. In other words, the current W1 axis length is fixed at the minimum limit until the axial reaction force increases beyond the target value where control of the process reverts to adaptive force control. The process provides an adaptive control based on the shoulder (radial) weld path force. A preprogrammed, target weld path force is compared with the actual path force levels to increase or decrease, the weld path rate within given tolerance limits. Weld variables (forces, torques, etc.) are compared to their respective programmed maximum levels, and the weld is aborted in the event a tolerance level is exceeded. For retractable pin tool welding, for example, this subroutine may use the following parameters:

Wsf: Commanded Axial Shoulder Force
Fsa: Axial Shoulder Force
Wsp: Commanded Shoulder Position
Wsap: Shoulder Actual Position
Fsp: Path Reactive Shoulder Force
Wtr: Commanded Weld Path Rate Wtra: Actual Weld Path Rate
Fpa: Axial Pin Force
Ts: Shoulder Tool Torque
Tp: Pin Tool Torque
Fsn: Normal Reactive Shoulder Force
Wsprend: Retract Rate for Shoulder
Sssend: Retract Shoulder Speed (S1)
Ssdend: Retract Shoulder Direction
Wppend: Move to Pin position (W2)
Wpprend: Move Rate for Pin
Spsend: Move Pin Speed (S2)
Spdend: Move Pin Direction As shown in FIGS. 28a and 28b, the weld path axial force adaptive subroutine begins with preliminary checks at 1334, 1336 and the subroutine is then started at 1338. Function internals and outputs are initialized at 1340 and the shoulder force is set at 1342. NC program path commands are then issued at 1346 resulting in shoulder position checks and force checks at 1348, 1354 and 1358 respectively. If the shoulder position value is less then a minimum value, then the shoulder position is held to the minimum value at 1350 and an alarm is issued at 1352. If the shoulder position exceeds the preselected amount, as determined at 1354, then an alarm is issued at 1356. If the shoulder force is greater than a preselected value, as determined at 1358, then the shoulder force is set at 1360. A determination is made at 1362 of whether welding has commenced, and if welding has commenced then checks are made on the path force at 1364, 1366.

Minimum and maximum weld checks are performed at 1368 and 1372, and alarms are issued at 1370, 1374 depending on the results of these checks. Assuming the preceding checks prove satisfactory, an adaptive algorithm is performed at 1376 and the weld rate command is then changed at 1378, as appropriate. Next, shoulder torque, path force and normal force are checked at 1380, 1392, 1394 respectively and alarms are issued at 1382, 1384 1386, as appropriate. If the tool type as determined at 1396 is RPT, then the pin force and pin torque are checked at 1398, 1400, and alarms are issued, as appropriate at 1388, 1390. Any of the alarms issued at 1382-1390 result in the subroutine being halted at 1408 and the subroutine ends at 1410, 1412. A determination is made at 1402 of whether the process has been terminated. If the process has been terminated, then the end path position along with other values are recorded at 1404 and the subroutine ends at 1406. If the process has not been terminated as determined at 1402, then the subroutine returns to the loop point 1344 where the steps described above are repeated.

Attention is directed to FIG. 29 which illustrates a flow diagram for a weld path position subroutine used to perform a path weld under shoulder position control. Shoulder position is held constant over the programmed weld path and weld rate. This subroutine handles both fixed and retractable welding tools. The FSW tool shoulder has been positioned at the work surface, by proceeding a weld plunge or path function. The shoulder quill position is held constant during the path welding actions specified in the program. Force and torque are compared to their respective programmed maximum levels, and the weld is aborted in the event that a maximum level is exceeded. For retractable pin tool welding, for example, the weld path position subroutine may use the following parameters:

Fsa: Axial Shoulder Force
Fpa: Axial Pin Force
Ts: Shoulder Tool Torque
Tp: Pin Tool Torque
Fsp: Radial Path Shoulder Force
Fsn: Radial Normal Shoulder Force
Wspend: Retract to Shoulder position (W1)
Wsprend: Retract Rate for Shoulder
Sssend: Retract Shoulder Speed (S1)
Ssdend: Retract Shoulder Direction
Wppend: Move to Pin position (W2)
Wpprend: Move Rate for Pin
Spsend: Move Pin Speed (S2)
Spdend: Move Pin Direction As shown in FIG. 29, the weld path position subroutine commences with preliminary checks at 1414, 1416 and the subroutine then starts at 1418. Function internals and outputs are initialized at 1420 and the NC program path commands are issued at 1424. Next, shoulder force, shoulder torque, path force and normal force are checked at 1426, 1446, 1448 and 1450, respectively. If these values are not satisfactory, corresponding alarms are issued at 1428-1434, resulting in the subroutine being halted at 1440, following which the subroutine ends at 1442, 1444. If the tool type is RPT as determined at 1452, pin force and pin torque are checked at 1454, 1456 and corresponding alarms are issued, as appropriate at 1436, 1438. If the tool type is fixed, a determination is then made of whether the process has been canceled at 1458. If the process has been canceled, then the end path position along with other values are recorded at 1460 and the subroutines ends at 1462. If the process has not been cancelled, the subroutine returns to loop point 1422 where the above steps are repeated until the process has reached termination.

Embodiments of the disclosure may find use in a variety of potential applications, particularly in the transportation industry, including for example, aerospace and automotive applications. Thus, referring now to FIGS. 30 and 31, embodiments of the disclosure may be used in the context of an aircraft manufacturing and service method 1464 as shown in FIG. 30 and an aircraft 1466 as shown in FIG. 31. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 1464 may include specification and design 1468 of the aircraft 1466 and material procurement 1470. During production, component and subassembly manufacturing 1472 and system integration 1474 of the aircraft 1466 takes place. Thereafter, the aircraft 308 may go through certification and delivery 1476 in order to be placed in service 1478. While in service by a customer, the aircraft 1466 is scheduled for routine maintenance and service 1480 (which may also include modification, reconfiguration, refurbishment, and so on).

Each of the processes of method 1464 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 31, the aircraft 1466 produced by exemplary method 1464 may include an airframe 1482 with a plurality of systems 1484 and an interior 1486. Examples of high-level systems 1484 include one or more of a propulsion system 1494, an electrical system 1488, a hydraulic system 1490, and an environmental system 1492. Any number of other systems may be included. Although an aerospace example is shown, the principles of the disclosure may be applied to other industries, such as the automotive industry.

Apparatus and methods embodied herein may be employed during any one or more of the stages of the production and service method 1464. For example, components or subassemblies corresponding to production process 1472 may be fabricated or manufactured in a manner similar to components or subassemblies produced while the aircraft 1466 is in service. Also, one or more apparatus embodiments, method embodiments, or a combination thereof may be utilized during the production stages 1472 and 1474, for example, by substantially expediting assembly of or reducing the cost of an aircraft 1466. Similarly, one or more of apparatus embodiments, method embodiments, or a combination thereof may be utilized while the aircraft 1466 is in service, for example and without limitation, to maintenance and service 1480.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of controlling a friction stir welding machine, comprising the steps of:
    generating definitions for each of a plurality of processes that may be performed by the machine;
    generating a master set of parameters used in the processes; and,
    using the definitions and the parameters to control the processes, said controlling comprising
    programming a computer with instructions based on the generated definitions and the master set of parameters and, generating control signals using a computer executing said programming instructions to control the operation of the machine;
    providing a weld head mounted on a motion platform, said weld head comprising a pin tool coaxially disposed within a shoulder tool wherein said pin tool is extensible and retractable relative to said shoulder tool, said motion platform as part of said friction stir welding machine, said weld head mounted on said motion platform, both of said motion platform and said weld head moveable to provide movement of said weld head along an X, Y, and Z axes;
    using said motion platform to provide linear movement of the weld head along the X, Y, and Z axes; and
    accomplishing said weld head movement and retraction and extension of said pin tool using said computer programming instructions.

2. The method of claim 1, further comprising the step of:
    associating certain of the parameters in the master set of parameters with at least one of the processes.

3. The method of claim 1, wherein the step of generating definitions is performed by generating a plurality of process flowcharts respectively defining the processes, wherein each of the process flowcharts lists the steps for carrying out one of the processes.

4. The method of claim 3, further including the step of:
    associating certain of the parameters in the master set of parameters with at least certain of the steps in the flowcharts.

5. The method of claim 1, wherein the processes include at least one of fixed tool welding, retractable tool welding, fixed stir spot welding, milling, adaptive milling, drilling, probing.

6. The method of claim 1, further comprising the steps of:
    generating a set of process subroutines; and
    associating at least certain of the subroutines with each of the processes.

7. The method of claim 6, wherein generating the subroutines includes generating a flowchart defining the process steps for carrying out the subroutine.

8. The method of claim 1, wherein the step of generating a master set of parameters includes generating a set of command parameters used for controlling the processes.

9. The method of claim 1, wherein the step of generating a master set of parameters includes generating a set of measurement parameters used for controlling the processes.

10. The method of claim 1, wherein the step of generating a master set of parameters includes generating a set of limit parameters used for controlling the processes.

11. The method of claim 1, further comprising the step of:
    generating values for each of the parameters in the master set of parameters.

12. The method of claim 1, wherein said friction stir welding machine is controlled to weld a vehicle assembly.

* * * * *